US012058338B2

(12) United States Patent
Filippov et al.

(10) Patent No.: US 12,058,338 B2
(45) Date of Patent: Aug. 6, 2024

(54) METHOD AND APPARATUS OF LOCAL ILLUMINATION COMPENSATION FOR INTER PREDICTION

(71) Applicant: Huawei Technologies Co., Ltd., Shenzhen (CN)

(72) Inventors: Alexey Konstantinovich Filippov, Moscow (RU); Vasily Alexeevich Rufitskiy, Moscow (RU)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 231 days.

(21) Appl. No.: 17/531,144

(22) Filed: Nov. 19, 2021

(65) Prior Publication Data
US 2022/0124343 A1 Apr. 21, 2022

Related U.S. Application Data

(63) Continuation of application No. PCT/RU2020/050102, filed on May 21, 2020.

(30) Foreign Application Priority Data

May 21, 2019 (WO) ............... PCT/RU2019/000349
Jun. 4, 2019 (WO) ............... PCT/RU2019/000399

(51) Int. Cl.
*H04N 19/139* (2014.01)
*H04N 19/105* (2014.01)
(Continued)

(52) U.S. Cl.
CPC ......... *H04N 19/139* (2014.11); *H04N 19/105* (2014.11); *H04N 19/117* (2014.11); *H04N 19/176* (2014.11); *H04N 19/198* (2014.11)

(58) Field of Classification Search
CPC .. H04N 19/139; H04N 19/105; H04N 19/117; H04N 19/176; H04N 19/198; H04N 19/51
See application file for complete search history.

(56) References Cited

U.S. PATENT DOCUMENTS 11,659,162 B2 * 5/2023 Liu ................. H04N 19/52
375/240.12
2010/0027881 A1 2/2010 Kim et al.
(Continued)

FOREIGN PATENT DOCUMENTS

CN 107147911 A 9/2017
CN 108293137 A 7/2018
(Continued)

OTHER PUBLICATIONS

Document: JVET-D0122 v2, Nan Hu et al, "Unification of parameter derivation for CCLM and LIC," Joint Video Exploration Team (JVET) of ITU-T SG 16 WP 3 and ISO/IEC JTC 1/SC 29/WG11, 4th Meeting: Chengdu, CN, Oct. 15-21, 2016, 6 pages, XP030150374.
(Continued)

*Primary Examiner* — Boubacar Abdou Tchoussou
(74) *Attorney, Agent, or Firm* — Conley Rose, P.C.

(57) ABSTRACT

A method and apparatus for local illumination compensation (LIC) for inter-prediction that uses a MinMax method to derive linear model parameters for the LIC. Values of parameters α and β for the linear model of the LIC are derived, based on reconstructed neighboring samples of the current block and reconstructed neighboring samples of the reference block. When a condition for the value of β is met, the value of α is clipped based on the value of β and the value of β is updated based on the clipped value of α before updating the inter-predicted sample values for the current block.

20 Claims, 27 Drawing Sheets

(51) Int. Cl.
*H04N 19/117* (2014.01)
*H04N 19/176* (2014.01)
*H04N 19/196* (2014.01)

(56) References Cited

U.S. PATENT DOCUMENTS

| | | | |
|---|---|---|---|
| 2018/0063531 A1 | 3/2018 | Hu et al. | |
| 2018/0098079 A1 | 4/2018 | Chuang et al. | |
| 2018/0176592 A1 | 6/2018 | Lim et al. | |
| 2018/0316918 A1 | 11/2018 | Drugeon et al. | |
| 2019/0166375 A1 | 5/2019 | Jun et al. | |
| 2019/0200021 A1 | 6/2019 | Park et al. | |
| 2020/0252653 A1* | 8/2020 | Rusanovskyy | H04N 19/82 |
| 2020/0296417 A1 | 9/2020 | Ko et al. | |
| 2022/0159290 A1* | 5/2022 | Bordes | H04N 19/196 |

FOREIGN PATENT DOCUMENTS

| | | |
|---|---|---|
| CN | 109565593 A | 4/2019 |
| EP | 3737099 A1 | 11/2020 |
| WO | 2018056603 A1 | 3/2018 |
| WO | 2019039806 A1 | 2/2019 |

OTHER PUBLICATIONS

Document: JVET-N0144, Yukinobu Yasugi et al, "Non-CEI: Simplification of division calculation in local illumination compensation," Joint Video Experts Team (JVET) of ITU-T SG 16 WP 3 and ISO/IECJTC 1/SC 29/WG11, 14th Meeting: Geneva, CH, Mar. 19-27, 2019, 4 pages, XP030202848.

Document: JVET-N0306-v2, Philippe Bordes et al, "non-CEI: simplification of LIC parameters derivation," Joint Video Experts Team (JVET) of ITU-T SG 16 WP 3 and ISO/IECJTC 1/SC 29/WG11, 14th Meeting: Geneva, CH, Mar. 19-27, 2019, 3 pages, XP030203479.

Document: JVET-N0306-v2(draft-text-for-LIC-VVC.docx), Philippe Bordes et al, "non-CEI: simplification of LIC parameters derivation," Joint Video Experts Team (JVET) of ITU-T SG 16 WP 3 and ISO/IECJTC 1/SC 29/WG11, 14th Meeting: Geneva, CH, Mar. 19-27, 2019, 6 pages, XP030203480.

Document: JVET-N0716-v1, Alexey Filippov et al, "CEI-related: Simplified and robust LIC parameter derivation unified with CCLM," Joint Video Experts Team (JVET) of ITU-T SG 16 WP 3 and ISO/IECJTC 1/SC 29/WG11, 14th Meeting: Geneva, CH, Mar. 19-27, 2019, 6 pages, XP030204707.

Document: JVET-N0410-v1, Alexey Filippov et al, "CEI-related: Simplification of LIC parameter derivation and its unification with CCLM," Joint Video Experts Team (JVET) of ITU-T SG 16 WP 3 and ISO/IECJTC 1/SC 29/WG11, 14th Meeting: Geneva, CH, Mar. 19-27, 2019, 4 pages, XP030210565.

Alexey Filippov et al, "CE1-related: Simplification of LIC parameter derivation and its unification with CCLM," Joint Video Experts Team (JVET) of ITU-T SG 16 WP 3 and ISO/IEC JTC 1/SC 29/WG 1114th Meeting: Geneva, CH, Mar. 19-27, 2019, JVET-N0410-v2, 8 pages.

Li, Q., et al., "An adaptive local illumination compensation method of multi-view video coding," Journal of Chongqing University of Posts and Telecommunications (Natural Science Edition), vol. 25 No. 6, Dec. 2013, 6 pages.

* cited by examiner

METHOD AND APPARATUS OF LOCAL ILLUMINATION COMPENSATION FOR INTER PREDICTION

CROSS-REFERENCE TO RELATED APPLICATIONS

This is a continuation of International Patent Application No. PCT/RU2020/050102 filed on May 21, 2020, which claims priority to International Patent Application No. PCT/RU2019/000349 filed on May 21, 2019 and International Patent Application No. PCT/RU2019/000399 filed on Jun. 4, 2019. All of the aforementioned patent applications are hereby incorporated by reference in their entireties.

TECHNICAL FIELD

Embodiments of the present disclosure generally relate to the field of picture processing and more particularly to a local illumination compensation (LIC) technique for inter-prediction coding.

BACKGROUND

Video coding (video encoding and decoding) is used in a wide range of digital video applications, for example broadcast digital television (TV), video transmission over internet and mobile networks, real-time conversational applications such as video chat, video conferencing, DIGITAL VERSATILE DISC (DVD) and BLU-RAY discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

LIC is one of the techniques for improving motion compensation in Versatile Video Coding (VVC). LIC is applied to the results of the motion compensation, or in general to the results of the inter prediction. LIC comprises adjusting predicted samples by multiplying the predicted samples (respectively the values of the samples) with a first parameter $\alpha$ (respectively with a value of the first parameter $\alpha$) and adding a second parameter $\beta$ (respectively a value of the second parameter $\beta$). The parameters $\alpha$ and $\beta$ are derived from neighboring samples of the current block and the reference block using a least mean squares method. However, deriving the parameters $\alpha$ and $\beta$ using a least mean squares method or cross-correlation is slow due its high complexity.

SUMMARY OF THE DISCLOSURE

Embodiments provide apparatuses and methods for illumination compensation for inter prediction coding (encoding and/or decoding) of a picture according to the independent claims.

The disclosure proposes to use a cross-component linear model (CCLM) MinMax method to derive linear model parameters for LIC. It is also proposed to improve the performance of both, LIC and CCLM by introducing average values computation. The proposed method may reduce the number of sequential computations and may reduce hardware complexity.

Embodiments of the present disclosure facilitate an efficient illumination compensation. Embodiments of the present disclosure reduce latency and complexity of linear model parameter derivation as compared to conventional cross-correlation based LIC methods and improve coding efficiency as compared to the MinMax method without linear model parameters conditional clipping.

The foregoing and other objects are achieved by the subject matter of the independent claims. Further implementation forms are apparent from the dependent claims, the description and the figures.

According to a first embodiment, the disclosure relates to a method for LIC for inter-prediction coding, the method comprising obtaining inter-predicted sample values for a current block using motion compensation (i.e. inter prediction), deriving values of parameters $\alpha$ and $\beta$ for a linear model of the LIC, based on at least one of reconstructed neighboring samples above the current block and reconstructed neighboring samples left of the current block and based on at least one of reconstructed neighboring samples above at least one reference block and reconstructed neighboring samples left of the at least one reference block, wherein the at least one reference block corresponds to the current block, and updating the inter-predicted sample values for the current block using the linear model based on the parameters $\alpha$ and $\beta$, wherein, when a condition for the value of $\beta$ is met, the value of $\alpha$ is clipped based on the value of $\beta$ and the value of $\beta$ is updated based on the clipped value of $\alpha$ before updating the inter-predicted sample values for the current block.

The at least one reference block is selected from a plurality of reference blocks of a plurality of previously decoded pictures to perform inter-prediction for the current block. In the case of uni-prediction, only one reference block of a single previously decoded picture, also called reference picture, is used. In the case of bi-prediction, two reference blocks from two reference pictures are used. In one implementation, even more than two reference blocks may be used. An offset (spatial offset) between the position (x, y coordinates) of the reference block and the position of the current block is called motion vector (MV).

The reconstructed neighboring samples of the current block may include, but not limited to, reconstructed neighboring samples above the current block and/or reconstructed neighboring samples left of the current block. The reconstructed neighboring samples of the reference block may include, but not limited to, reconstructed neighboring samples above the reference block and/or reconstructed neighboring samples left of the reference block. It is noted that the expressions "reconstructed neighboring samples", "template reference sample", "template samples" and "reference samples" have substantially the same meaning throughout the present disclosure.

As the positions of the reference samples of the current block match the positions A and B of the reference samples of the reference block, the number of operations required to determine the parameters $\alpha$ and $\beta$ can be decreased significantly compared to the LMS method.

Thus, embodiments of the disclosure provide a simplified derivation of the parameters $\alpha$ and $\beta$, and accordingly a simplified LIC.

According to an aspect of the first embodiment, the value of $\alpha$ is clipped based on the value of $\beta$ and the value of $\beta$ is updated based on the clipped value of $\alpha$ before updating the inter-predicted sample values for the current block, only when the condition for the value of $\beta$ is met.

According to a further aspect of the first embodiment, the value of $\alpha$ is clipped when the absolute value of $\beta$ is larger than a threshold $T_\beta$.

According to a further aspect of the first embodiment, the value of $\alpha$ is clipped as follows: when $\beta<0$, the value of $\alpha$ is set equal to min($\alpha$, $\alpha_{max}$), and/or when $\beta>0$, the value of $\alpha$ is set equal to max($\alpha$, $\alpha_{min}$), wherein $\alpha_{max}$ represents a maximum value of a clipping range of the value of $\alpha$, and $\alpha_{min}$ represents a minimum value of the clipping range of the value of $\alpha$.

According to a further aspect of the first embodiment, the method further comprises clipping the value of $\beta$ before updating the inter-predicted sample values for the current block.

According to a further aspect of the first embodiment, the value of $\beta$ is clipped after updating the value of $\beta$ based on the clipped value of $\alpha$.

According to a further aspect of the first embodiment, the value of $\beta$ is clipped only when the value of $\alpha$ is clipped.

After clipping, the magnitude of $\beta_{clip}$ value is guaranteed not to exceed half of a range of the sample value, wherein the range is determined by the bitdepth of a color component of a picture.

According to a further aspect of the first embodiment, the at least one of reconstructed neighboring samples above the current block and reconstructed neighboring samples left of the current block are processed by applying a finite impulse response (FIR) filter, and/or the at least one of reconstructed neighboring samples above the at least one reference block and reconstructed neighboring samples left of the at least one reference block are processed by applying an FIR filter.

Filtering template samples using different (linear or non-linear) smoothing filters removes and reduces the impact of outliers. In particular, FIR filters with coefficients of [1, 2, 1]/4 and [1, 0, 2, 0, 1]/4 can be used for this purpose.

According to a further aspect of the first embodiment, the FIR filter is applied when the current block is predicted using a non-affine motion compensation model.

The motivation to disable filtering for an affine motion model is to avoid additional computational complexity for the motion compensation scheme.

According to a further aspect of the first embodiment, the value of $\beta$ is derived based on a mean value of a first set of reconstructed neighboring samples of the current block and a mean value of a second set of reconstructed neighboring samples of the at least one reference block.

To calculate $\beta$ with higher accuracy, mean values of LIC templates for both the current and reference blocks may be computed.

According to a further aspect of the first embodiment, the mean value of the first set of reconstructed neighboring samples of the current block is derived using a weighted sum of a mean value $\text{Mean}_{above}$ of a set S1 of reconstructed neighboring samples above the current block and a mean value $\text{Mean}_{left}$ of a set S2 of reconstructed neighboring samples left of the current block, wherein a weighting coefficient w is applied either to the mean value $\text{Mean}_{above}$ or the mean value $\text{Mean}_{left}$ depending on whether a width of the current block is greater than a height of the current block, and the mean value of the second set of reconstructed neighboring samples of the at least one reference block is derived using a weighted sum of a mean value $\text{Mean}_{above}'$ of a set S1' of reconstructed neighboring samples above the at least one reference block and a mean value $\text{Mean}_{left}'$ of a set S2' of reconstructed neighboring samples left of the at least one reference block, wherein the weighting coefficient w is applied either to the mean value $\text{Mean}_{above}'$ or the mean value $\text{Mean}_{left}'$ depending on whether the width of the at least one reference block is greater than the height of the at least one reference block.

According to a further aspect of the first embodiment, the mean value of the first set of reconstructed neighboring samples of the current block is calculated based on a sum $S_{T1}$ of available reconstructed neighboring samples of the current block using a shift operation and a multiplication, wherein the shift operation depends on the number $C_T$ of available reconstructed neighboring samples of the current block.

According to a further aspect of the first embodiment, the mean value of the first set of reconstructed neighboring samples of the current block is calculated as follows:

Mean=(($S_{T1}$+shiftOffset)·mult)»shift, and shiftOffset=$C_T$»1, wherein $S_{T1}$ represents the sum of the available reconstructed neighboring samples of the current block, $C_T$ represents the number of available reconstructed neighboring samples of the current block, and mult represents a multiplier fetched from a lookup table.

According to this aspect, lookup table (LUT) multiplication and shift may be used for obtaining the mean value of the reconstructed neighboring samples of the current block.

According to a further aspect of the first embodiment, the mean value of the second set of reconstructed neighboring samples of the at least one reference block is calculated based on a sum $S_{T2}$ of available reconstructed neighboring samples of the at least one reference block using a shift operation and a multiplication, wherein the shift operation depends on the number $C_T$ of available reconstructed neighboring samples of the at least one reference block.

According to a further aspect of the first embodiment, the mean value of the second set of reconstructed neighboring samples of the at least one reference block is calculated as follows:

Mean=(($S_{T2}$+shiftOffset)−mult)»shift, and shiftOffset=$C_T$»1, wherein $S_{T2}$ represents the sum of the available reconstructed neighboring samples of the at least one reference block, $C_T$ represents the number of available reconstructed neighboring samples of the at least one reference block, and mult represents of a multiplier fetched from a lookup table.

The mean value calculations do not require multiplications or divisions and may be easily implemented using add and shift operations.

The number of available template samples $C_T$ is the same when calculating the mean value of available template samples of the current block and the mean value of available template samples of the reference block, because it depends only on the neighboring blocks of the current block.

According to a further aspect of the first embodiment, the available reconstructed neighboring samples of the current block comprise at least one of available reconstructed neighboring samples above the current block and available reconstructed neighboring samples left of the current block, and/or the available reconstructed neighboring samples of the at least one reference block comprise at least one of available reconstructed neighboring samples above the at least one reference block and available reconstructed neighboring samples left of the at least one reference block.

According to a further aspect of the first embodiment, the reconstructed neighboring samples above the current block include a single row of reconstructed samples which are adjacent to the current block, and/or, the reconstructed neighboring samples left of the current block include a single column of reconstructed samples which are left of the current block According to a further aspect of the first embodiment, the reconstructed neighboring samples above the at least one reference block include a single row of reconstructed samples which are adjacent to the at least one reference block, and/or, the reconstructed neighboring samples left of the at least one reference block include a single column of reconstructed samples which are left of the at least one reference block.

According to a further aspect of the first embodiment, an encoder is provided comprising processing circuitry for carrying out any one of the methods according to the first embodiment.

According to a further aspect of the first embodiment, a decoder is provided comprising processing circuitry for carrying out any one of the methods according to the first embodiment.

According to a further aspect of the first embodiment, a computer program product is provided comprising instructions which, when the program is executed by a computer, cause the computer to carry out any one of the methods according to the first embodiment.

According to a further aspect of the first embodiment, a decoder is provided comprising one or more processors and a non-transitory computer-readable storage medium coupled to the one or more processors and storing instructions for execution by the one or more processors, wherein the instructions, when executed by the one or more processors, configure the decoder to carry out any one of the methods according to the first embodiment.

According to a further aspect of the first embodiment, an encoder is provided comprising one or more processors and a non-transitory computer-readable storage medium coupled to the one or more processors and storing instructions for execution by the one or more processors, wherein the instructions, when executed by the one or more processors, configure the encoder to carry out any one of the methods according to the first embodiment.

According to a further aspect of the first embodiment, a non-transitory computer-readable medium carrying a program code which, when executed by a computer device, causes the computer device to perform any one of the methods according to the first embodiment.

According to a further aspect of the first embodiment, an apparatus for LIC for inter-prediction coding is provided, comprising an obtaining unit configured to obtain inter-predicted sample values for a current block using motion compensation, a deriving unit configured to derive values of parameters $\alpha$ and $\beta$ for a linear model of the LIC, based on at least one of reconstructed neighboring samples above the current block and reconstructed neighboring samples left of the current block and based on at least one of reconstructed neighboring samples above at least one reference block and reconstructed neighboring samples left of the at least one reference block, wherein the at least one reference block corresponds to the current block, and an updating unit configured to update the inter-predicted sample values for the current block using the linear model based on the parameters $\alpha$ and $\beta$, wherein the deriving unit is further configured to clip the value of $\alpha$ based on the value of $\beta$ and update the value of $\beta$ based on the clipped value of $\alpha$ when a condition for the value of $\beta$ is met.

The deriving unit may be configured to clip the value of $\alpha$ based on the value of $\beta$ and update the value of $\beta$ based on the clipped value of $\alpha$ only when the condition for the value of $\beta$ is met.

The updating unit may be configured to clip the value of $\alpha$ when the absolute value of $\beta$ is larger than a threshold Tp.

The value of $\alpha$ may be clipped as follows: when $\beta<0$, the value of $\alpha$ is set equal to min($\alpha$, $\alpha_{max}$), and/or when $\beta>0$, the value of $\alpha$ is set equal to max($\alpha$, $\alpha_{min}$), wherein $\alpha_{max}$ represents a maximum value of a clipping range of the value of $\alpha$, and $\alpha_{min}$ represents a minimum value of the clipping range of the value of $\alpha$.

The updating unit may be further configured to clip the value of $\beta$.

The updating unit may be configured to clip the value of $\beta$ after updating the value of $\beta$ based on the clipped value of $\alpha$.

The value of $\beta$ may be clipped only when the value of $\alpha$ is clipped.

According to a second embodiment, the disclosure relates to a method for illumination compensation for inter prediction coding (encoding and/or decoding) of a picture, comprising obtaining inter-predicted sample values for a current block using motion compensation, obtaining a first target value ($x_A$) and a second target value ($x_B$) of reference samples (such as neighboring samples) of at least one reference block and a corresponding position A of the reference sample having the first target value and a corresponding position B of the reference sample having the second target value relative to the position of the reference block (such as left above corner of the reference block), obtaining respective values ($y_A$, $y_B$) of reference samples (such as neighboring samples) of the current block at the corresponding positions A and B relative to the position of the current block (such as left above corner of the current block), obtaining or deriving values of parameters (such as $\alpha$ and $\beta$) based on the values of reference samples, wherein the values of reference samples comprise one or more of the first target value ($x_A$) and the second target value ($x_B$) of the reference samples of the reference block, and the values of the reference samples ($y_A$, $y_B$) of the current block at the corresponding positions A and B, conditionally clipping of the value of the parameter $\alpha$ based on the value of parameter $\beta$, and updating the value of the parameter $\beta$ based on the clipped value of the parameter $\alpha$, and updating the values of the inter-predicted samples based on the values of the clipped parameters (such as $\alpha$ and $\beta$).

In an example, the updating the value of the parameter $\beta$ may comprise recalculation and clipping.

It should be understood that reference samples may be neighboring samples itself or may be calculated values based on or from neighboring samples. The present disclosure is not limited to those. For example, two reference blocks correspond to two reference images.

According to an aspect of the second embodiment, the parameters are α and β, and values of the updating parameters α and β are obtained using the calculated values as follows:

$$\alpha = \frac{y_B - y_A}{x_B - x_A}$$

$$\beta = y_A - \alpha x_A.$$

According to a further aspect of the second embodiment, the step of conditionally clipping of the value of parameter α based on the value of parameter β, comprises: when a condition |β|>T$_β$ is true, the value of the parameter α is updated as follows: when β<0, the parameter α is set equal to min(α, α$_{max}$), and/or when β>0, the parameter α is set equal to max(α, α$_{min}$), wherein |β| represents the absolute value (i.e. the magnitude) of the parameter β, T$_β$ represents a threshold value, α$_{max}$ represents the maximum value of the clipping range of α, and α$_{min}$ represents the minimum value of the clipping range of a.

According to a further aspect of the second embodiment, the reference samples (such as neighboring samples) of the reference block and/or the reference samples (such as neighboring samples) of the current block are processed by an FIR filter.

According to a further aspect of the second embodiment, the FIR filter is applied when the current block is predicted using a non-affine (i.e. translational) motion compensation model.

According to a further aspect of the second embodiment, the value of a second parameter (such as β) is obtained (or derived or calculated) based on a mean value of a first set of reference samples (such as neighboring reconstructed samples) of the current block and a mean value of a second set of reference samples (such as neighboring reconstructed samples) of the reference block.

According to a further aspect of the second embodiment, the value of the parameter β is obtained using a weighted sum of a mean value of a set (S1) of reference samples (e.g. mean above template samples, such a Mean$_{above}$) above the current block and a mean value of a set (S2) of reference samples (e.g., mean left template samples, such as Mean$_{left}$) left of the current block, wherein the weighting coefficient w is applied to the mean value of either the set (S1) or the set (S2) depending on whether the width of the current block is greater than the height of the current block, and a weighted sum of a mean value of a set (S1') of reference samples (e.g. mean above template samples, such a Mean$_{above}$) above the reference block and a mean value of a set (S2') of reference samples (e.g., mean left template samples, such a Mean$_{left}$) left of the reference block, wherein the weighting coefficient w is applied to the mean value of either the set (S1') or the set (S2') depending on whether the width of the reference block is greater than the height of the reference block.

According to a further aspect of the second embodiment, the value of the parameter β is clipped according to whether the parameter α is clipped.

According to a further aspect of the second embodiment, if the parameter α is clipped, the value of the parameter β is clipped, if the parameter α was not clipped, the value of the parameter β is not clipped.

According to a further aspect of the second embodiment, the values of the inter-predicted samples are updated as follows:

pred'(x,y)=α·pred(x,y)+β.

According to a further aspect of the second embodiment, position A and position B are selected from a subset of a set (e.g. a set L) of neighboring samples of the reference block (L can comprise all neighboring samples at integer pixel positions).

According to a further aspect of the second embodiment, a second-smallest value (x$_A'$), (e.g a sample value at a position A'), and a second-largest value (x$_B'$), (e.g. a sample value at a position B'), of the neighboring samples of the reference block are additionally used for calculating the updating parameters (e.g. α and β).

According to a further aspect of the second embodiment, an LUT is used to derive parameter α (e.g. the lookup table comprises the results of the division derivation as specified for α above).

According to a further aspect of the second embodiment, a lookup table is linearly mapped to the difference x$_B$−x$_A$.

According to a further aspect of the second embodiment, a lookup table in non-linearly mapped to the difference x$_B$−x$_A$.

According to a further aspect of the second embodiment, a lookup table comprises the values of significands.

According to a further aspect of the second embodiment, a set of neighboring samples of the reference block (e.g. a set L) and a set of neighboring samples of the current block (e.g. a set C) do not include all neighboring samples (e.g. do not include all neighboring samples at integer pixel positions) but only include samples adjacent to the corner and the middle of the reference and current block.

According to a further aspect of the second embodiment, a set of neighboring samples of the reference block (e.g. a set L) and a set of neighboring samples of the current block (e.g. a set C) do not include all neighboring samples (e.g. do not include all neighboring samples at integer pixel positions) but only include samples that have a distance to the top-left corner exceeding a given threshold (the threshold can for instance, be defined as ¼ of side length).

According to a further aspect of the second embodiment, several reference blocks (for example two or more) are used for motion compensation (such as LIC) and for obtaining the linear model coefficients (such as updating parameters (e.g. α and β).

According to a further aspect of the second embodiment, mean values of top and left template samples of the current and reference blocks are used to calculate one or more linear model parameters for motion compensation (such as LIC).

According to a further aspect of the second embodiment, templates of the current and reference blocks are used without downsampling them.

According to a further aspect of the second embodiment, top and left template samples of the current and reference blocks are filtered before linear model parameter derivation or linear model coefficient derivation.

According to a further aspect of the second embodiment, linear model parameter derivation or linear model coefficient derivation is unified for CCLM prediction (CCLM) and LIC.

According to a further aspect of the second embodiment, the first target value and the second target value of reference (neighboring) samples of the reference block are respectively a minimum value (x$_A$) and a maximum value (x$_B$) of a second set of neighboring samples of the reference block, and the position A of the reference sample having the first target value and the position B of the reference sample having the second target value are a corresponding position A of the neighboring sample having the minimum value and a corresponding position B of the neighboring sample having the maximum value relative to the position of the reference block.

According to a further aspect of the second embodiment, the first target value is a first averaged value of the smallest sample value A and the second-smallest sample value A' of the second set of neighboring samples of the reference block, the second target value is a second averaged value of the largest sample value B and the second-largest sample value B' of the second set of neighboring samples of the reference block, and instead of the respective values ($y_A$, $y_B$) of reference samples (such as neighboring samples) of the current block at the corresponding positions A and B relative to the position of the current block, an averaged value of the reference samples of the current block at the corresponding positions A and A' and an averaged value of the reference samples of the current block at the corresponding positions B and B' are used.

According to a further aspect of the second embodiment, the values of reference samples further comprise a mean value of top template samples and left template samples of the current block and a mean value of top template samples and left template samples of the reference block.

According to a further aspect of the second embodiment, when a quantity of reference samples having the minimum value is Q among the second set of neighboring samples of the reference block, the corresponding position A of the reference sample is the reference sample having the minimum value and having the maximum distance to the top-left corner of the reference block, and/or the corresponding position B of the reference sample is the reference sample having the maximum value and having the maximum distance to the top-left corner of the reference block.

According to a further aspect of the second embodiment, the updating parameters (such as $\alpha$ and/or $\beta$) are derived from the values of a first set of reference samples of the current block and the values of a second set of reference samples of the reference block by using mean calculation.

According to a third embodiment, the disclosure relates to a method for illumination compensation for inter prediction coding (encoding and/or decoding) of a picture, comprising obtaining inter-predicted sample values (e.g. for a current block, e.g. a current coding unit (CU), of the picture) using motion compensation, obtaining or deriving values of first and second updating parameters (such as $\alpha$ and $\beta$) based on values of a first set of reference samples (such as neighboring samples) of the current block and values of a second set of reference samples (such as neighboring samples) of the reference block, and when a condition is met, clipping a value of the parameter $\alpha$ based on a value of parameter $\beta$ and updating the value of the parameter $\beta$ based on the clipped parameter $\alpha$, and generating updated predicted sample values of the current block based on the values of the clipped parameter $\alpha$ and the updated parameter $\beta$ and the inter-predicted sample values for the current block, or when the condition is not met, generating updated predicted sample values of the current block based on the values of the derived parameters $\alpha$ and $\beta$ and the inter-predicted sample values for the current block.

According to an aspect of the third embodiment, the value of the first updating parameter (such as $\alpha$) is obtained (or derived or calculated) by using a MinMax method, and the value of the second updating parameter (such as $\beta$ is obtained (or derived or calculated) by using a mean calculation.

According to a further aspect of the third embodiment, the value of the first updating parameter (such as $\alpha$) is obtained (or derived or calculated) based on a minimum value ($x_A$) and a maximum value ($x_B$) of the second set of reference samples of the reference block, and respective values ($y_A$, $y_B$) of reference samples of the first set of reference samples of the current block at corresponding positions A and B of the minimum value ($x_A$) and maximum value ($x_B$).

According to a further aspect of the third embodiment, the value of the first updating parameter (such as $\alpha$) is obtained (or derived or calculated) based on a minimum value ($x_A$) and a maximum value ($x_B$) of the second set of reference samples of the reference block, and respective values ($y_A$, $y_B$) of reference samples (such as neighboring samples) of the first set of reference samples of the current block at corresponding positions A and B relative to the position of the current block, wherein the corresponding position A of the reference sample has the minimum value and the corresponding position B of the reference sample has the maximum value relative to the position of the reference block.

According to a further aspect of the third embodiment, the value of the first updating parameter (such as $\alpha$) is obtained (or derived or calculated) based on a first averaged value of the smallest sample value (A) and the second-smallest sample value (A') of the second set of reference samples of the reference block and a second averaged value of the largest sample value (B) and the second-largest sample value (B') of the second set of neighboring samples of the reference block, and an averaged value of the reference samples (such as neighboring samples) of the first set of reference samples of the current block at the corresponding positions A and A' and an averaged value of the reference samples (such as neighboring samples) of the first set of reference samples of the current block at the corresponding positions B and B'.

According to a further aspect of the third embodiment, the value of the first updating parameter (such as $\alpha$) is obtained (or derived or calculated) based on a first averaged value of the smallest sample value (A) and the second-smallest sample value (A') of the second set of reference samples of the reference block and a second averaged value of the largest sample value (B) and the second-largest sample value (B') of the second set of reference samples (such as neighboring samples) of the reference block, and respective values ($y_A$, $y_B$) based on reference samples (such as neighboring samples) of the first set of reference samples of the current block at corresponding positions A, A', B and B' relative to the position of the current block, wherein the respective values ($y_A$, $y_B$) are an averaged value of the reference samples (such as neighboring samples) of the first set of reference samples of the current block at the corresponding positions A and A' and an averaged value of the reference samples (such as neighboring samples) of the first set of reference samples of the current block at the corresponding positions B and B'.

According to a further aspect of the third embodiment, the value of a second parameter (such as $\beta$) is obtained (or derived or calculated) based on a mean value of a first set of reference samples (such as neighboring reconstructed samples) of the current block and a mean value of $\alpha$ second set of reference samples (such as neighboring reconstructed samples) of the reference block.

According to a further aspect of the third embodiment, when a first condition is met (e.g. a first template sample range (such as width W) is larger than a second template sample range (such as height H)), a mean value of a second set of reference samples (such as neighboring reconstructed samples) of the reference block is obtained (or derived or calculated) using a first formula, when a second condition is met (e.g. a second template sample range (such as height H) is larger than a first template sample range (such as width W)), a mean value of a second set of reference samples (such as neighboring reconstructed samples) of the reference block is obtained (or derived or calculated) using a second formula, when a third condition is met (e.g. a second template sample range (such as height H) is equal to a first template sample range (such as width W)), a mean value of a second set of reference samples (such as neighboring reconstructed samples) of the reference block is obtained (or derived or calculated) using a third formula.

According to a further aspect of the third embodiment, when a first condition is met (e.g. a first template sample range (such as width W) is larger than a second template sample range (such as height H)), a mean value of a first set of reference samples (such as neighboring reconstructed samples) of the current block is obtained (or derived or calculated) using a first formula, when a second condition is met (e.g. a second template sample range (such as height H) is larger than a first template sample range (such as width W)), a mean value of a first set of reference samples (such as neighboring reconstructed samples) of the current block is obtained (or derived or calculated) using a second formula, when a third condition is met (e.g. a second template sample range (such as height H) is equal to a first template sample range (such as width W)), a mean value of a first set of reference samples (such as neighboring reconstructed samples) of the current block is obtained (or derived or calculated) using a third formula.

According to a further aspect of the third embodiment, the first set of reference samples (such as neighboring reconstructed samples) of the current block comprises a part or whole of the top and left template samples of the current block, the second set of reference samples (such as neighboring reconstructed samples) of the reference block comprises a part or whole of the top and left template samples of the reference block.

According to a further aspect of the third embodiment, the top and left template samples of the current and/or reference blocks are filtered before updating parameter derivation (or linear model parameter derivation), the first set of reference samples of the current block is filtered before updating parameter derivation (or linear model parameter derivation), and/or the second set of reference samples of the reference block is filtered before updating parameter derivation (or linear model parameter derivation).

According to a further aspect of the third embodiment, when the condition $|\beta|>T_\beta$ is true, the value of the parameter $\alpha$ is clipped as follows: when $\beta<0$, the parameter $\alpha$ is set equal to $\min(\alpha, \alpha_{max})$, and/or when $\beta>0$, the parameter $\alpha$ is set equal to $\max(\alpha, \alpha_{min})$, wherein $|\beta|$ represents the absolute value (i.e. the magnitude) of the parameter $\beta$, $T_\beta$ represents a threshold value, $\alpha_{max}$ represents the maximum value of the clipping range of $\alpha$, and $\alpha_{min}$ represents the minimum value of the clipping range of $\alpha$.

According to a further aspect of the third embodiment, the at least one of reconstructed neighboring samples above the current block and reconstructed neighboring samples left of the current block are processed by an FIR filter, and/or the at least one of reconstructed neighboring samples above the reference block and reconstructed neighboring samples left of the reference block are processed by an FIR filter.

According to a further aspect of the third embodiment, the FIR filter is applied when the current block is predicted using a non-affine (i.e. translational) motion compensation model.

According to a further aspect of the third embodiment, the value of a second parameter (such as $\beta$) is obtained (or derived or calculated) based on a mean value of a first set of reconstructed neighboring samples of the current block and a mean value of a second set of reconstructed neighboring samples of the reference block.

According to a further aspect of the third embodiment, the value of the parameter $\beta$ is obtained using a weighted sum of a mean value of a set S1 of reconstructed neighboring samples above the current block (e.g. mean above template samples, such a $Mean_{above}$) and a mean value of a set S2 of reconstructed neighboring samples left of the current block (e.g., mean left template samples, such a $Mean_{left}$), wherein a weighting coefficient w is applied to the mean value of either the set S1 or the set S2 depending on whether the width of the current block is greater than the height of the current block, and a weighted sum of a mean value of a set S1' of reconstructed neighboring samples above the reference block (e.g. mean above template samples, such a $Mean_{above}$) and a mean value of a set S2' of reconstructed neighboring samples left of the reference block (e.g., mean left template samples, such a $Mean_{left}$), wherein the weighting coefficient w is applied to the mean value of either the set S1' or the set S2' depending on whether the width of the reference block is greater than the height of the reference block.

According to a further aspect of the third embodiment, the updating the value of the parameter $\beta$ based on the clipped parameter $\alpha$, comprises deriving or re-calculating the value of the parameter $\beta$ based on the clipped parameter $\alpha$, and clipping the re-calculated value of the parameter ft.

According to a further aspect of the third embodiment, the value of the parameter $\beta$ is clipped according to whether the parameter $\alpha$ is clipped.

According to a further aspect of the third embodiment, if the parameter $\alpha$ is clipped, the value of the parameter $\beta$ is clipped, and/or if the parameter $\alpha$ was not clipped, the value of the parameter $\beta$ is not clipped.

According to a further aspect of the third embodiment, the reconstructed neighboring samples above the current block include a single row of samples which are adjacent to the current block, and/or, the reconstructed neighboring samples left of the current block include a single column of samples which are left of the current block According to a further aspect of the third embodiment, the reconstructed neighboring samples above the reference block include a single row of samples which are adjacent to the reference block, and/or, the reconstructed neighboring samples left of the reference block include a single column of samples which are left of the reference block.

According to a fourth embodiment, the disclosure relates to a method for illumination compensation for inter prediction coding (encoding and/or decoding) of a picture, comprising obtaining inter-predicted sample values (e.g. for a current block, e.g. a current CU, of the picture) using motion compensation, obtaining a minimum value ($x_A$) and a maximum value ($x_B$) of neighboring samples (e.g. from a set L of neighboring samples of a reference block, which may comprise all or only a part of all neighboring samples, the neighboring samples may be neighboring decoded samples) of a reference block (or of two or more reference blocks), and corresponding positions A (of the sample having the minimum value) and B (of the sample having the maximum value) relative to the position of the reference block, obtaining respective values of neighboring samples ($y_A$, $y_B$) (e.g. from a set C of neighboring samples of the current block which may comprise all or only a part of all neighboring samples, both sets L an C may comprise the same neighboring samples with regard to their relative position to the respective block L and C, the neighboring samples may be neighboring reconstructed samples) of the current block at the obtained positions A and B relative to the position of the current block, obtaining values of updating parameters (e.g. $\alpha$ and $\beta$) using the obtained values of neighboring samples, and when a condition is met, clipping the value of the parameter $\alpha$ based on the value of the parameter $\beta$ and updating the value of the parameter $\beta$ based on the clipped parameter $\alpha$, and generating updated predicted sample values of the current block based on the values of the clipped parameter $\alpha$ and the updated parameter $\beta$ and the inter-predicted sample values for the current block, and/or when the condition is not met, generating updated predicted sample values of the current block based on the values of the derived parameters $\alpha$ and $\beta$ and the inter-predicted sample values for the current block.

According to a fifth embodiment, the disclosure relates to a method for illumination compensation for inter prediction coding (encoding and/or decoding) of a picture, comprising obtaining inter-predicted sample values (e.g. for a current block, e.g. a current CU, of the picture) using motion compensation, obtaining a minimum value ($x_A$) and a maximum value ($x_B$) of neighboring samples (e.g. from a set L of neighboring samples of a reference block, which may comprise all or only a part of all neighboring samples, the neighboring samples may be neighboring decoded samples) of a reference block (or of two or more reference blocks), and corresponding positions A (of the sample having the minimum value) and B (of the sample having the maximum value) relative to the position of the reference block, obtaining the respective values of neighboring samples ($y_A$, $y_B$) (e.g. from a set C of neighboring samples of the current block which may comprise all or only a part of all neighboring samples, both sets L an C may comprise the same neighboring samples with regard to their relative position to the respective block L and C, the neighboring samples may be neighboring reconstructed samples) of the current block at the obtained positions A and B relative to the position of the current block, obtaining values of updating parameters (e.g. $\alpha$ and $\beta$) using the obtained values of neighboring samples, and when a condition is met, clipping the value of the parameter $\alpha$ based on the value of the parameter $\beta$, and updating (e.g. recalculating) the value of the parameter $\beta$ based on the clipped parameter $\alpha$, and generating updated predicted sample values of the current block based on the values of the clipped parameter $\alpha$ and the updated parameter $\beta$ and inter-predicted sample values for the current block, and/or when the condition is not met, clipping the value of the parameter $\beta$, and generating updated predicted sample values of the current block based on the values of the derived parameter $\alpha$ and the clipped parameter $\beta$ and inter-predicted sample values for the current block.

According to a sixth embodiment, the disclosure relates to a method for local illumination compensation for inter prediction coding, the method comprising obtaining inter-predicted sample values for a current block using motion compensation, deriving values of parameters $\alpha$ and $\beta$, based on at least one of reconstructed neighboring samples above the current block and reconstructed neighboring samples left of the current block and based on at least one of reconstructed neighboring samples above a reference block and reconstructed neighboring samples left of the reference block, wherein the reference block corresponds to the current block, and when a condition is met, clipping the value of the parameter $\alpha$ based on the value of the parameter $\beta$ and updating the value of the parameter $\beta$ based on the clipped parameter $\alpha$, and generating updated predicted sample values of the current block based on the values of the clipped parameter $\alpha$ and the updated parameter $\beta$ and the inter-predicted sample values for the current block, and/or when the condition is not met, generating updated predicted sample values of the current block based on the values of the derived parameters $\alpha$ and $\beta$ and the inter-predicted sample values for the current block.

According to an aspect of the sixth embodiment, the method further comprises determining whether an absolute value of the parameter $\beta$ is larger than a threshold value.

According to a further aspect of the sixth embodiment, when the condition $|\beta|1>T_\beta$ is true, the value of the parameter $\alpha$ is clipped as follows: when $\beta<0$, the parameter $\alpha$ is set equal to min($\alpha$, $\alpha_{max}$), and/or when $\beta3>0$, the parameter $\alpha$ is set equal to max($\alpha$, $\alpha_{min}$), wherein $|\beta|$ represents the absolute value (i.e. the magnitude) of the parameter $\beta$, $T_\beta$ represents a threshold value, $\alpha_{max}$ represents the maximum value of the clipping range of the parameter $\alpha$, and $\alpha_{min}$ represents the minimum value of the clipping range of the parameter $\alpha$.

Alternatively, the value of $\alpha_{min}$ may be set equal to $\alpha_{min}=7373$»(iShift$_{max}$−iShift). In fixed point representation, the value of $\alpha$ has a precision of iShift, which means that after multiplying by $\alpha$, the result should be right-shifted by iShift. The value of $\alpha_{min}$ may be defined with consideration of the iShift value of the input $\alpha$, and iShift$_{max}$ may be set to 13.

According to a further aspect of the sixth embodiment, the at least one of reconstructed neighboring samples above the current block and reconstructed neighboring samples left of the current block are processed by an FIR filter, and/or the at least one of reconstructed neighboring samples above the reference block and reconstructed neighboring samples left of the reference block are processed by an FIR filter.

According to a further aspect of the sixth embodiment, the FIR filter is applied when the current block is predicted using a non-affine (i.e. translational) motion compensation model.

According to a further aspect of the sixth embodiment, the value of the parameter $\beta$ is obtained (or derived or calculated) based on a mean value of a first set of reconstructed neighboring samples of the current block and a mean value of a second set of reconstructed neighboring samples of the reference block.

According to a further aspect of the sixth embodiment, the value of the parameter $\beta$ is obtained using a weighted sum of a mean value of a set S1 of reconstructed neighboring samples above the current block (e.g. mean above template samples, such a Mean$_{above}$) and a mean value of a set S2 of reconstructed neighboring samples left of the current block (e.g., mean left template samples, such a Mean$_{left}$), wherein a weighting coefficient w is applied to the mean value of either the set S1 or the set S2 depending on whether the width of the current block is greater than the height of the current block, and a weighted sum of a mean value of a set S1' of reconstructed neighboring samples above the reference block (e.g. mean above template samples, such a Mean$_{above}$) and a mean value of a set S2' of reconstructed neighboring samples left of the reference block (e.g., mean left template samples, such a Mean$_{left}$), wherein the weighting coefficient w is applied to the mean value of either the set S1' or the set S2' depending on whether the width of the reference block is greater than the height of the reference block.

According to a further aspect of the sixth embodiment, the mean value of the reconstructed neighboring samples of the current block is calculated based on the sum of available template samples of the current block (such as $S_{T1}$) and a shift offset (such as, using shift operation and multiplication), wherein the shift offset depends on the number of the available template samples of the current block (such as $C_T$).

According to a further aspect of the sixth embodiment, the mean value for the reconstructed neighboring samples of the current block is calculated as follows:

$$\text{Mean}=((S_{T1}+\text{shiftOffset})\cdot\text{mult})\gg\text{shift, and}$$

$$\text{shiftOffset}=C_T\gg 1,$$

wherein "$S_{T1}$" represents the sum of the available template samples of the current block, $C_T$ represents the number of the available template samples of the current block, and the value of a multiplier "mult" is fetched from a lookup table.

According to a further aspect of the sixth embodiment, the mean value of the reconstructed neighboring samples of the reference block is calculated based on the sum of available template samples of the reference block (such as $S_{T2}$) and a shift offset (such as, using shift operation and multiplication), wherein the shift offset depends on the number of the available template samples of the reference block (such as $C_T$).

According to a further aspect of the sixth embodiment, the mean value for the reconstructed neighboring samples of the reference block is calculated as follows:

$$\text{Mean}=((S_{T2}+\text{shiftOffset})\cdot\text{mult})\gg\text{shift, and}$$

$$\text{shiftOffset}=C_T\gg 1,$$

wherein "$S_{T2}$" represents the sum of the available template samples of the reference block, $C_T$ represents the number of the available template samples of the reference block, and the value of a multiplier "mult" is fetched from a lookup table.

According to a further aspect of the sixth embodiment, the available template samples of the current block comprise at least one of available reconstructed neighboring samples above the current block and available reconstructed neighboring samples left of the current block, and/or the available template samples of the reference block comprise at least one of available reconstructed neighboring samples above the reference block and available reconstructed neighboring samples left of the reference block.

According to a further aspect of the sixth embodiment, the updating the value of the parameter $\beta$ based on the clipped parameter $\alpha$, comprises deriving or re-calculating the value of the parameter $\beta$ based on the clipped parameter $\alpha$, and clipping the re-calculated value of the parameter $\beta$.

According to a further aspect of the sixth embodiment, the value of the parameter $\beta$ is clipped according to whether the parameter $\alpha$ is clipped.

According to a further aspect of the sixth embodiment, if the parameter $\alpha$ is clipped, the value of the parameter $\beta$ is clipped, and/or if the parameter $\alpha$ was not clipped, the value of the parameter $\beta$ is not clipped.

According to a further aspect of the sixth embodiment, the reconstructed neighboring samples above the current block include a single row of samples which are adjacent to the current block, and/or, the reconstructed neighboring samples left of the current block include a single column of samples which are left of the current block According to a further aspect of the sixth embodiment, the reconstructed neighboring samples above the reference block include a single row of samples which are adjacent to the reference block, and/or, the reconstructed neighboring samples left of the reference block include a single column of samples which are left of the reference block.

According to a further aspect of the sixth embodiment, any one of the methods according to the sixth embodiment may be implemented by an encoding device.

According to a further aspect of the sixth embodiment, any one of the methods according to the sixth embodiment may be implemented by a decoding device.

According to a further aspect of the sixth embodiment, an encoder is provided comprising processing circuitry for carrying out any one of the methods according to the sixth embodiment.

According to a further aspect of the sixth embodiment, a decoder is provided comprising processing circuitry for carrying out any one of the methods according to the sixth embodiment.

According to a further aspect of the sixth embodiment, a computer program product is provided comprising a program code for performing any one of the methods according to the sixth embodiment.

According to a further aspect of the sixth embodiment, a decoder is provided comprising one or more processors and a non-transitory computer-readable storage medium coupled to the processors and storing programming for execution by the processors, wherein the programming, when executed by the processors, configures the decoder to carry out any one of the methods according to the sixth embodiment.

According to a further aspect of the sixth embodiment, an encoder is provided comprising one or more processors and a non-transitory computer-readable storage medium coupled to the processors and storing programming for execution by the processors, wherein the programming, when executed by the processors, configures the encoder to carry out any one of the methods according to the sixth embodiment.

According to a further aspect of the sixth embodiment, a non-transitory computer-readable medium is provided carrying a program code which, when executed by a computer device, causes the computer device to perform any one of the methods according to the sixth embodiment.

According to a seventh embodiment, the disclosure relates to a method for LIC for inter prediction coding, the method comprising obtaining inter-predicted sample values for a current block using motion compensation, deriving the values of parameters $\alpha$ and $\beta$, based on at least one of reconstructed neighboring samples above the current block and reconstructed neighboring samples left of the current block and based on at least one of reconstructed neighboring samples above a reference block and reconstructed neighboring samples left of the reference block, wherein the reference block corresponds to the current block, and when a condition is met, clipping the value of the parameter $\alpha$ based on the value of the parameter $\beta$, and updating (e.g. recalculating) the value of the parameter $\beta$ based on the clipped parameter $\alpha$, and generating updated predicted sample values of the current block based on the values of the clipped parameter $\alpha$ and the updated parameter $\beta$ and inter-predicted sample values for the current block, and/or when the condition is not met, clipping the value of the parameter $\beta$, and generating updated predicted sample values of the current block based on the values of the derived parameter $\alpha$ and the clipped parameter $\beta$ and inter-predicted sample values for the current block.

According to an aspect of the seventh embodiment, when the condition $|\beta|>T_\beta$ is true, the value of the parameter $\alpha$ is clipped as follows: when $\beta<0$, the parameter $\alpha$ is set equal to min($\alpha$, $\alpha_{max}$), and/or when $\beta$>0, the parameter $\alpha$ is set equal to max($\alpha$, $\alpha_{min}$), wherein |$\beta$| represents the absolute value (i.e. the magnitude) of the parameter $\beta$, $T_\beta$ represents a threshold value, $\alpha_{max}$ represents the maximum value of the clipping range of the parameter $\alpha$, and $\alpha_{min}$ represents the minimum value of the clipping range of the parameter $\alpha$.

According to a further aspect of the seventh embodiment, the at least one of reconstructed neighboring samples above the current block and reconstructed neighboring samples left of the current block are processed by an FIR filter, and/or the at least one of reconstructed neighboring samples above the reference block and reconstructed neighboring samples left of the reference block are processed by an FIR filter.

According to a further aspect of the seventh embodiment, the FIR filter is applied when the current block is predicted using a non-affine (i.e. translational) motion compensation model.

According to a further aspect of the seventh embodiment, the value of a second parameter (such as $\beta$) is obtained (or derived or calculated) based on a mean value of a first set of reconstructed neighboring samples of the current block and a mean value of a second set of reconstructed neighboring samples of the reference block.

According to a further aspect of the seventh embodiment, the value of the parameter $\beta$ is obtained using a weighted sum of a mean value of a set S1 of reconstructed neighboring samples above the current block (e.g. mean above template samples, such a $Mean_{above}$) and a mean value of a set S2 of reconstructed neighboring samples left of the current block (e.g., mean left template samples, such a $Mean_{left}$), wherein a weighting coefficient w is applied to the mean value of either the set S1 or the set S2 depending on whether the width of the current block is greater than the height of the current block, and a weighted sum of a mean value of a set S1' of reconstructed neighboring samples above the reference block (e.g. mean above template samples, such a $Mean_{above}$) and a mean value of a set S2' of reconstructed neighboring samples left of the reference block (e.g., mean left template samples, such a $Mean_{left}$), wherein the weighting coefficient w is applied to the mean value of either the set S1' or the set S2' depending on whether the width of the reference block is greater than the height of the reference block.

According to a further aspect of the seventh embodiment, the mean value of the reconstructed neighboring samples of the current block is calculated based on the sum of available template samples of the current block (such as $S_{T1}$) and a shift offset (such as, using shift operation and multiplication), wherein the shift offset depends on the number of the available template samples of the current block (such as $C_T$).

According to a further aspect of the seventh embodiment, the mean value for the reconstructed neighboring samples of the current block is calculated as follows:

Mean=(($S_{T1}$+shiftOffset)·mult)»shift, and shiftOffset=$C_T$»1, wherein "$S_{T1}$" represents the sum of the available template samples of the current block, $C_T$ represents the number of the available template samples of the current block, and the value of a multiplier "mult" is fetched from a lookup table.

According to a further aspect of the seventh embodiment, the mean value of the reconstructed neighboring samples of the reference block is calculated based on the sum of available template samples of the reference block (such as $S_{T2}$) and a shift offset (such as, using shift operation and multiplication), wherein the shift offset depends on the number of the available template samples of the reference block (such as $C_T$).

According to a further aspect of the seventh embodiment, the mean value of the reconstructed neighboring samples of the reference block is calculated as follows:

Mean=(($S_{T2}$+shiftOffset)·mult)»shift, and shiftOffset=$C_T$»1, wherein "$S_{T2}$" represents the sum of the available template samples of the reference block, Cr represents the number of the available template samples of the reference block, and the value of a multiplier "mult" is fetched from a lookup table.

According to a further aspect of the seventh embodiment, the available template samples of the current block comprise at least one of available reconstructed neighboring samples above the current block and available reconstructed neighboring samples left of the current block, and/or the available template samples of the reference block comprise at least one of available reconstructed neighboring samples above the reference block and available reconstructed neighboring samples left of the reference block.

According to a further aspect of the seventh embodiment, the updating the value of the parameter $\beta$ based on the clipped parameter $\alpha$, comprises deriving or re-calculating the value of the parameter $\beta$ based on the clipped parameter $\alpha$, and clipping the re-calculated value of the parameter $\beta$.

According to a further aspect of the seventh embodiment, the reconstructed neighboring samples above the current block include a single row of samples which are adjacent to the current block, and/or, the reconstructed neighboring samples left of the current block include a single column of samples which are left of the current block.

According to a further aspect of the seventh embodiment, the reconstructed neighboring samples above the reference block include a single row of samples which are adjacent to the reference block, and/or the reconstructed neighboring samples left of the reference block include a single column of samples which are left of the reference block.

According to a further aspect of the seventh embodiment, any one of the methods according to the seventh embodiment may be implemented by an encoding device.

According to a further aspect of the seventh embodiment, any one of the methods according to the seventh embodiment may be implemented by a decoding device.

According to a further aspect of the seventh embodiment, an encoder is provided comprising processing circuitry for carrying out any one of the methods according to the seventh embodiment.

According to a further aspect of the seventh embodiment, a decoder is provided comprising processing circuitry for carrying out any one of the methods according to the seventh embodiment.

According to a further aspect of the seventh embodiment, a computer program product is provided comprising a program code for performing any one of the methods according to the seventh embodiment.

According to a further aspect of the seventh embodiment, a decoder is provided comprising one or more processors and a non-transitory computer-readable storage medium coupled to the processors and storing programming for execution by the processors, wherein the programming, when executed by the processors, configures the decoder to carry out any one of the methods according to the seventh embodiment.

According to a further aspect of the seventh embodiment, an encoder is provided comprising one or more processors and a non-transitory computer-readable storage medium coupled to the processors and storing programming for execution by the processors, wherein the programming, when executed by the processors, configures the encoder to carry out any one of the methods according to the seventh embodiment.

According to a further aspect of the seventh embodiment, a non-transitory computer-readable medium is provided carrying a program code which, when executed by a computer device, causes the computer device to perform any one of the methods according to the seventh embodiment.

According to an eighth embodiment, the disclosure relates to an apparatus for LIC for inter prediction coding, comprising a first obtaining unit configured for obtaining inter-predicted sample values for a current block using motion compensation, a second obtaining unit configured for deriving values of parameters $\alpha$ and $\beta$, based on at least one of reconstructed neighboring samples above the current block and reconstructed neighboring samples left of the current block and based on at least one of reconstructed neighboring samples above a reference block and reconstructed neighboring samples left of the reference block, wherein the reference block corresponds to the current block, and an updating unit configured for when a condition is met, clipping the value of the parameter $\alpha$ based on the value of the parameter $\beta$ and updating the value of the parameter $\beta$ based on the clipped parameter $\alpha$, and generating updated predicted sample values of the current block based on the values of the clipped parameter $\alpha$ and the updated parameter $\beta$ and the inter-predicted sample values for the current block, and/or when the condition is not met, generating updated predicted sample values of the current block based on the values of the derived parameters $\alpha$ and $\beta$ and the inter-predicted sample values for the current block.

According to a ninth embodiment, the disclosure relates to an apparatus for illumination compensation for inter prediction coding, comprising a first obtaining unit configured for obtaining inter-predicted sample values for a current block using motion compensation, a second obtaining unit configured for deriving values of parameters $\alpha$ and $\beta$, based on at least one of reconstructed neighboring samples above the current block and reconstructed neighboring samples left of the current block and based on at least one of reconstructed neighboring samples above a reference block and reconstructed neighboring samples left of the reference block, wherein the reference block corresponds to the current block, and an updating unit configured for when a condition is met, clipping the value of the parameter $\alpha$ based on the value of the parameter $\beta$, and updating (e.g. recalculating) the value of the parameter $\beta$ based on the clipped parameter $\alpha$, and generating updated predicted sample values of the current block based on the values of the clipped parameter $\alpha$ and the updated parameter $\beta$ and the inter-predicted sample values for the current block, and/or when the condition is not met, clipping the value of the parameter $\beta$, and generating updated predicted sample values of the current block based on the values of the derived parameter $\alpha$ and the clipped parameter $\beta$ and the inter-predicted sample values for the current block.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the disclosure are described in more detail with reference to the attached figures and drawings.

Figure 1A:
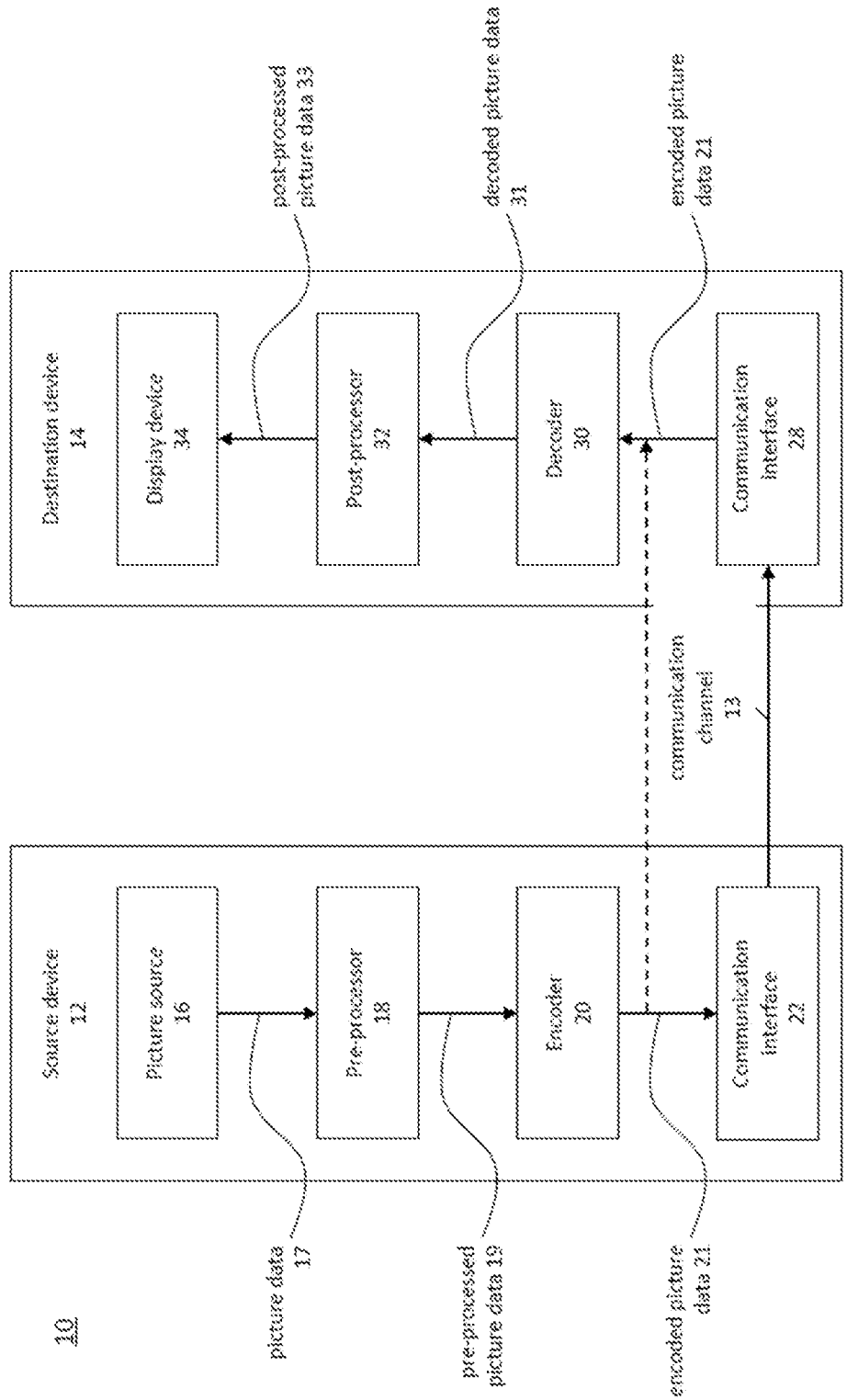
FIG. 1A is a block diagram showing an example of a video coding system configured to implement embodiments of the disclosure.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless noted otherwise.

Video coding typically refers to the processing of a sequence of pictures, which form the video or video sequence. Instead of the term "picture", the term "frame" or "image" may be used as synonyms in the field of video coding. Video coding (or coding in general) comprises two parts: video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (coding and decoding).

In case of lossless video coding, the original video pictures can be reconstructed, i.e. the reconstructed video pictures have the same quality as the original video pictures (assuming no transmission loss or other data loss occurs during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and two-dimensional (2D) transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present disclosure. Video encoder 20 (or short encoder 20) and video decoder 30 (or short decoder 30) of video coding system 10 represent examples of devices that may be configured to perform techniques in accordance with various examples described in the present disclosure.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 may be configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from red, green, and blue (RGB) to luma, blue-difference, and red-difference (YCbCr)), color correction, or de-noising. It can be understood that the pre-processing unit 18 may be an optional component.

The video encoder 20 may be configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 may be configured to receive the encoded picture data 21 (or any further processed version thereof), e.g. directly from the source device 12 or from any other source, e.g. a storage device, such as an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or as bi-directional communication interfaces, and may be configured to send and receive messages, e.g. to set up a connection, to acknowledge and exchange any other information related to the communication link and/or data transmission, such as encoded picture data transmission.

The decoder 30 may be configured to receive the encoded picture data 21 and provide decoded picture data 31 or a decoded picture 31 (further details will be described below, e.g., based on FIG. 3 or FIG. 5). The post-processor 32 of destination device 14 may be configured to post-process the decoded picture data 31 (also called reconstructed picture data), e.g. the decoded picture 31, to obtain post-processed picture data 33, such as a post-processed picture 33. The post-processing performed by the post-processing unit 32 may comprise any one or more of color format conversion (e.g. from YCbCr to RGB), color correction, trimming, or re-sampling, or any other processing, e.g. for preparing the decoded picture data 31 for display, e.g. by display device 34.

The display device 34 of the destination device 14 may be configured to receive the post-processed picture data 33 for displaying the picture, e.g. to a user or viewer. The display device 34 may be or comprise any kind of display for representing the reconstructed picture, such as an integrated or external display or monitor. The display may be a liquid-crystal display (LCDs), an organic light-emitting diode (OLED) display, a plasma display, a projector, a micro LED display, a liquid crystal on silicon (LCoS), a digital light processor (DLP) or any kind of other display.

Although FIG. 1A depicts the source device 12 and the destination device 14 as separate devices, embodiments of devices may also comprise both devices or both functionalities, i.e. the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
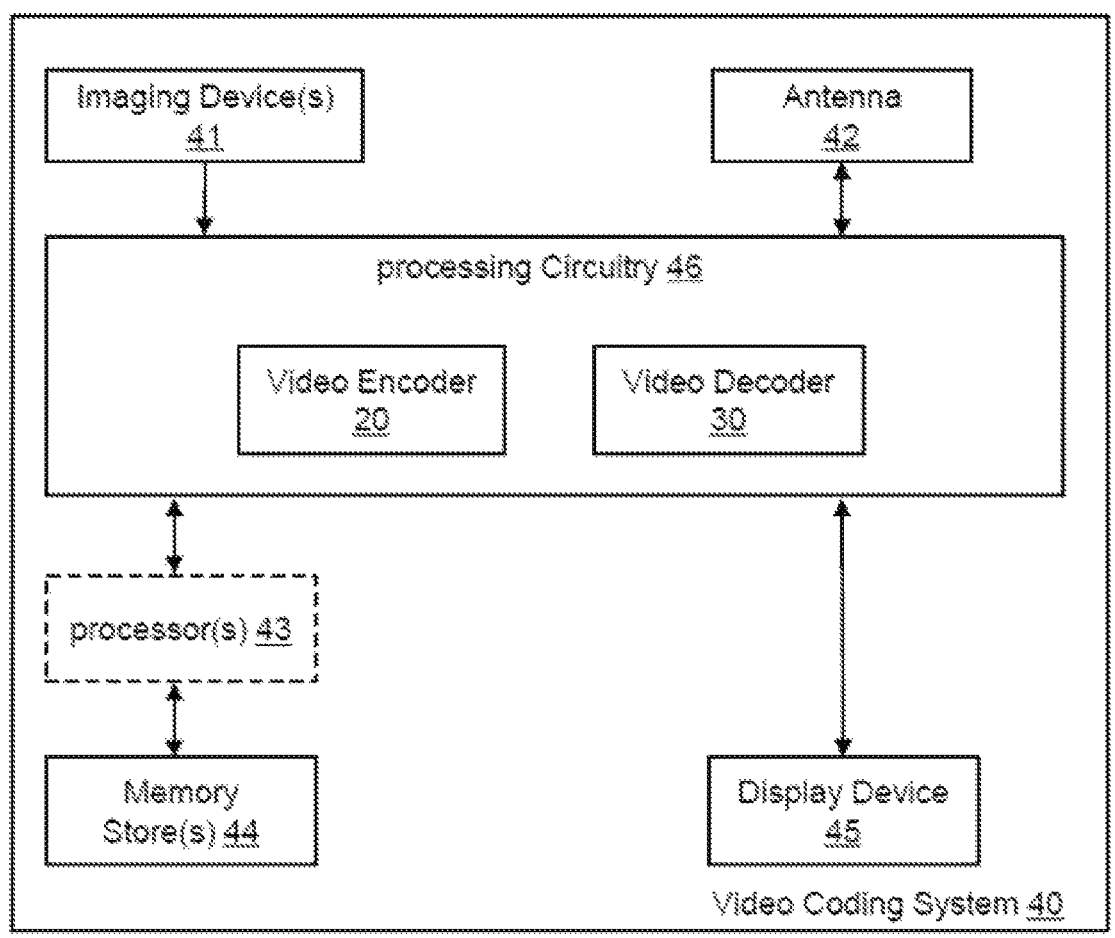
FIG. 1B is a block diagram showing another example of a video coding system configured to implement embodiments of the disclosure.

The encoder 20 (e.g. a video encoder 20) or the decoder 30 (e.g. a video decoder 30) or both, encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Video encoder 20 and video decoder 30 may be integrated as part of a combined encoder/decoder (CODEC) in a single device, for example, as shown in FIG. 1B.

The video coding system 40 shown in FIG. 1B comprises a processing circuitry implementing both a video encoder 20 and a video decoder 30. In addition, one or more imaging devices 41, such as a camera for capturing real-world pictures, an antenna 42, one or more memory stores 44, one or more processors 43 and/or a display device 45, such the display device 34 described above, may be provided as part of the video coding system 40.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver devices, broadcast transmitter devices, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present disclosure may apply to video coding systems (e.g., video encoding or video decoding) that do not necessarily include any data communication between the encoding and decoding devices. In other examples, data is retrieved from a local memory, streamed over a network, or the like. A video encoding device may encode and store data in memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of VVC, the next generation video coding standard developed by the Joint Collaboration Team on Video Coding (JCT-VC) of International Telecommunication Union (ITU) Telecommunication Standardization Sector (ITU-T) Video Coding Experts Group (VCEG) and International Organization for Standardization (ISO)/International Electrotechnical Commission (IEC) Motion Picture Experts Group (MPEG). One of ordinary skill in the art will understand that embodiments of the disclosure are not limited to HEVC or VVC.

Figure 2:
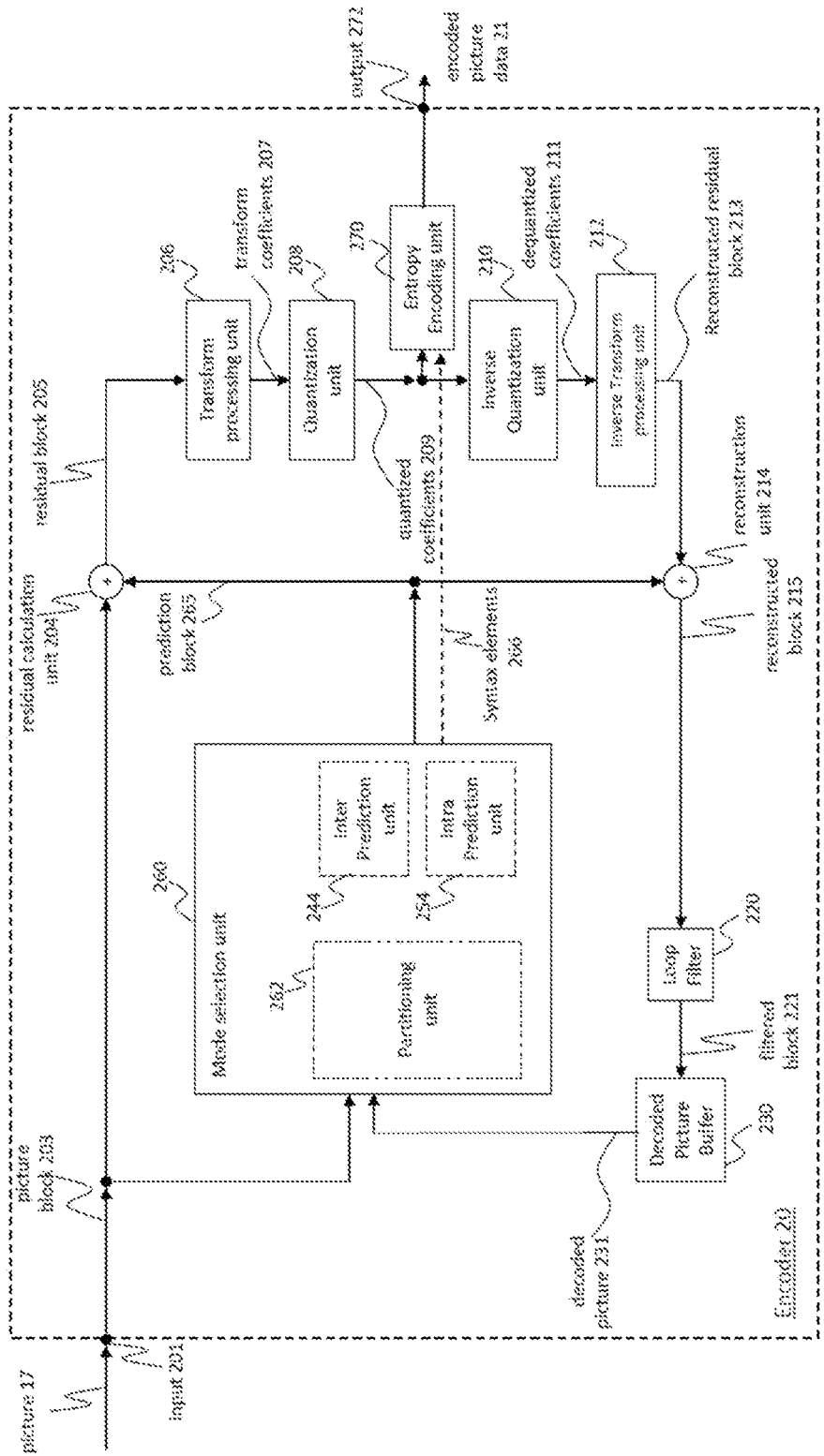
FIG. 2 is a block diagram showing an example of a video encoder configured to implement embodiments of the disclosure.

Encoder and Encoding Method:

FIG. 2 shows a schematic block diagram of an example video encoder 20 that is configured to implement the techniques of the present disclosure. In the example of FIG. 2, the video encoder 20 comprises an input 201 (or input interface 201), a residual calculation unit 204, a transform processing unit 206, a quantization unit 208, an inverse quantization unit 210, and an inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. The inter prediction unit 244 may include a motion estimation unit and a motion compensation unit (not shown). A video encoder 20 as shown in FIG. 2 may also be referred to as a hybrid video encoder or a video encoder according to a hybrid video codec.

Figure 3:
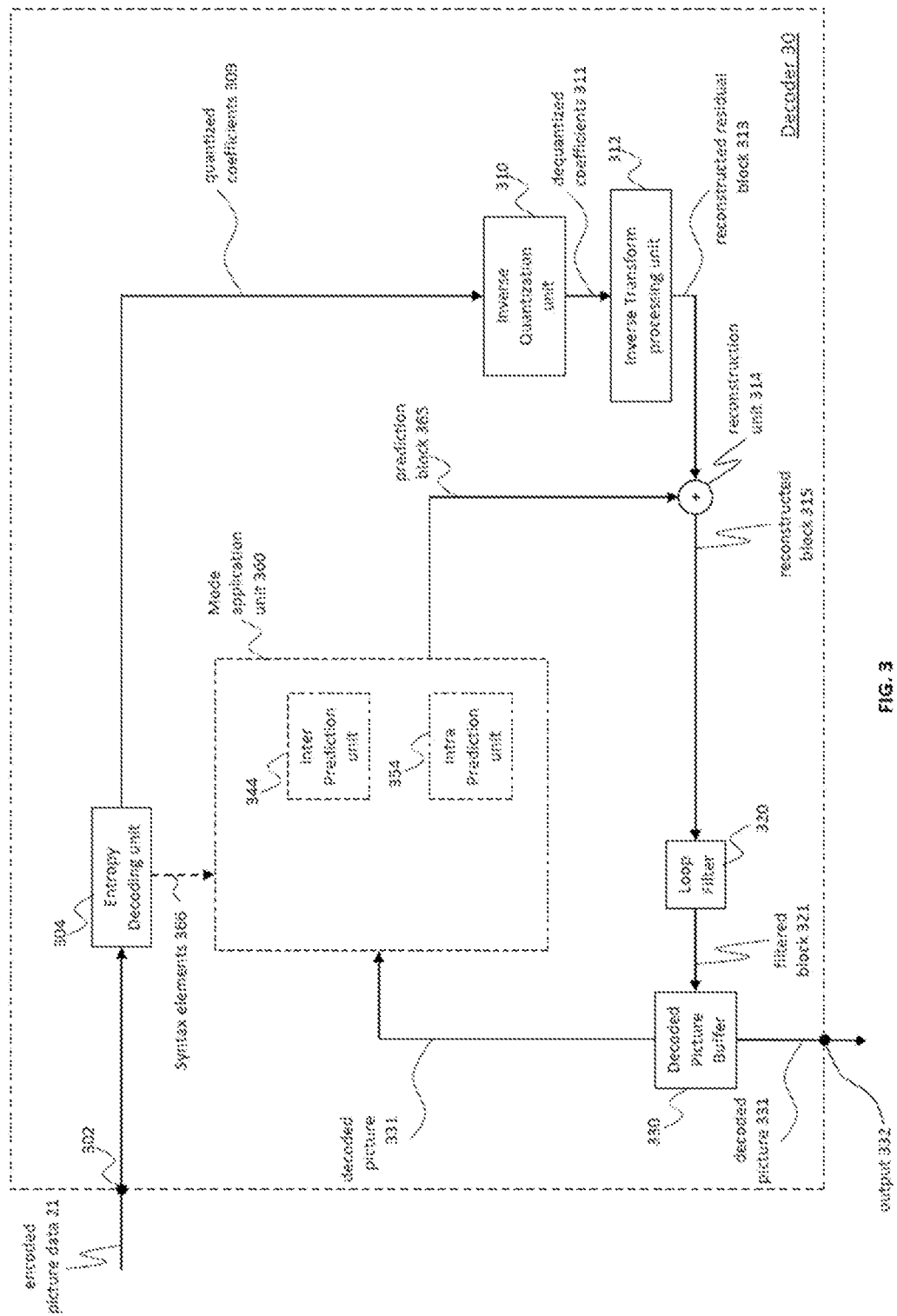
FIG. 3 is a block diagram showing an example structure of a video decoder configured to implement embodiments of the disclosure.

The residual calculation unit 204, the transform processing unit 206, the quantization unit 208, and the mode selection unit 260 may be referred to as forming a forward signal path of the encoder 20, whereas the inverse quantization unit 210, the inverse transform processing unit 212, the reconstruction unit 214, the loop filter 220, the DPB 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the DPB 230, the inter prediction unit 244 and the intra-prediction unit 254 are also referred to forming the "built-in decoder" of video encoder 20.

Pictures & Picture Partitioning (Pictures & Blocks):

The encoder 20 may be configured to receive, e.g. via input 201, a picture 17 (or picture data 17), e.g. a picture of a sequence of pictures forming a video or video sequence. The received picture or picture data may also be a pre-processed picture 19 (or pre-processed picture data 19). For the sake of simplicity the following description refers to the picture 17. The picture 17 may also be referred to as a current picture or a picture to be coded (in particular, in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in the horizontal and vertical direction (or axis) of the array or picture defines the size and/or resolution of the picture. For representation of color, typically three color components are employed, i.e. the picture may be represented as or include three sample arrays. In RBG format or color space, a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa. The process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/Advanced Video Coding (AVC)) or coding tree blocks (CTBs) or coding tree units (CTUs) (according to H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in the horizontal and vertical direction (or axis) of the block 203 defines the size of the block 203. Accordingly, a block may, for example, comprise an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs).

Embodiments of the video encoder 20 as shown in FIG. 2 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise one or more blocks (e.g. CTUs) or one or more tiles, wherein each tile may be of rectangular shape and may comprise one or more blocks (e.g. CTUs), e.g. complete or fractional blocks.

Residual Calculation:

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform:

The transform processing unit 206 may be configured to apply a transform, such as a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively, the transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization:

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit transform coefficient during quantization, where n is greater than m. The degree of quantization may be modified by adjusting a quantization parameter (QP). For example for scalar quantization, different scalings may be applied to achieve finer or coarser quantization. Smaller quantization step sizes correspond to finer quantization, whereas larger quantization step sizes correspond to coarser quantization. The applicable quantization step size may be indicated by a QP. The quantization parameter may, for example, be an index of a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one exemplary implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively, the quantization unit 208) may be configured to output QPs, e.g. directly or encoded via the entropy encoding unit 270, so that, e.g., the video decoder 30 may receive and apply the quantization parameters for decoding.

Inverse Quantization:

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform:

The inverse transform processing unit 212 is configured to apply the inverse transform of the transform applied by the transform processing unit 206, e.g. an inverse DCT or inverse DST or other inverse transforms, to obtain a reconstructed residual block 213 (or corresponding dequantized coefficients 213) in the sample domain. The reconstructed residual block 213 may also be referred to as a transform block 213.

Reconstruction:

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering:

The loop filter unit 220 (or short "loop filter" 220), is configured to filter the reconstructed block 215 to obtain a filtered block 221, or in general, to filter reconstructed samples to obtain filtered samples. The loop filter unit may be configured to smooth pixel transitions, or otherwise improve the video quality. The loop filter unit 220 may comprise one or more loop filters such as a de-blocking filter, a sample-adaptive offset (SAO) filter or one or more other filters, such as a bilateral filter, an adaptive loop filter (ALF), a sharpening, a smoothing filter or a collaborative filter, or any combination thereof. Although the loop filter unit 220 is shown in FIG. 2 as being an in-loop filter, in other configurations, the loop filter unit 220 may be implemented as a post loop filter. The filtered block 221 may also be referred to as a filtered reconstructed block 221.

Embodiments of the video encoder 20 (respectively, the loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

DPB:

The DPB 230 may be a memory that stores reference pictures, or in general reference picture data, for encoding video data by video encoder 20. The DPB 230 may be formed by any of a variety of memory devices, such as dynamic random-access memory (RAM) (DRAM), including synchronous DRAM (SDRAM), magnetoresistive RAM (MRAM), resistive RAM (RRAM), or other types of memory devices. The DPB 230 may be configured to store one or more filtered blocks 221. The DPB 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The DPB 230 may also be configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, such as an original block 203 (current block 203 of the current picture 17), and reconstructed picture data, such as filtered and/or unfiltered reconstructed samples or blocks of the same (current) picture and/or from one or a plurality of previously decoded pictures, e.g. from DPB 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra- or inter-prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which again form blocks), e.g. iteratively using quad-tree-partitioning (QT), binary-tree partitioning (BT) or triple-tree-partitioning (TT) or any combination thereof, and to perform the prediction for each of the block partitions or sub-blocks, wherein the mode selection comprises the selection of the tree-structure of the partitioned block 203 and the prediction modes are applied to each of the block partitions or sub-blocks.

In the following, the partitioning (e.g. by partitioning unit 262) and prediction processing (by inter-prediction unit 244 and intra-prediction unit 254) performed by an example video encoder 20 will be explained in more detail.

Partitioning:

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to as tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as a binary-tree (BT), a tree using partitioning into three partitions is referred to as a ternary-tree (TT), and a tree using partitioning into four partitions is referred to as a quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), a prediction unit (PU), or a transform unit (TU) and/or to the corresponding blocks, e.g. a coding tree block (CTB), a coding block (CB), a transform block (TB) or a prediction block (PB).

For example, a coding tree unit (CTU) may be or comprise a CTB of luma samples and two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples and two corresponding coding blocks of chroma samples of a picture that has three sample arrays, or a coding block of samples of a monochrome picture or a picture that is coded using three separate colour planes and syntax structures used to code the samples. Correspondingly, a coding block (CB) may be an M×N block of samples for some values of M and N such that the division of a CTB into coding blocks is a partitioning.

In some embodiments, e.g., according to HEVC, a coding tree unit (CTU) may be split into CUs by using a quad-tree structure denoted as a coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quad-tree structure similar to the coding tree for the CU.

In embodiments, e.g., according to the latest video coding standard currently in development, which is referred to as VVC, a combined quad-tree and binary-tree (QTBT) partitioning is for example used to partition a coding block. In the QTBT block structure, a CU can have either a square or rectangular shape. For example, a coding tree unit (CTU) is first partitioned by a quad-tree structure. The quad-tree leaf nodes are further partitioned by a binary-tree or ternary (or triple)-tree structure. The partitioning tree leaf nodes are called coding units (CUs), and that partition is used for prediction and transform processing without any further partitioning. This means that the CU, PU and TU have the same block size in the QTBT coding block structure. In parallel, multiple partitions, for example, triple-tree partition may be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise intra-prediction modes and/or inter-prediction modes.

Intra-Prediction:

The set of intra-prediction modes may comprise 35 different intra-prediction modes, such as non-directional modes like DC (or mean) mode and planar mode, or directional modes, e.g. as defined in HEVC, or may comprise 67 different intra-prediction modes, such as non-directional modes like DC (or mean) mode and planar mode, or directional modes, e.g. as defined for VVC.

The intra-prediction unit 254 is configured to use reconstructed samples of neighboring blocks of the same current picture to generate an (intra-)prediction block 265 according to an intra-prediction mode from the set of intra-prediction modes.

The intra-prediction unit 254 (or in general the mode selection unit 260) may be further configured to output intra-prediction parameters (or in general information indicative of the selected intra-prediction mode for the block) to the entropy encoding unit 270 in the form of syntax elements 266 for inclusion into the encoded picture data 21, so that, e.g., the video decoder 30 may receive and use the prediction parameters for decoding.

Inter-Prediction:

The set of (or possible) inter-prediction modes depends on the available reference pictures (i.e. previous, at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, such as half/semi-pel and/or quarter-pel interpolation, or not.

In addition to the above prediction modes, skip mode and/or direct mode may be applied.

The inter-prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, such as reconstructed blocks of one or a plurality of previously decoded pictures 231, for motion estimation. By way of example, a video sequence may comprise the current picture and the previously decoded pictures 231, or in other words, the current picture and the previously decoded pictures 231 may be part of or form a sequence of pictures forming a video sequence.

As will be described below in more detail, the disclosure proposes to use a MinMax method to derive linear model parameters for LIC. LIC is one of the techniques for improving motion compensation in VVC. LIC is applied to the results of the motion compensation, or in general to the results of the inter prediction. LIC comprises adjusting predicted samples by multiplying the predicted samples (respectively the values of the samples) with a first parameter α (respectively with a value of the first parameter α) and adding a second parameter β (respectively a value of the second parameter β). The parameters α and β are derived from neighboring samples of the current block and the reference block using.

The encoder 20 may be configured to select a reference block from a plurality of reference blocks of the same or different pictures of the plurality of previously decoded pictures and provide a reference picture (or reference picture index) and/or an offset (spatial offset) between the position (x, y coordinates) of the reference block and the position of the current block as inter-prediction parameters to the motion estimation unit. This offset is also called motion vector (MV).

The motion compensation unit may be configured to obtain, e.g. receive, an inter-prediction parameter and to perform inter-prediction based on or using the inter-prediction parameter to obtain an (inter-)prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding:

The entropy encoding unit 270 is configured to apply, for example, an entropy encoding algorithm or scheme (e.g. a variable length coding (VLC) scheme, a context adaptive VLC scheme (CAVLC), an arithmetic coding scheme, a binarization, a context adaptive binary arithmetic coding (CABAC), syntax-based CABAC (SBAC), probability interval partitioning entropy (PIPE) coding or another entropy encoding methodology or technique) or bypass (no compression) on the quantized coefficients 209, inter-prediction parameters, intra-prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method:

FIG. 3 shows an example of a video decoder 30 that is configured to implement the techniques of the present disclosure. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile group or tile) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a DBP 330, a mode application unit 360, an inter-prediction unit 344 and an intra-prediction unit 354. Inter-prediction unit 344 may be or include a motion compensation unit. Video decoder 30 may, in some examples, perform a decoding pass generally reciprocal to the encoding pass described with respect to video encoder 20 of FIG. 2.

As explained with regard to the encoder 20, the inverse quantization unit 210, the inverse transform processing unit 212, the reconstruction unit 214, the loop filter 220, the DPB 230, the inter-prediction unit 244 and the intra-prediction unit 254 are also referred to as forming the "built-in decoder" of video encoder 20. Accordingly, the inverse quantization unit 310 may be identical in function to the inverse quantization unit 210, the inverse transform processing unit 312 may be identical in function to the inverse transform processing unit 212, the reconstruction unit 314 may be identical in function to reconstruction unit 214, the loop filter 320 may be identical in function to the loop filter 220, and the DPB 330 may be identical in function to the DPB 230. Therefore, the explanations provided for the respective units and functions of the video 20 encoder apply correspondingly to the respective units and functions of the video decoder 30.

Entropy Decoding:

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters 366, such as any or all of inter-prediction parameters (e.g. reference picture index and motion vector), intra-prediction parameters (e.g. intra-prediction mode or index), transform parameters, quantization parameters, loop filter parameters, and/or other syntax elements. Entropy decoding unit 304 may be configured to apply the decoding algorithms or schemes corresponding to the encoding schemes as described with regard to the entropy encoding unit 270 of the encoder 20. Entropy decoding unit 304 may be further configured to provide inter-prediction parameters, intra-prediction parameters and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization:

The inverse quantization unit 310 may be configured to receive quantization parameters (QP) (or in general, information related to the inverse quantization) and quantized coefficients from the encoded picture data 21 (e.g. by parsing and/or decoding, e.g. by entropy decoding unit 304) and to apply, based on the quantization parameters, an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform:

Inverse transform processing unit 312 may be configured to receive dequantized coefficients 311, also referred to as transform coefficients 311, and to apply a transform to the dequantized coefficients 311 in order to obtain reconstructed residual blocks 313 in the sample domain. The reconstructed residual blocks 313 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction:

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering:

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filter or a collaborative filter, or any combination thereof. Although the loop filter unit 320 is shown in FIG. 3 as being an in-loop filter, in other configurations, the loop filter unit 320 may be implemented as a post loop filter.

DPB:

The decoded video blocks 321 of a picture are then stored in the DPB 330, which stores the decoded pictures 331 as reference pictures for subsequent motion compensation for other pictures and/or for output or respectively display.

The decoder 30 is configured to output the decoded picture 311, e.g. via output 312, for presentation or viewing to a user.

Prediction:

The inter-prediction unit 344 may be identical to the inter-prediction unit 244 (in particular, to the motion compensation unit) and the intra-prediction unit 354 may be identical to the intra-prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra- or inter-prediction) per block based on reconstructed pictures, blocks or respective samples (filtered or unfiltered) to obtain the prediction block 365.

When the video slice or picture is coded as an intra-coded (I) slice, intra-prediction unit 354 of mode application unit 360 is configured to generate prediction block 365 for a picture block of the current video slice based on a signaled intra-prediction mode and data from previously decoded blocks of the current picture. When the video slice or picture is coded as an inter-coded (i.e., B, or P) slice, inter-prediction unit 344 (e.g. motion compensation unit) of mode application unit 360 is configured to produce prediction block 365 for a video block of the current video slice based on the motion vectors and other syntax elements received from entropy decoding unit 304. For inter-prediction, the prediction blocks may be produced from one of the reference pictures within one of the reference picture lists. Video decoder 30 may construct the reference picture lists, List 0 and List 1, using default construction techniques based on reference pictures stored in DPB 330. The same or similar approach may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video/picture block of the current video slice by parsing the motion vectors or related information and other syntax elements, and use the prediction information to produce the prediction blocks for the current video block being decoded. For example, the mode application unit 360 uses some of the received syntax elements to determine a prediction mode (e.g., intra- or inter-prediction) used to code the video blocks of the video slice, an inter-prediction slice type (e.g., B slice, P slice, or generalized P/B (GPB) slice), construction information for one or more of the reference picture lists for the slice, motion vectors for each inter-coded video block of the slice, inter-prediction status for each inter-coded video block of the slice, and other information to decode the video blocks in the current video slice. The same or similar approach may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 3 may be configured to partition and/or decode the picture by using tile groups (or video tile groups) and/or tiles (or video tiles), wherein a picture may be partitioned into or decoded using one or more tile groups (typically non-overlapping), and each tile group may comprise one or more blocks (e.g. CTUs) or one or more tiles, wherein each tile may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of the current block (including but not limited to control point motion vectors of affine mode, sub-block motion vectors in affine, planar, ATMVP modes, temporal motion vectors, and so on). For example, the value of α motion vector is constrained to a predefined range according to its representing bit number. If the representing bit number of the motion vector is bitDepth, then the range is $-2\hat{\ }(bitDepth-1) \sim 2\hat{\ }(bitDepth-1)-1$, where "^" means exponentiation. For example, if bitDepth is set equal to 16, the range is $-32768 \sim 32767$, if bitDepth is set equal to 18, the range is $-131072 \sim 131071$. For example, the value of the derived motion vector (e.g. the MVs of four 4×4 sub-blocks within one 8×8 block) is constrained such that the maximum difference between integer parts of the four 4×4 sub-block MVs is no more than N pixels, such as no more than 1 pixel. The following description provides two methods for constraining the motion vector according to the bitDepth.

Method 1: remove the overflow MSB (most significant bit) by the following operations:

$$ux = (mvx + 2^{bitDepth}) \% 2^{bitDepth}, \quad (1)$$

$$mvx = (ux >= 2^{bitDepth-1})?(ux - 2^{bitDepth}):ux, \quad (2)$$

$$uy = (mvy + 2^{bitDepth}) \% 2^{bitDepth}, \text{ and} \quad (3)$$

$$mvy = (uy >= 2^{bitDepth-1})?(uy - 2^{bitDepth}):uy, \quad (4)$$

where mvx is a horizontal component of a motion vector of an image block or a sub-block, mvy is a vertical component of a motion vector of an image block or a sub-block, and ux and uy indicate respective intermediate values.

For example, if the value of mvx is −32769, after applying formulae (1) and (2), the resulting value is 32767. In a computer system, decimal numbers are stored as two's complements. The two's complement of −32769 is 1,0111, 1111,1111,1111 (17 bits). Then, the MSB is discarded, so the resulting two's complement is 0111,1111,1111,1111 (decimal number is 32767), which is the same as the output by applying formulae (1) and (2).

$$ux = (mvpx + mvdx + 2^{bitDepth}) \% 2^{bitDepth}, \quad (5)$$

$$mvx = (ux >= 2^{bitDepth-1})?(ux - 2^{bitDepth}):ux, \quad (6)$$

$$uy = (mvpy + mvdy + 2^{bitDepth}) \% 2^{bitDepth}, \text{ and} \quad (7)$$

$$mvy = (uy >= 2^{bitDepth-1})?(uy - 2^{bitDepth}):uy, \quad (8)$$

The operations may be applied during the sum of the motion vector predictor mvp and the motion vector difference mvd, as shown in formulae (5) to (8).

Method 2: remove the overflow MSB by clipping the value:

$$vx = Clip3(-2^{bitDepth-1}, 2^{bitDepth-1}-1, vx), \text{ and}$$

$$vy = Clip3(-2^{bitDepth-1}, 2^{bitDepth-1}-1, vy),$$

where vx is a horizontal component of a motion vector of an image block or a sub-block, vy is a vertical component of a motion vector of an image block or a sub-block, x, y and z respectively correspond to three input values of the MV clipping process, and the definition of the function Clip3 is as follows:

$$\text{Clip3}(x, y, z) = \begin{cases} x; & z < x \\ y; & z > y \\ z; & \text{otherwise} \end{cases}.$$

Figure 4:
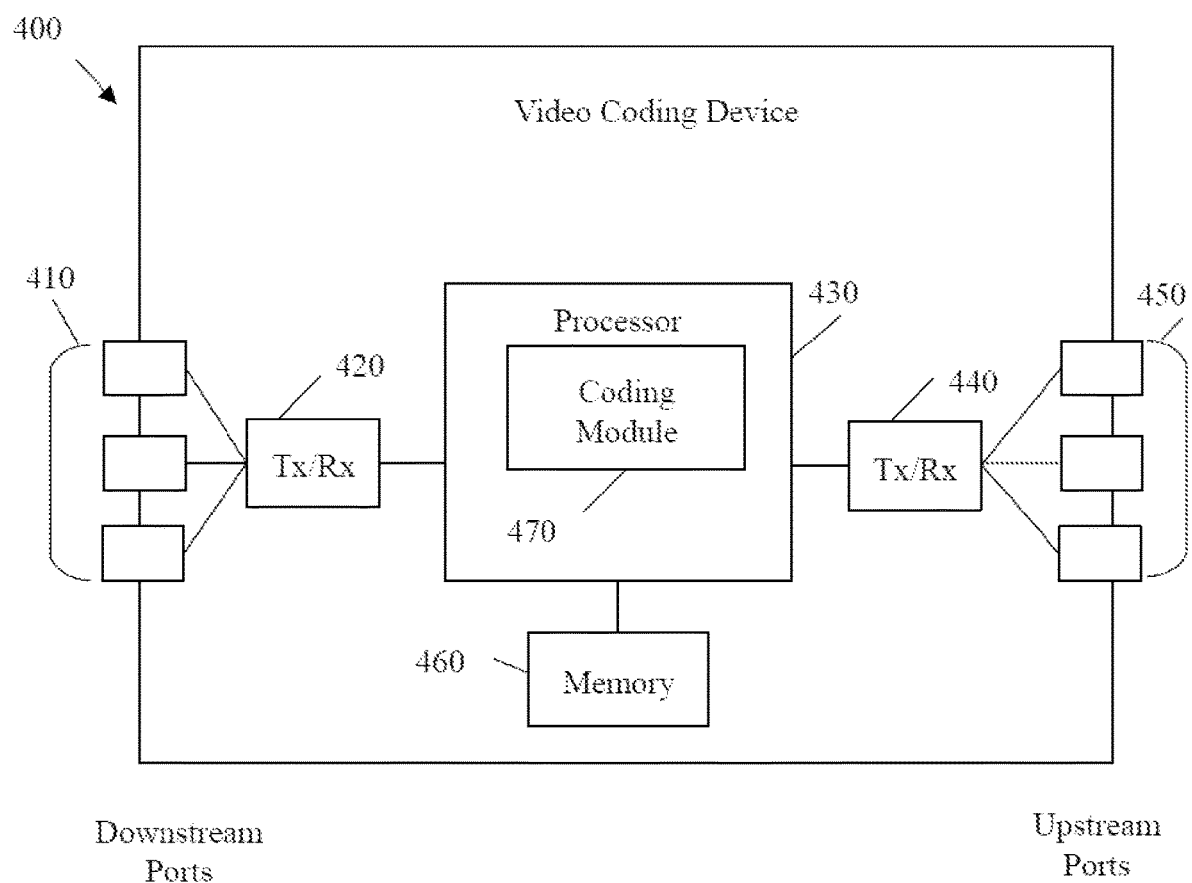
FIG. 4 is a block diagram illustrating an example of an encoding apparatus or a decoding apparatus.

FIG. 4 is a schematic diagram of a video coding device 400 according to an embodiment of the present disclosure. The video coding device 400 is suitable for implementing the disclosed embodiments as described below. In an embodiment, the video coding device 400 may be a decoder such as video decoder 30 of FIG. 1A or an encoder such as video encoder 20 of FIG. 1A.

The video coding device 400 may comprise ingress ports 410 (or input ports 410) and one or more receiver units (Rx) 420 for receiving data, a processor, logic unit, or central processing unit (CPU) 430 to process the data, one or more transmitter units (Tx) 440 and egress ports 450 (or output ports 450) for transmitting the data, and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 may be implemented by hardware and software. The processor 430 may be implemented as one or more CPU chips, cores (e.g., as a multi-core processor), FPGAs, ASICs, and DSPs. The processor 430 may be in communication with the ingress ports 410, the receiver units 420, the transmitter units 440, egress ports 450, and the memory 460. The processor 430 may comprise a coding module 470. The coding module 470 implements the disclosed embodiments described above and below. For instance, the coding module 470 may implement, process, prepare, or provide the various coding operations. The inclusion of the coding module 470 therefore provides a substantial improvement to the functionality of the video coding device 400 and effects a transformation of the video coding device 400 to a different state. Alternatively, the coding module 470 may be implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), RAM, ternary content-addressable memory (TCAM), and/or static random-access memory (SRAM).

Figure 5:
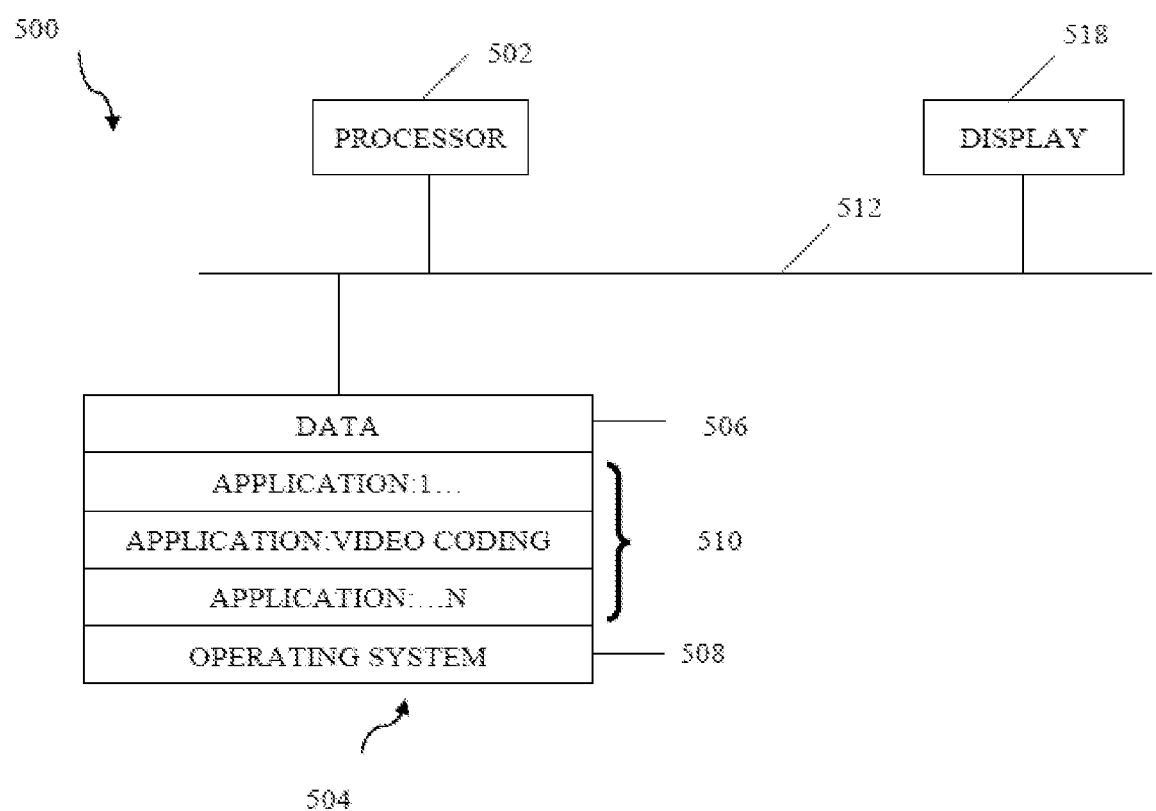
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1A according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a ROM device or a RAM device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described herein. For example, the application programs 510 can include applications 1 through N, which further include a video coding application that performs the methods described herein.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, a secondary storage (not shown) can be directly coupled to the other components of the apparatus 500 or can be accessed via a network and can comprise a single integrated unit such as a memory card or multiple units such as multiple memory cards. The apparatus 500 can thus be implemented in a wide variety of configurations The following describes concepts presented herein in more detail:

LIC is one of the techniques for improving motion compensation. LIC is applied to the results of the motion compensation, or in general to the results of the inter prediction (e.g. performed by an inter-prediction unit 244 of an encoder 20 as shown in FIG. 2 and/or by an inter-prediction unit 344 of a decoder 30 as shown in FIG. 3).

LIC comprises adjusting predicted samples by multiplying the predicted samples (respectively the values of the samples) with a first parameter α (respectively with a value of the first parameter α) and adding a second parameter β (respectively a value of the second parameter β). The parameters α and β t are derived from neighboring samples of the current block and the reference block using a least mean squares method. The parameters α and β can be derived with a subset or subsets of reference samples, e.g. as shown in FIG. 6.

Figure 6:
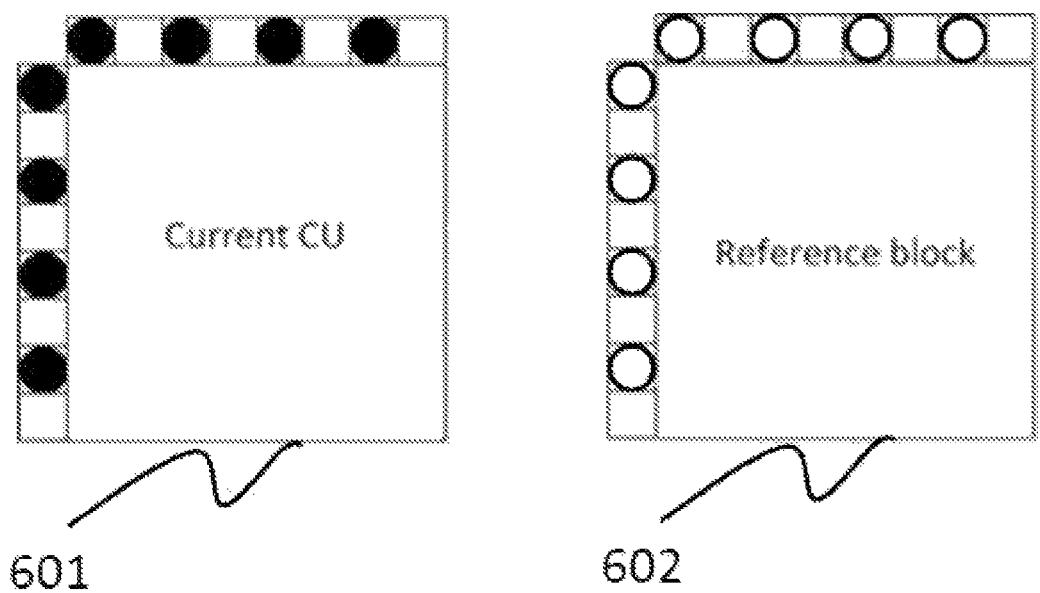
FIG. 6 is an illustration of reference samples used as input data for an illumination compensation method according to an embodiment of the disclosure.

FIG. 6 shows on the left hand side a current block 601 (e.g. a current CU) and reference samples (such as neighboring samples) as filled black circles. The reference samples, such as neighboring samples are, e.g., samples adjacent to a left border (or boundary) and a top border of the current block and may belong, e.g., to previously reconstructed neighboring blocks of the current block. FIG. 6 shows on the right hand side a reference block, e.g. the reference block used for inter-prediction of the current block, and reference samples (such as neighboring samples) of the reference block as empty circles. The reference samples, such as neighboring samples of the reference block may be, e.g. samples adjacent to a left border and a top border of the reference block 602. In one implementation, the neighboring samples of the reference block 602 have the same relative position with regard to the reference block as the neighboring samples of the current block. In other words, the (relative) positions of the neighboring samples of the reference block and the current block match. FIG. 6 shows reference samples for the current and reference block after downsampling as described further below with reference to FIG. 11. The present disclosure is, however, not limited to downsampled reference samples, but may include all samples adjacent to left border and/or the top border of the block.

The neighboring samples of the reference block 602 are, for example, decoded samples (e.g. from a decoded picture 231, 331 stored in the DPB 230, 330, e.g. after in-loop filtering and deblocking) at the positions that are adjacent to a left border and a top border of the reference block 602. The neighboring samples of the current block 601 are, for example, reconstructed samples (e.g. of a reconstructed neighboring block 215, 315, e.g. prior to in-loop filtering and deblocking) at the positions that are adjacent to a left border and a top border of the current block 601.

The present disclosure provides methods and devices for reducing latency and complexity of linear model parameter derivation as compared to conventional cross-correlation based LIC methods and for improving coding efficiency as compared to the MinMax method without linear model parameters conditional clipping. The proposed methods and devices use a Min/Max method with an interdependence between LIC parameters. Conditional clipping of MinMax parameters is added and averaged values are used when calculating the value of β.

When a block is coded with merge mode, an LIC flag is copied, e.g. from neighboring blocks of the current block, in a way similar to motion information copy in merge mode. Otherwise, an LIC flag is signaled for the block to indicate whether LIC is to be applied or not.

At the encoder side, when LIC is enabled for a block, a mean-removed sum of absolute difference (MR-SAD) and/or a mean-removed sum of absolute Hadamard-transformed difference (MR-SATD) can be used to estimate a distortion, instead of SAD for integer pel motion search and SATD for fractional pel motion search, respectively (e.g. MR-SAD for integer and MR-SATD for fractional pel motion search).

However, a least mean squared (LMS) error computation may increase the latency value. Further, the following formula:

$$\alpha = \frac{N \cdot \sum(L(n) \cdot C(n)) - \sum L(n) \cdot \sum C(n)}{N \cdot \sum(L(n) \cdot L(n)) - \sum L(n) \cdot \sum L(n)}, \text{ and} \quad (1)$$

$$\beta = \frac{\sum C(n) - \alpha \cdot \sum L(n)}{N}, \quad (2)$$

where N is the number of samples, C(n) are neighboring reconstructed samples of the current block (e.g. top and/or left neighboring samples as shown in FIG. 6) and L(n) are neighboring reconstructed samples of the reference block (e.g. top and/or left neighboring samples as shown in FIG. 6).

In an exemplary implementation, C is a set of neighboring samples of the current block and L is a set of neighboring samples (e.g. top and/or left neighboring samples as shown in FIG. 6) of the reference block (i.e. a block that is used as an input for motion compensation and is referenced by a motion vector).

When deriving the parameter α the mean values can be removed from both sets: the set C and set L. In this case, parameter β is further calculated with consideration of the differences between mean values of L and C.

A similar approach is used in CCLM prediction, but the linear parameters are used not to update the values of the inter-predicted block (e.g. the values of the inter-predicted samples for the current block), but to derive the values of chroma predicted samples from the values of luma predicted samples.

Equations (1) and (2) require a significant amount of operations that result in increased hardware complexity. Besides, the number of summations that can be performed in parallel is limited, and N summands can only be calculated using a minimum of $[\log_2 (N)]$ sequential operation steps.

Since LIC is performed directly after motion compensation, the number of sequential steps for the parameter derivation may be critical, because the coding of other intra coded blocks may depend on the current inter coded block (e.g. for combined intra inter prediction, adaptive loop filter, etc.). In other words, the current inter coded block must first be reconstructed before the intra coded blocks can be processed (e.g. decoded), wherein the current block can only be reconstructed from the predicted samples after the parameter derivation is complete.

Embodiments of the disclosure may be configured to derive parameters $\alpha$ and $\beta$ using minimum and maximum values within a set of neighboring samples of the reference block, referred to as set L, as well as the corresponding positions of these maximum and minimum values within this set L. A set of neighboring samples of the current block is referred to as set C. In embodiments of the disclosure, the positions of the neighboring samples in the two neighboring sample sets C and L may match, i.e. may be identical.

In this case, the number of operations can be decreased significantly compared to the LMS method.

Thus, embodiments of the disclosure provide a simplified derivation of the parameters $\alpha$ and $\beta$, and accordingly a simplified LIC.

Embodiments may, for example, comprise the following steps obtaining inter-predicted sample values (e.g. for a current block, e.g. a current CU, of the picture) using motion compensation (these inter-predicted sample values may also be referred to as original, intermediate or uncompensated predictor or prediction block sample values, see e.g. reference signs 265, 365 in FIGS. 2 and 3), obtaining a minimum value $x_A$ (e.g. minimum reference or neighboring value) and a maximum value $x_B$ (e.g. maximum reference or neighboring value) from the set of values L derived from the neighboring samples of at least one reference block (e.g. of only one reference block in case of uni-prediction, or of two reference blocks, e.g. in case of bi-prediction, or of even more reference blocks), and corresponding positions A and B, wherein A represents the position of the neighboring sample having the minimum value $x_A$ and B represents the position of the neighboring sample having the maximum value $x_B$ (positions A and B can also be referred to as relative positions as they represent a position of a neighbor sample relative to the position of the respective block, e.g. the current and the reference block), obtaining the values of neighboring samples of the current block at the obtained positions A and B, referred to as $y_A$ and $y_B$, respectively, obtaining the values of parameters $\alpha$ and $\beta$ using the obtained values of neighboring samples, e.g. by the following equations:

$$\alpha = \frac{y_B - y_A}{x_B - x_A}$$

$$\beta = y_A - \alpha x_A, \text{ and}$$

applying the calculated values of parameters $\alpha$ and $\beta$ to get updated values of the inter-predicted samples, e.g. by the following equation: pred'(x,y)=$\alpha$·pred(x,y)+$\beta$, wherein pred (x,y) represents the original predictor or prediction block samples obtained by the inter prediction, respectively motion compensation and pred'(x,y) represents the updated predictor or prediction block samples for the sample (x, y). These updated inter-predicted sample values may also be referred to as final or compensated predictor or prediction block sample values (see reference sign 265, 365 in FIGS. 2 and 3) and may be used directly or further processed for the reconstruction to obtain a reconstructed current block 215, 315 of a picture. Instead of "updating" one may also refer to compensating, adapting or modifying in this context. The embodiments of the present disclosure are applicable to both luma and chroma samples.

Parameters $\alpha$ and $\beta$ can be referred to as updating (or compensation or adaptation) parameters. Other embodiments may use different updating parameters and different processing to update the predictor or prediction block sample values.

In the case of uni-directional prediction, the set of values L is composed of the neighboring samples of the one reference block used for inter-prediction.

Figure 7:
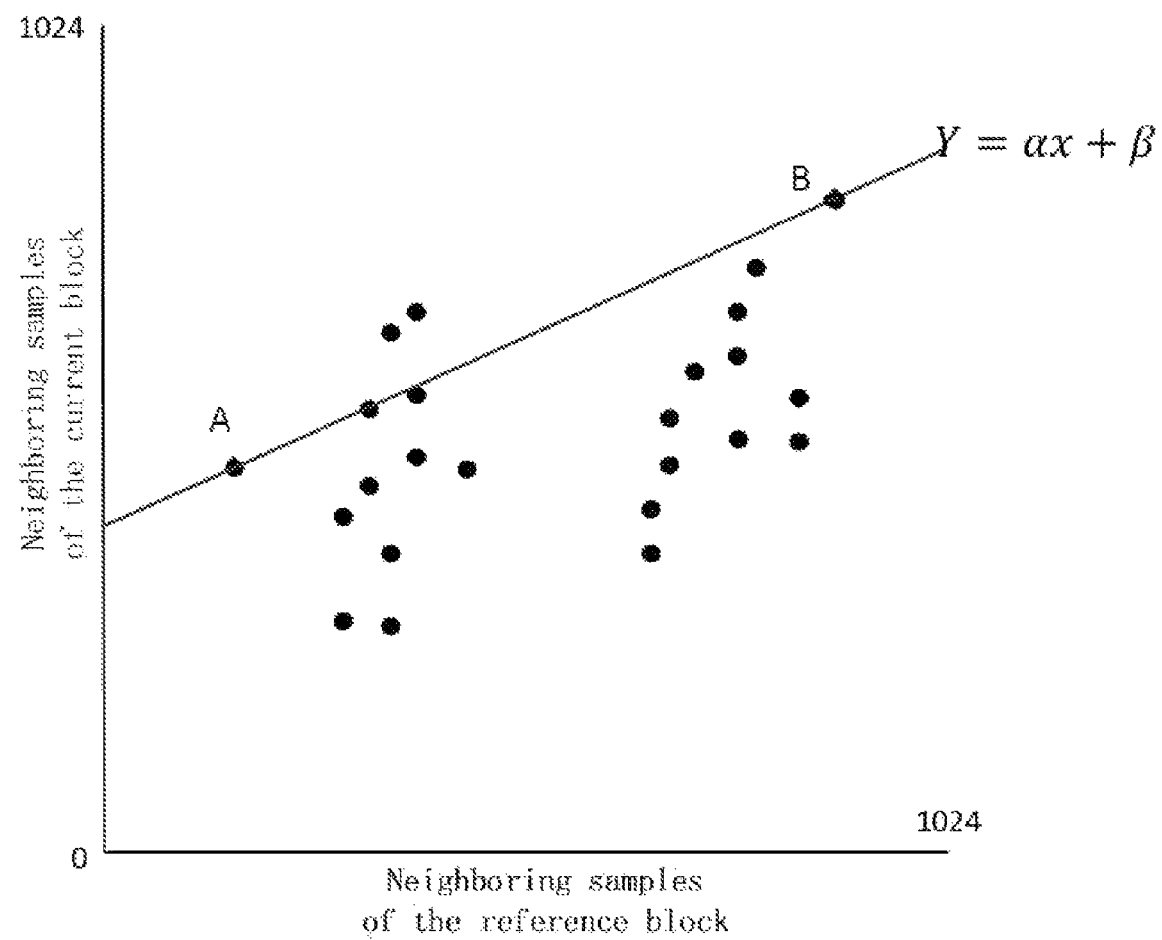
FIG. 7 is an illustration of a derivation of parameters $\alpha$ and $\beta$ based on neighboring samples according to an embodiment of the disclosure.

FIG. 7 shows a (x,y) coordinate system (two-dimensional diagram), wherein the x-coordinates (range of 1024 on the x-axis) of the points in the diagram are given by the sample values of the neighboring samples of the reference block of set L and the y-coordinates (range of 1024 on the y-axis) of the points are given by the sample values of the corresponding neighboring samples (i.e. at the corresponding relative positions) of the current block of set C. A is depicted at positions $(x_A, y_A)$ and B at position $(x_B, y_B)$, $X_A$ being the minimum sample value of the sample values of the set L and $x_B$ being the maximum sample value of the sample values of the set L.

In the following, various embodiments of the disclosure are described.

One aspect of the embodiments is the way for calculating or determining positions A and B.

In an embodiment, positions A and B correspond to the positions of the minimum and maximum sample value within the set L. When the set L has a subset of several reference (neighboring) samples of the reference block, wherein the values of these samples are equal to each other and smaller than the values of other reference samples (e.g. smaller than the values of all other reference samples) belonging to L, position A is selected as the position of the reference sample belonging to the subset and having a maximum distance to the top-left corner of the reference block. Similarly, when set L has a subset of several reference samples, wherein the values of these samples are equal to each other and larger than the values of other reference samples (e.g. larger than the values of all other reference samples) belonging to L, position B is selected as the position of the reference sample belonging to the subset and having a maximum distance to the top-left corner of the reference block.

Figure 8:
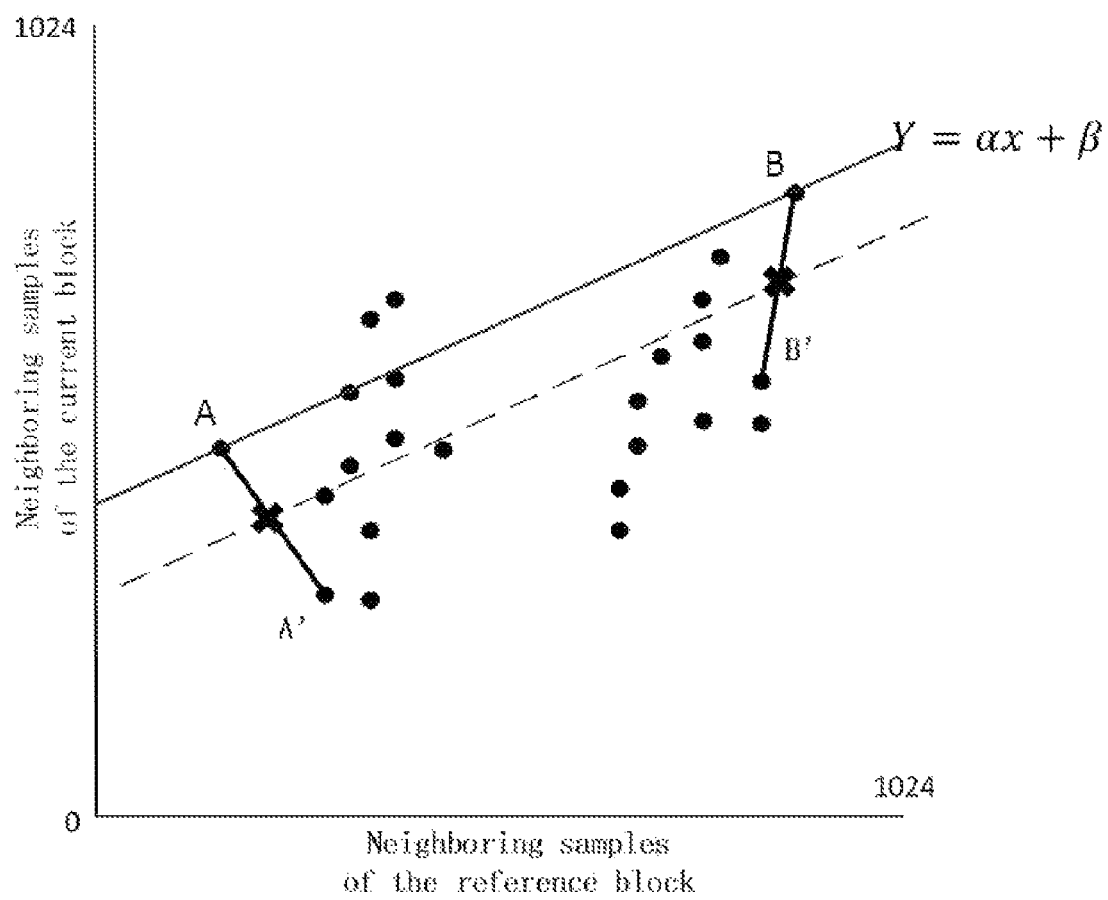
FIG. 8 is an illustration of a derivation of parameters $\alpha$ and $\beta$ based on neighboring samples according to an embodiment of the disclosure that uses the two largest and the two smallest values of the neighboring samples of the reference block.

In another embodiment, not only positions A and B corresponding to the smallest sample value and the largest sample value, respectively are searched (or determined) but also the positions A' and B' corresponding to the second-smallest sample value and the second-largest sample value, respectively are searched (or determined), as shown in FIG. 8. The parameters $\alpha$ and $\beta$ are derived using a linear model represented or illustrated by a dashed line in FIG. 8. In this embodiment, positions A and B may be also substituted by one of the following variants:

Variant 1:

$(x_A+x_{A'}+1)>>1$, the averaged value of the smallest sample value (at position) A and the second-smallest sample value (at position) A' is used as a first averaged value instead of $x_A$, $(x_B+x_{B'}+1)>>1$, the averaged value of the largest sample value B and the second-largest sample value B' is used as a second averaged value instead of $x_B$;

$(y_A+y_{A'}+1)>>1$, the average of the sample values of the current block at the corresponding positions of the first averaged value is used instead of $y_A$, $(y_B+y_{B'}+1)>>1$, the average of the sample values of the current block at the corresponding positions related to the second averaged value is used instead of $y_B$.

Variant 2:

$(x_A+x_{A'})>>1$, the averaged value of the smallest sample value (at position) A and the second-smallest sample value (at position) A' is used as a first averaged value instead of $x_A$, $(x_B+x_{B'})>>1$, the averaged value of the largest sample value (at position) B and the second-largest sample value (at position) B' is used as a second averaged value instead of $x_B$;

$(y_A+y_{A'})>>1$, the average of the sample values of the current block at the corresponding positions related to the first averaged value is used instead of $y_A \cdot (y_B+y_{B'})>>1$, the average of the sample values of the current block at the corresponding positions related to the second averaged value is used instead of $y_B$.

The solid lines connecting points A and A' as well as points B and B' and their intersections with the dashed line illustrate the above described averaging process, as shown in FIG. 8.

In another embodiment, a division operation $$\alpha = \frac{y_B - y_A}{x_B - x_A}$$

is implemented using a multiplication and a fetch from an LUT. This substitution is possible, for example, by using the following method:

$$\frac{v_0}{v_1} \approx v_0 \cdot LUT[v_1] >> S,$$

where S is a shift parameter that specifies the precision. Hence, a 64-entries look-up table could be specified, e.g. as follows (such as k=0 . . . 63):

$$LUT[k] = \frac{2^{15} + (k >> 1)}{k}.$$

The division operation in the equation above may be an integer division as, for example, used in the C programming language.

Parameter $$\alpha = \frac{y_B - y_A}{x_B - x_A}$$

may be calculated using multiplication and fetch as follows:

$$\alpha = ((y_B - y_A) \cdot m + (1 << (S-1))) >> S,$$

where S is a shift that depends on the precision of the look-up table and $m = LUT[(y_B - Y_A) \, N_S]$, where $N_S$ is a difference subsampling factor. In this particular embodiment, S=15 and $N_S$=10−6=4 (since a LUT has $2^6$ entries and the input difference $x_B - x_A$ is a 10-bit value).

In such embodiments, LUT entries are mapped linearly to the values of the luminance difference $(y_B - y_A)$.

In another embodiment, a non-linear LUT mapping may be used. An exemplary 64-entries LUT is given in Table 1.

TABLE 1

Exemplary LUT with non-linear mapping

| lut_shift | Col 0 | 1 | 2 | 3 | 4 | 5 | 6 | 7 |
|---|---|---|---|---|---|---|---|---|
| −1 | 128 | 128 | 171 | 128 | 205 | 171 | 146 | 128 |
| 0 | 228 | 205 | 186 | 171 | 158 | 146 | 137 | 128 |
| 1 | 241 | 216 | 195 | 178 | 164 | 152 | 141 | 132 |
| 2 | 248 | 221 | 200 | 182 | 167 | 155 | 144 | 134 |
| 3 | 252 | 224 | 202 | 184 | 169 | 156 | 145 | 135 |
| 4 | 254 | 226 | 204 | 185 | 170 | 157 | 146 | 136 |

In this embodiment, the value of the multiplier m is restored from the value fetched from the LUT as follows:

$$m = LUT[idx] << m_s$$

where $m_s = 6 - (lut_{shift}+1) + \delta$. The value of $\delta$ is set equal to 3, 2, 1, 1, respectively for "idx" values less or equal to 4.

The index value "idx" is a raster index in Table 1 and can be calculated as max(lut_shift, 0)·8+col.

The value of "lut_shift" is a position of the most significant bit in the input difference $x_B - X_A$, and the value of "col" is the next three bits following the most significant one.

In another embodiment, the LUT tabulates the values of significands. Further,

DivSigTable[ ]={0,7,6,5,5,4,4,3,3,2,2,1,1,1,1,0}

A 4-bit significand is always more than or equal to 8 because it expresses the four most significant bits. The table therefore omits the MSB bit and each element needs only 3 bits. The total size of the table is 3*16=48 bits.

The following steps are performed to get the value of α:
a difference is calculated as follows: $\Delta = \lfloor \log_2(\Delta_x) \rfloor$, $\Delta_x = x_B - x_A$;
a normalization is performed as follows: $\Delta_{norm} = [(\Delta_x << 4) >> \Delta] \& 15$;
if $\Delta_{norm} \neq 0$, increment $\Delta$ by 1.

$\gamma = \lfloor \log_2(|\Delta_y|) \rfloor + 1, \Delta_y = y_B - y_A$ parameter α is obtained as follows:

$\alpha = (\Delta_y (DivSigTable[\Delta_{norm}] + 8) + 2^{\gamma-1}) >> \gamma,$ The value of parameter α can have a different precision depending on the values of the differences. Hence, the calculation of parameter β may be adopted to consider this fact. Further, $\beta = y_A - ((\alpha x_A) >> k),$ where k=max(1, 3+Δ−γ).

Figure 9:
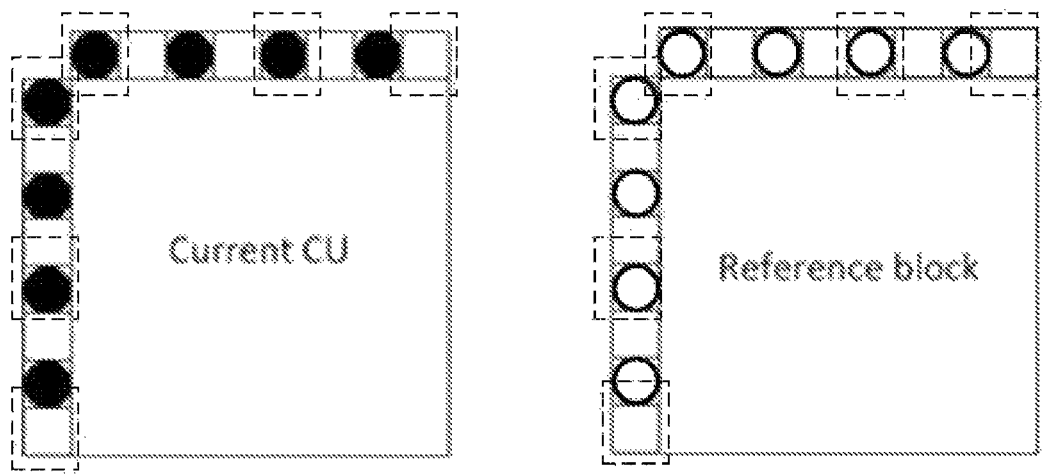
FIG. 9 is an illustration of three neighboring samples of the top and the left side of the blocks used to fill in two sets L and C according to an embodiment of the disclosure.

In another embodiment, sets L and C are composed of or comprise the neighboring samples that are adjacent to the corner and the middle of the reference and current block (FIG. 9). The rest of the neighboring samples are skipped and not taken into account. Given a length of the side S, allowed positions (i.e. positions of the neighboring samples that will be included in L and C) of the neighboring samples along the side are defined as 0, S>>1 and S−1, wherein S>>1 means S right-shift by 1, as indicated by the dashed lines in FIG. 9.

Figure 10:
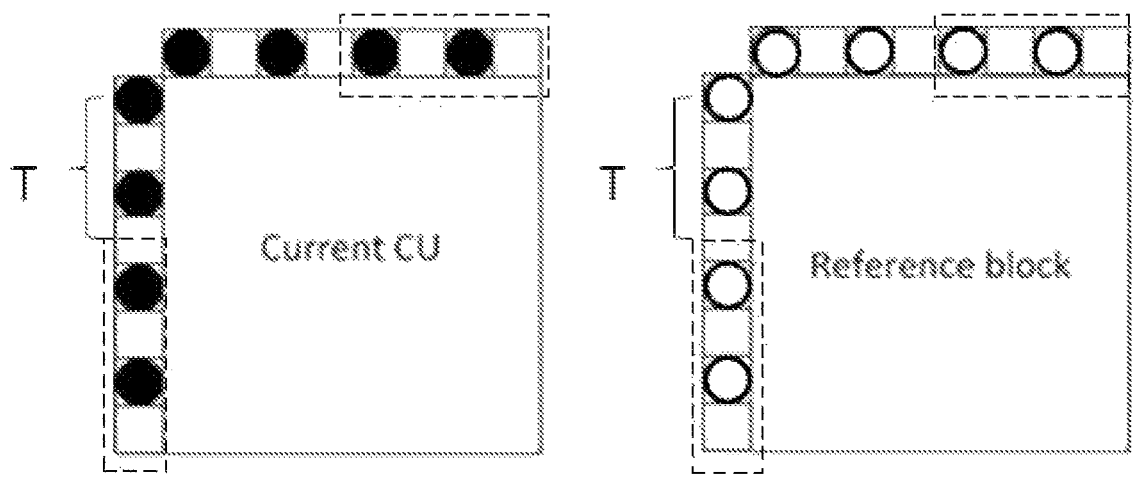
FIG. 10 is an illustration of a distance constraining a filling of the two sets L and C according to an embodiment of the disclosure.

In another embodiment (FIG. 10), only those neighboring samples are included in sets L and C, that have a distance to the top-left corner exceeding a threshold T. The threshold T can, for example, be defined to be equal to one of the following: a half of the block side length S, a quarter of the block side length S, a fixed value, comprising one of the following: 2, 4, 6 or 8 samples, wherein the block side length is the width or the height of the block, respectively. In FIG. 9 and FIG. 10, rectangles with dashed lines encompass the allowed positions of neighboring samples.

For the case of several reference blocks, predictor pred (x,y) can be obtained as a result of motion compensation applied to these reference blocks. Particularly, for the case of bi-prediction, pred(x,y) may be a linear combination of two reference blocks.

In this case, a set of reference or neighboring samples L is obtained using a linear combination of reference samples of the reference blocks, wherein a value in the set L is obtained as a weighted sum of two or more neighboring samples, that are adjacent to different reference blocks (e.g. to the two reference blocks in case of bi-prediction) but have the same positions relative to these reference blocks.

Figure 11:
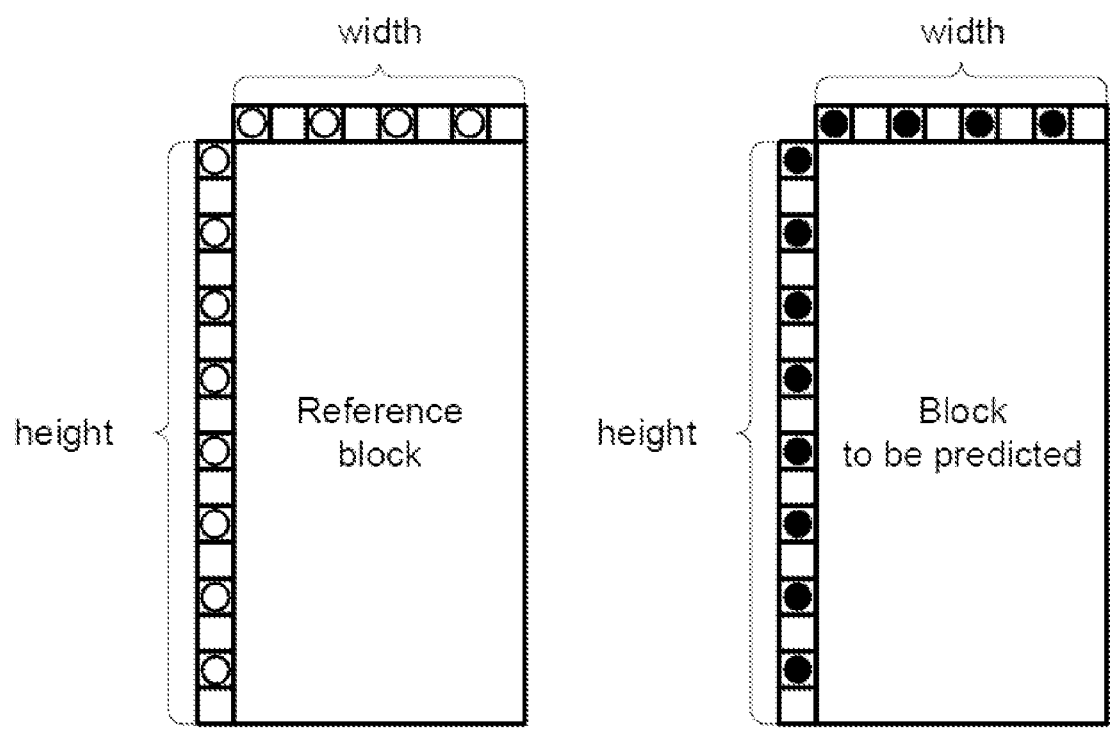
FIG. 11 is an illustration of a rectangular block with the top and the left sides of adjacent samples that are used as templates after downsampling according to an embodiment of the disclosure.
Figure 12:
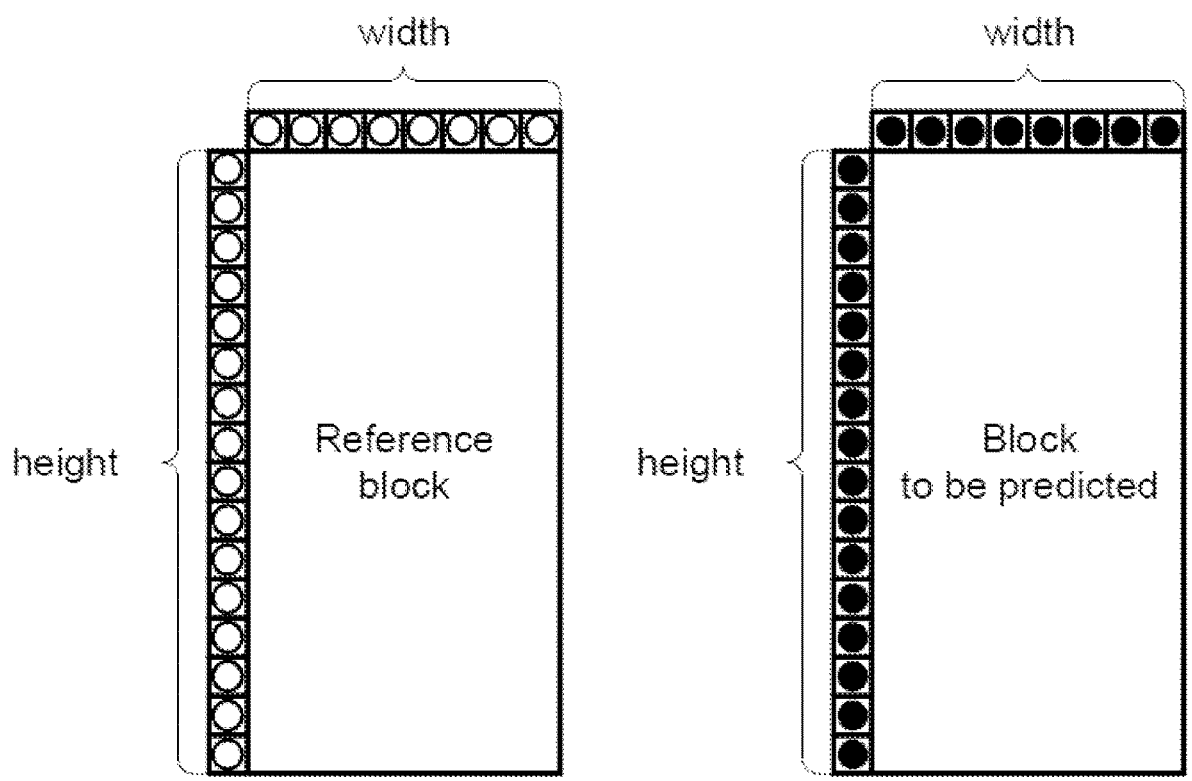
FIG. 12 is an illustration of a rectangular block with the top and the left sides of adjacent samples that are used as templates without downsampling according to an embodiment of the disclosure.

To calculate β with higher accuracy, mean values of LIC templates for both the current and reference blocks may be computed as described in the following. The LIC templates are an L-shaped area to the left and top of the block. As shown in FIG. 11 and FIG. 12, template samples can be either downsampled (FIG. 11) or not (FIG. 12) before applying the above-described procedure of calculating α and β as well as calculating the mean values to the template samples (such as left template samples or top template samples). In addition, to remove and to reduce impact of outliers, template samples can be filtered using different (linear or non-linear) smoothing filters. In particular, FIR filters with coefficients of [1, 2, 1]/4 and [1, 0, 2, 0, 1]/4 can be used for this purpose. These filters can be applied interchangeably (either one or another) to template samples. In particular, a filter with coefficients of [1, 2, 1]/4 is applied if the number of samples in a block is equal to or less than 256, i.e. width*height<=256. Otherwise (if the number of samples in a block is greater than 256, i.e. width*height>256), [1, 0, 2, 0, 1]/4 is used. Other FIR filters can also be applied to template samples. Filtering may be applied to the neighboring samples of the current block and/or the reference block.

Figure 13:
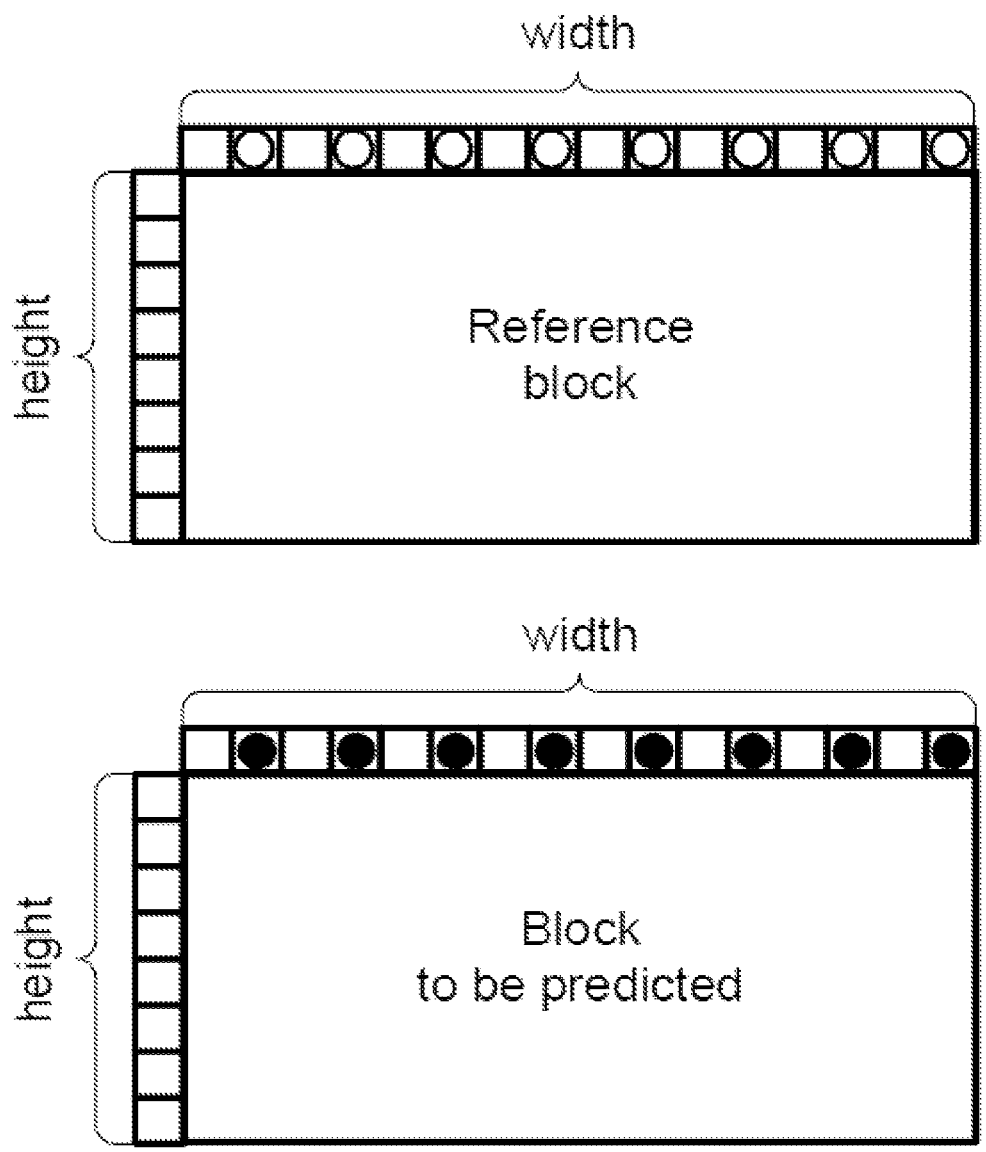
FIG. 13 is an illustration of a horizontally oriented rectangular block where the top side of adjacent samples is used to calculate mean values according to an embodiment of the disclosure.
Figure 14:
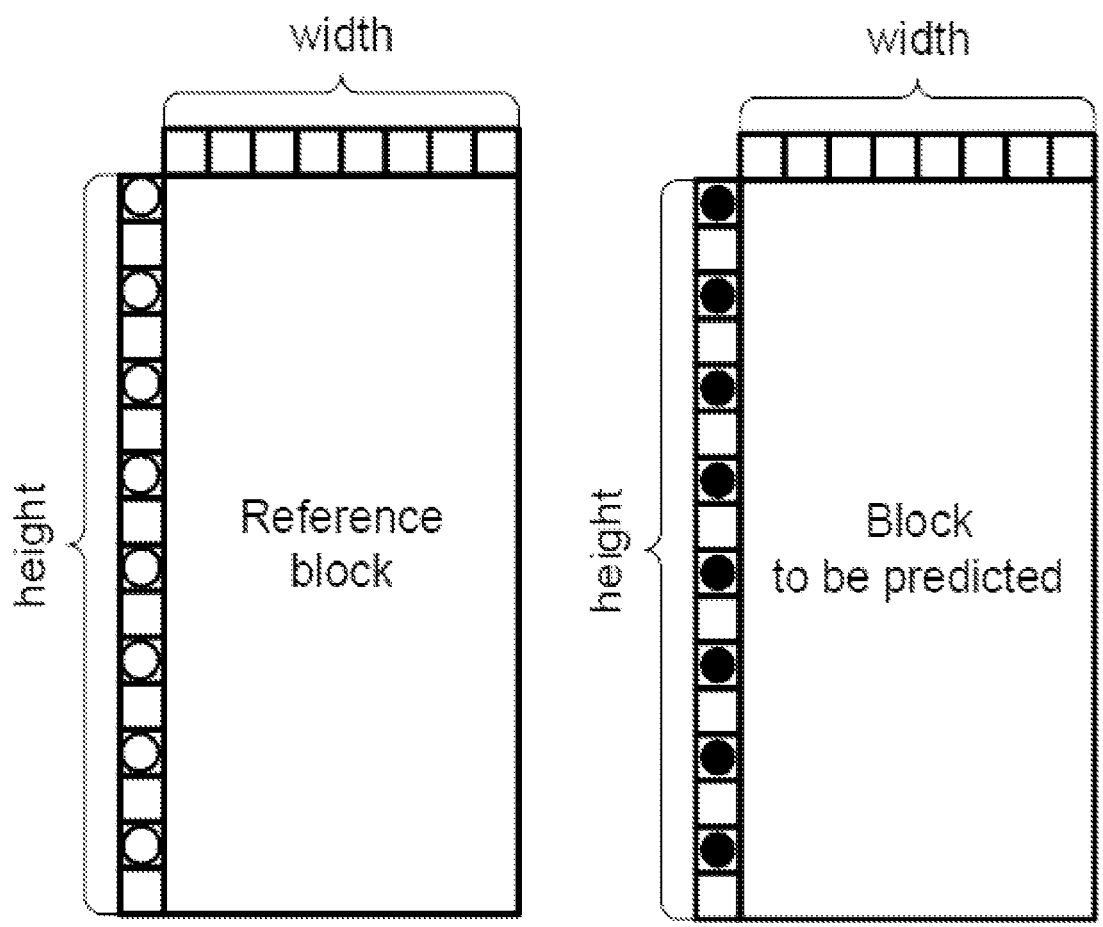
FIG. 14 is an illustration of a vertically oriented rectangular block where the left side of adjacent samples is used to calculate mean values according to an embodiment of the disclosure.
Figure 15:
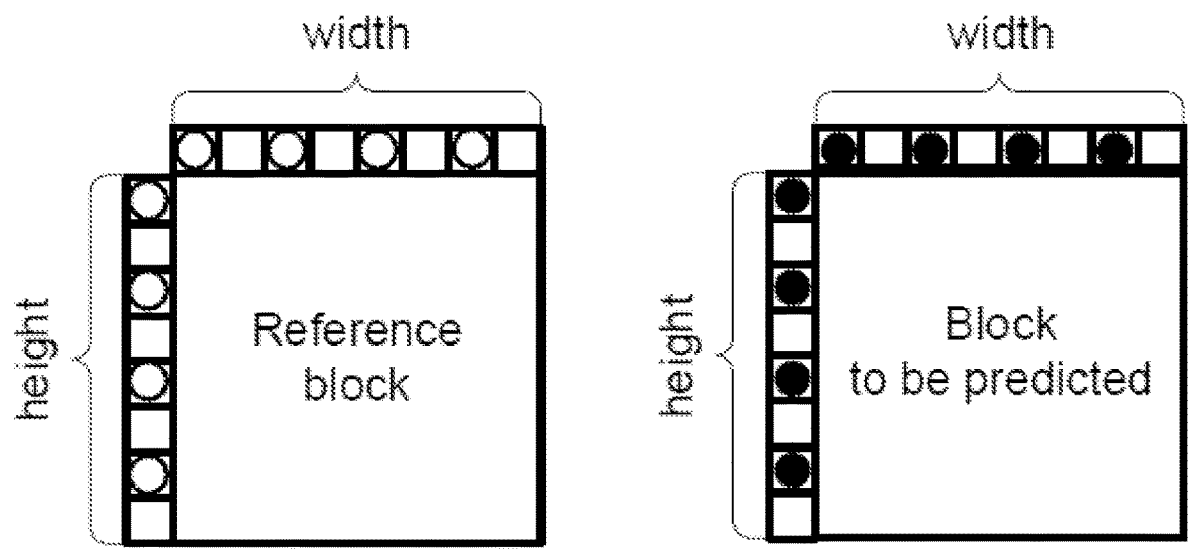
FIG. 15 is an illustration of a square block where both the top and the left sides of adjacent samples are used to calculate mean values according to an embodiment of the disclosure.

To calculate mean values of template samples without using a division operation, the following formulas can be used:

$$\text{Mean} = \frac{\left(\sum_{i=0}^{W+H-1} p_i\right) + ((W+H) >> 1)}{W+H} \approx \frac{\left(\sum_{i=0}^{W-1} p_i\right) + (W >> 1)}{W} = \quad (3)$$

$$\left(\left(\sum_{i=0}^{W-1} p_i\right) + (W >> 1)\right) >> w \text{ if } W > H(\text{FIG. 13}) \text{ and}$$

$$\text{Mean} = \frac{\left(\sum_{i=0}^{W+H-1} p_i\right) + ((W+H) >> 1)}{W+H} \approx \frac{\left(\sum_{i=0}^{H-1} p_i\right) + (H >> 1)}{H} = \quad (4)$$

$$\left(\left(\sum_{i=0}^{H-1} p_i\right) + (H >> 1)\right) >> h \text{ if } H > W(\text{FIG. 14})$$

$$\text{Mean} = \frac{\left(\sum_{i=0}^{W+H-1} p_i\right) + (W+H)}{W+H} = \quad (5)$$

$$\frac{\left(\sum_{i=0}^{W+H-1} p_i\right) + (W << 1)}{2W} = \left(\left(\sum_{i=0}^{W+H-1} p_i\right) + (W << 1)\right) >> (w+1)$$

if H=W (FIG. 15), wherein W indicates a top template sample range or the width of the block, H indicates a left template sample range or the height of the block, and W and H are positive integers. $p_i$ indicates the template sample value of the current block or the reference block. w and h may be defined as $w=\log_2(W)$ and $h=\log_2(H)$.

The mean values of $\text{Mean}_{CUR}$ and $\text{Mean}_{REF}$ calculated for the current block (to be predicted) and reference block(s), respectively, may be substituted into the following formula to compute β:

$$\beta = \text{Mean}_{CUR} - \alpha \cdot \text{Mean}_{REF}.$$

It is worth noting that implementation of the linear model parameter derivation for CCLM and implementation of the updating parameter derivation for LIC may be unified with each other, i.e. the same procedure is used both in CCLM and LIC.

Figure 16:
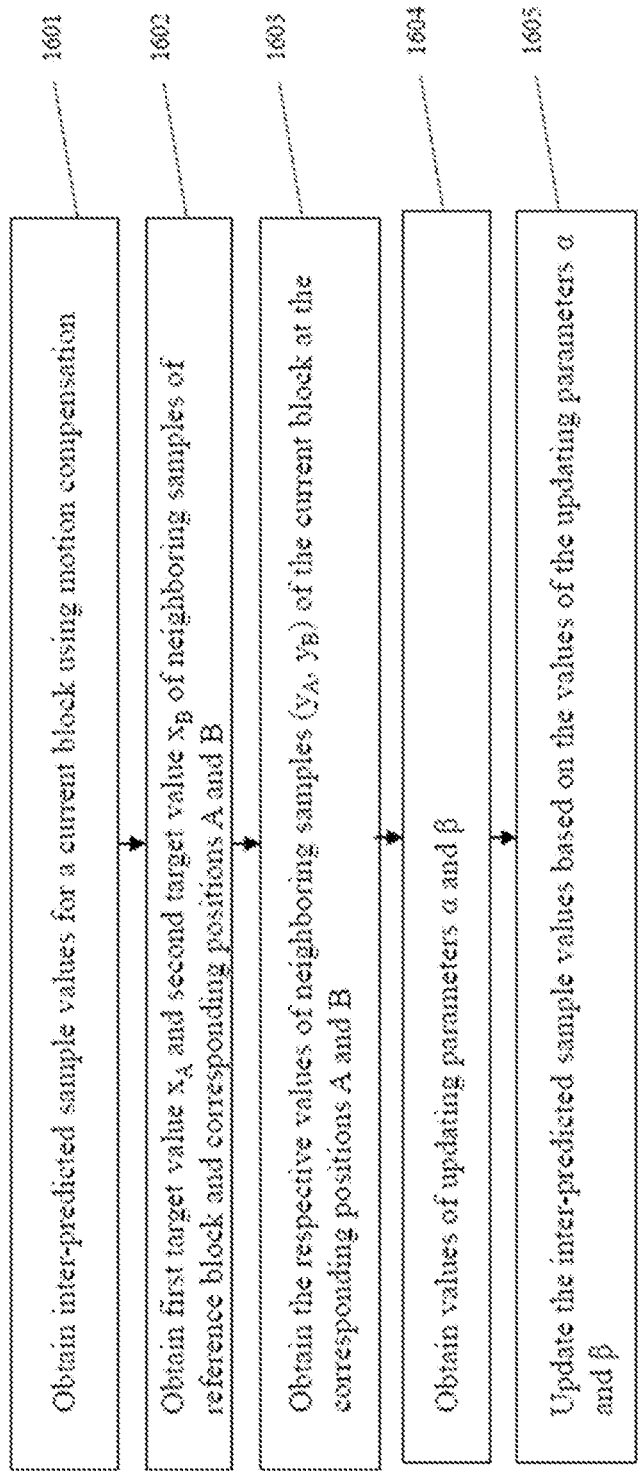
FIG. 16 is a drawing illustrating a method according to an exemplary embodiment of the disclosure.

As shown in FIG. 16, the method for illumination compensation for inter prediction coding (encoding and/or decoding) of a picture according to an embodiment of the disclosure is described as follows.

At block 1601, inter-predicted sample values are obtained for a current block using motion compensation.

At block 1602, a first target value ($x_A$) and a second target value ($x_B$) of reference samples (such as neighboring or template samples) of at least one reference block and a corresponding position A of the reference sample having the first target value and a corresponding position B of the reference sample having the second target value relative to the position of the reference block are obtained, in particular, a minimum value ($x_A$) and a maximum value ($x_B$) of neighboring samples of at least one reference block and a corresponding position A of the neighboring sample having the minimum value and a corresponding position B of the neighboring sample having the maximum value relative to the position of the reference block (such as, the left corner of the reference block) may be obtained.

At block 1603, the respective values of neighboring samples ($y_A$, $y_B$) of the current block at the corresponding positions A and B relative to the position of the current block are obtained.

At block 1604, the values of updating parameters (such as α and β) are obtained or derived based on the values of reference samples, wherein the values of reference samples comprise one or more of the first target value ($x_A$) and the second target value ($x_B$) of the reference samples of the at least one reference block, and the values of reference samples ($y_A$, $y_B$) of the current block at the corresponding positions A and B, in particular, linear model coefficients (e.g. the values of updating parameters α and β) may be obtained using the values of reference samples, wherein the values of reference samples comprise the minimum value ($x_A$) and the maximum value ($x_B$) of the neighboring samples of the at least one reference block, and the values of neighboring samples ($y_A$, $y_B$) of the current block at the corresponding positions A and B, and At block 1605, the values of the inter-predicted samples are updated based on the values of the updating parameters (such as α and β).

To sum up, this disclosure proposes to use a CCLM MinMax method to derive linear model parameters for LIC. It is also proposed to improve the performance of both, LIC and CCLM by introducing average values computation. It is reported the proposed method reduces the number of sequential computations, simplifies VVC specification draft and reduces hardware complexity.

This disclosure suggests using a unified mechanism of CCLM parameters derivation in LIC and CCLM. Further, it is proposed to derive parameters α and β for LIC using the same derivation process as CCLM does, and to increase the accuracy of parameter β.

There are several aspects that are presented in this present disclosure:

Template downsampling: Since the MinMax method does not require that the number of processed template samples is a power of 2, template samples can be skipped in both cases (i.e. for current and reference blocks).

Template filtering: filtering can be applied to templates to remove outliers (2 FIR smoothing filters are being proposed: [1, 2, 1]/4 and [1, 0, 2, 0, 1]/4 as well as their combination when they are switched subject to block size).

Mean values: mean values $y_{mean}$ and $x_{mean}$ can be calculated in several ways. As done for DC intra-prediction mode, i.e. either the longer side of the block (when block has rectangular shape) or both sides (when a block is square) are used to compute DC value. Averaging is performed separately for each side and both results are averaged with each other.

TABLE 2

Summary of the proposed methods

| Method # | Description |
| --- | --- |
| 1 | Mean values as in DC intra-prediction mode |
| 2 | Method #1 with [1, 2, 1]/4 filter applied to reconstructed and reference samples |
| 3 | Method #1 applied in CCLM method |

Figure 18:
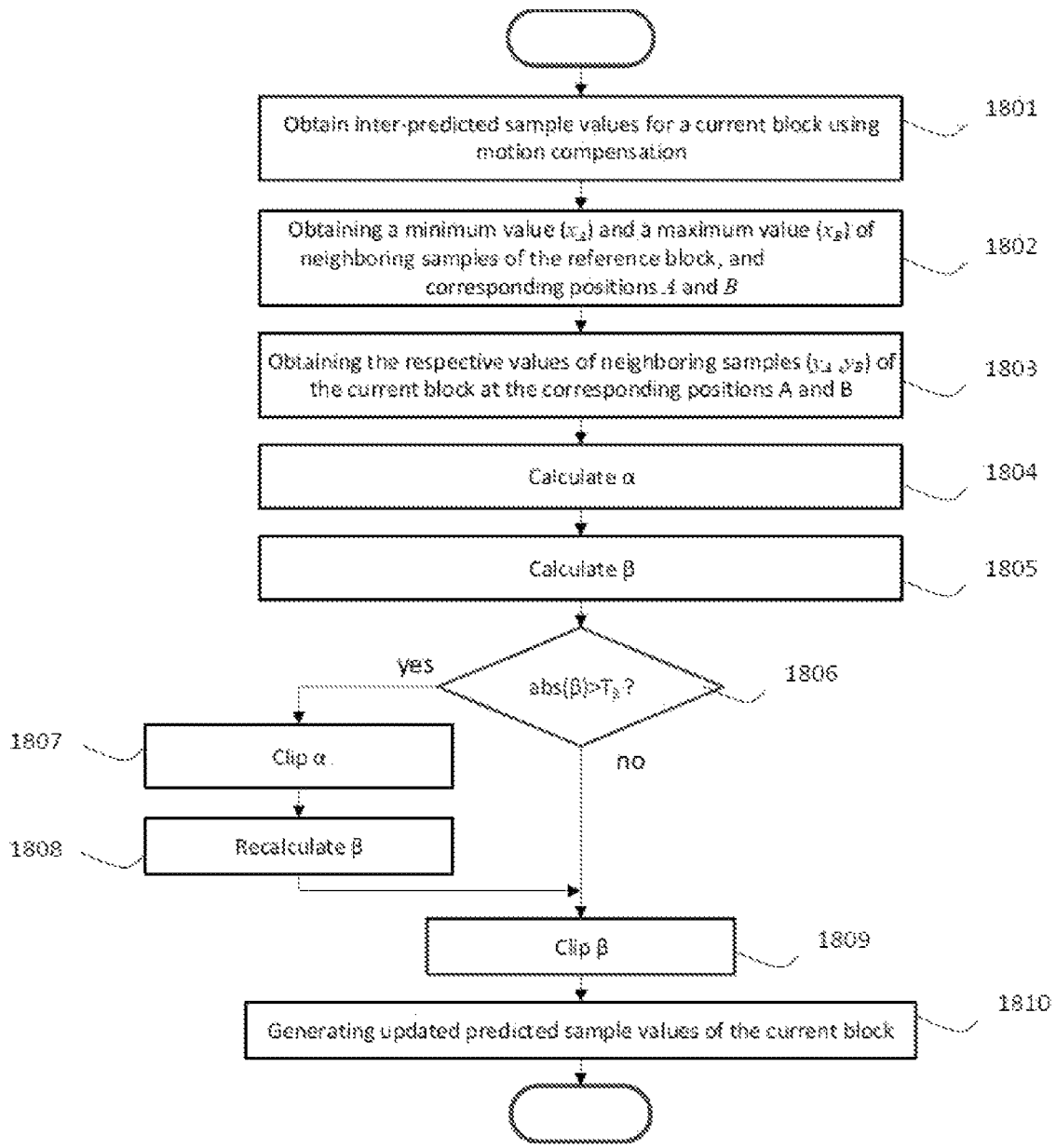
FIG. 18 is an illustration of the steps of a MinMax method of linear model parameters derivation for LIC.

In FIG. 18, the steps of a MinMax method of linear model parameters derivation for LIC are shown. Steps 1801, 1802 and 1803 are correspondingly the same as steps 1601, 1602 and 1603 shown in FIG. 16. Step 1604 is represented in FIG. 18 as two consecutive steps: step 1804 that consists in obtaining the values of updating parameter α; and step 1805 of obtaining parameter β using parameter α and the mean values of $Mean_{CUR}$ and $Mean_{REF}$ calculated for the current block (to be predicted) and the at least one reference block, e.g. as follows:

$$\beta = Mean_{CUR} - \alpha \cdot Mean_{REF}.$$

The mean value calculation (for both, $Mean_{CUR}$ and $Mean_{REF}$) may be performed for a predicted non-square block with width W and height H as follows:

When the width of the block is larger than the height, $$Mean = (w \cdot Mean_{above} + Mean_{left} + shiftOffset) \gg shift,$$

$$Shift = \log_2(W) - \log_2(H), \text{ and}$$

$$shiftOffset = (1 \ll (shift-1)).$$

Figure 17:
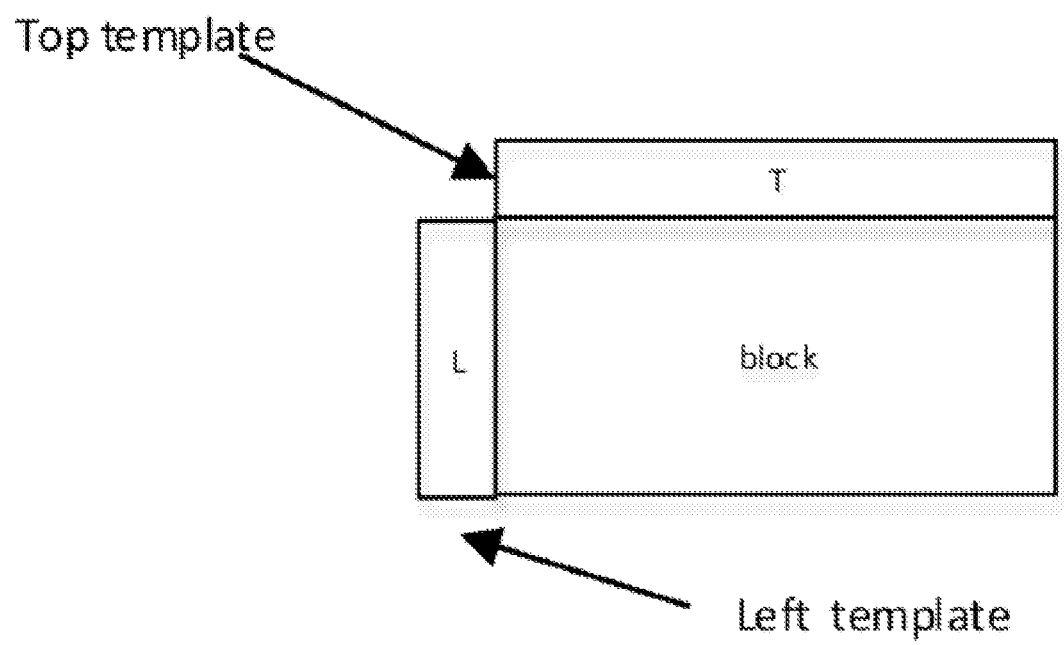
FIG. 17 is an illustration of the top and the left template of the reference block or the current block according to an embodiment of the disclosure.

$Mean_{above}$ and $Mean_{left}$ are the mean values of the reference samples of the top and the left templates of the block (FIG. 17 illustrates positions of the templates relative to the predicted block). These values may be obtained using the right-hand parts of formulas (3) and (4), respectively.

When the height of the block is larger than the width, $$Mean = (Mean_{above} + w \cdot Mean_{left} + shiftOffset) \gg shift,$$

$$Shift = \log_2(H) - \log_2(W), \text{ and}$$

$$shiftOffset = (1 \ll (shift-1)).$$

In both cases, the value of the weighting coefficient w may be obtained as follows:

$$w = (1 \ll shift) - 1.$$

Table 3 shows exemplary values of w for different aspect ratios:

TABLE 3

Exemplary values of w for different aspect ratios of a predicted block

| Aspect ratio (W:H or H:W) | abs(log2(W) − log2(H)) | Weighting coefficient w |
| --- | --- | --- |
| 16:1 | 4 | $15 = (2^4 - 1)$ |
| 8:1 | 3 | $7 = (2^3 - 1)$ |
| 4:1 | 2 | $3 = (2^2 - 1)$ |
| 2:1 | 1 | $1 = (2^1 - 1)$ |

It is noted that the mean value calculations described above do not require multiplications or divisions and may be easily implemented using add and shift operations.

Another embodiment may use the value of "shiftOffset" set to zero to minimize the number of addition operations.

Step 1806 comprises comparing the absolute value (i.e. the magnitude) of β with a threshold value $T_\beta$ ($|\beta| > T_\beta$) in order to apply conditional clipping of parameter α (steps 1807 and 1808).

The value of the threshold $T_\beta$ may be an integer non-negative value that depends on the bitdepth of the coded picture. For a given bitdepth, the value of $T_\beta$ may be determined as follows:

$$T_\beta = T_{\beta_{ref}} \ll (bitdepth-8),$$

wherein the value of $T_{\beta_{ref}}$ is an integer non-negative value set to, e.g., 25, 30, 32 or 16.

Step 1807 "Clip α" may be performed as follows. When β<0, α is set equal to min(α, $\alpha_{max}$). When β>0, α is set equal to max(α, $\alpha_{min}$). In additional embodiments, step 1807 may also comprise clipping of α for small values of β. Further, if abs(β) is smaller than the threshold ($T_\beta$), α may be set to max(0, α).

In fixed point representation, the value of α has a precision of iShift, which means that after multiplying by α, the result should be right-shifted by iShift. The values of $\alpha_{max}$ and $\alpha_{min}$ are defined with consideration of the iShift value of the input α, and $iShift_{max}$ may be set to 13, e.g. as follows:

$$\alpha_{max} = 10240 \gg (iShift_{max} - iShift), \text{ and}$$

$$\alpha_{min} = 6144 \gg (iShift_{max} - iShift).$$

Alternatively, the value of $\alpha_{min}$ could be set equal to:

$$\alpha_{min} = 7373 \gg (iShift_{max} - iShift)$$

Step 1808 is performed in the same way as step 1805. Step 1809 is performed as follows:

$$\beta_{clip} = \min(1 \ll (bitdepth-1), \max(\beta, -(1 \ll (bitdepth-1)))).$$

After clipping, the magnitude of $\beta_{clip}$ value is guaranteed not to exceed half of a range of the sample value, wherein the range is determined by the bitdepth of a color component of a picture.

Step 1810 is the same as step 1605 shown in FIG. 16.

Figure 19:
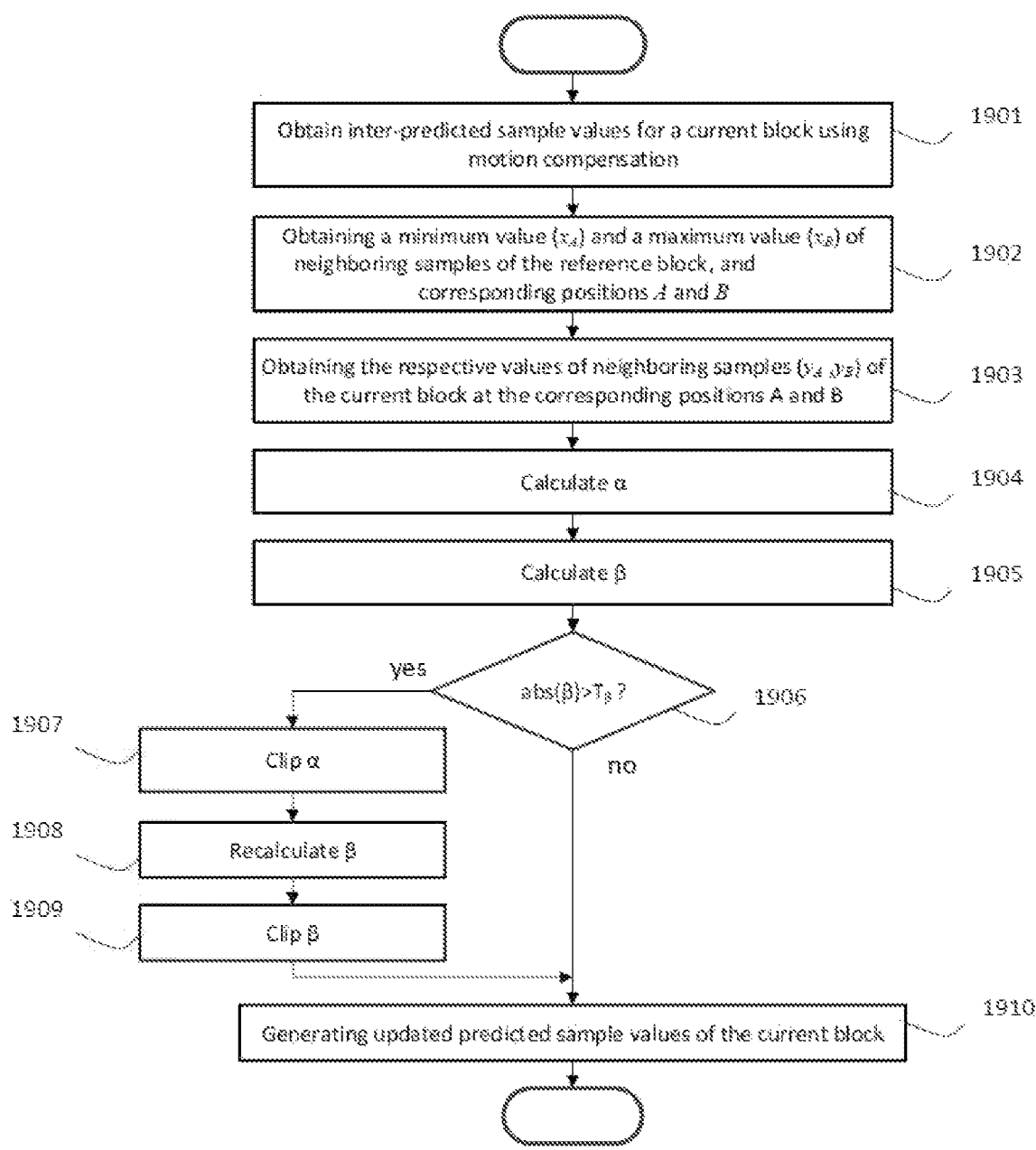
FIG. 19 is an illustration of the steps of another embodiment of a MinMax method of linear model parameters derivation for LIC.

FIG. 19 shows an alternative embodiment of the method. Steps 1901-1910 are correspondingly the same as steps 1801-1810. The difference is that step 1909 is also applied conditionally, i.e. when the condition of step 1906 is true and after the value of α is modified by performing the step 1907 "Clip α".

Filtering may be applied to the neighboring samples in any of (or all of) the steps 1802, 1803, 1902 and 1903. However, the decision of whether a filter is applied to the template samples may comprise the check of whether a block is predicted using an affine inter prediction mode. Particularly, if a block is predicted using a translational motion model (non-affine motion model), neighboring samples may be filtered using an FIR filter before obtaining positions A and B and the filtered sample values ($y_A$, $y_B$) or ($X_A$, $X_B$) at these positions. The motivation to disable filtering for an affine motion model is to avoid additional computational complexity for the motion compensation scheme that is already more complex than the conventional translational motion compensation. Affine motion compensation may be performed, e.g. as it is specified by the VVC draft. The concept of the affine motion compensation model is based on obtaining an affine motion field for the inter-predicted block. This model may comprise two or three control point motion vectors (CPMV). The models are referred to as four and six parameters affine motion models, respectively. CPMV positions for the 4-parameter affine motion model are shown in FIG. 20.

Figure 20:
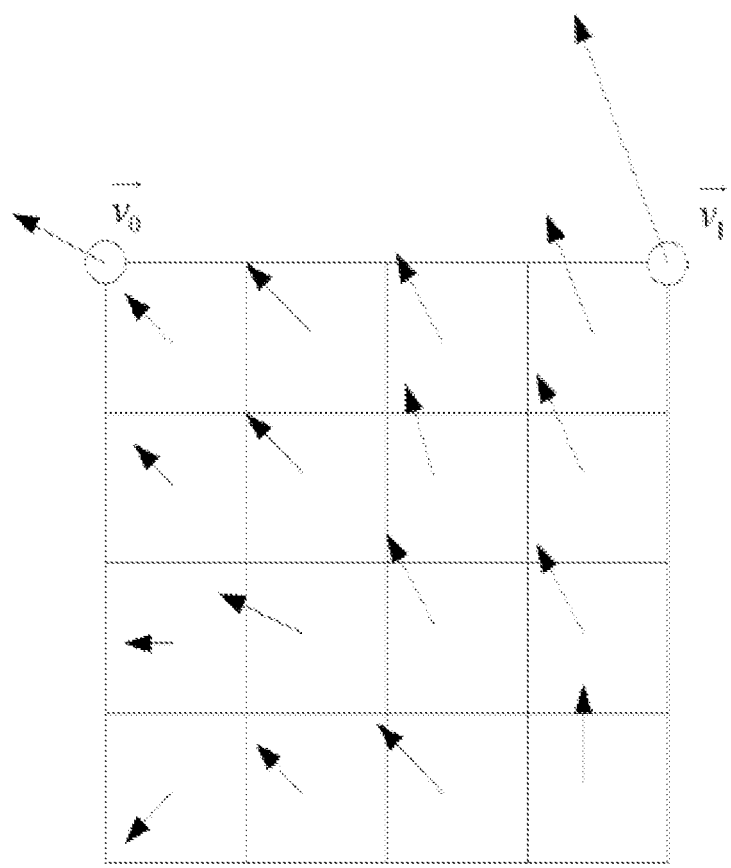
FIG. 20 is illustration of a subblock motion vector field for an affine motion model.

When the 4-parameter motion model is used to predict a block, the motion vector field (MVF) of a block is described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (6)$$

where ($v_{0x}$, $v_{0y}$) is the motion vector of the top-left corner control point, ($v_{1x}$, $v_{1y}$) is the motion vector of the top-right corner control point, and w is the side length of a square-shaped affine subblock as shown in FIG. 20. At the encoder side, a rate distortion (RD) cost check is used to determine which motion vector pair (or triplet in case of the 6-parameter model) is selected as the control point motion vectors of the predicted block. At the decoder side, CPMV is derived using the information signalled within a bitstream.

There are different ways to determine CPMVs. For example, CPMVs can be derived based on motion information of neighboring blocks (for example, in a process of subblock merge mode) or CPMVs can be derived by deriving CPMV predictors (CPMVP) and obtaining differences between CPMV and CPMVP from the bitstream.

In order to simplify the motion compensation prediction, the MVF of a block is represented by a block-based affine transform prediction. Block-based affine transform prediction comprises the steps of subdividing the predicted block into subblocks (e.g. sized as 4×4 samples) and deriving the motion vector of each 4×4 sub-block, as shown in FIG. 20. This motion vector derivation for a subblock may be performed in accordance to the equation (6), with the resulting motion vector that is further rounded to 1/16 fraction accuracy. The motion compensation interpolation filters are selected for each of the subblocks in accordance with the fractional parts of motion vectors derived for these sub-blocks. Motion compensation for a subblock is performed by applying the selected interpolation filter to the block of reference samples, which is defined using the translational model for the motion vector derived for the subblock.

Figure 21:
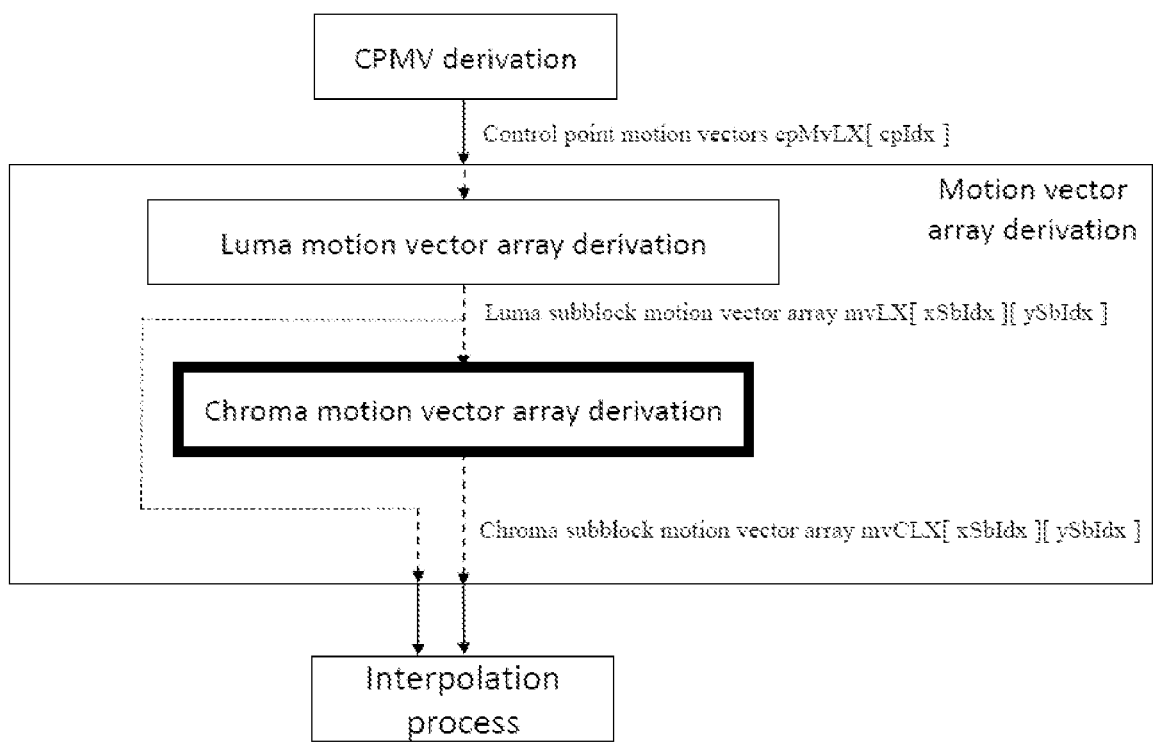
FIG. 21 is a flowchart illustrating the steps of affine motion compensation.

Basically, motion compensation using the affine motion model comprises the following steps (FIG. 21):

Control point motion vector derivation, resulting in control point motion vectors cpMvLX[cpIdx] with cpIdx indicating the index of the control point Motion Vector Array Derivation:

Luma motion vector array derivation, resulting in luma subblock motion vector array mvLX[xSbIdx][ySbIdx] with xSbIdx and ySbIdx indicating the indices of the subblock in x- and y-direction.

Chroma motion vector array derivation, resulting in chroma subblock motion vector array mvCLX[xSbIdx][ySbIdx] with xSbIdx and ySbIdx indicating the indices of the subblock in x- and y-direction.

Interpolation Process:

Determination of whether a block is predicted using the affine motion compensation model may be performed at the decoder side by checking a flag value specified for the predicted block.

Calculation of the mean value requires a division operation that may be implemented using a multiplication operation and an LUT that is used to fetch multiplier values based on the number of samples. Here, the mean value refers to the mean value of the reconstructed neighboring samples of the current block, or the mean value of the reconstructed neighboring samples of the reference block.

In an example, the reconstructed neighboring samples of the current block include, but not limited to, reconstructed neighboring samples above the current block and/or reconstructed neighboring samples left of the current block. In an example, the reconstructed neighboring samples of the reference block include, but not limited to, reconstructed neighboring samples above the reference block and/or reconstructed neighboring samples left of the reference block. It is noted that the expressions "reconstructed neighboring samples", "template reference sample", "template samples" and "reference samples" have substantially the same meaning throughout the present disclosure.

The following steps may be performed to calculate the mean value of the reconstructed neighboring samples of the current block and the mean value of the reconstructed neighboring samples of the reference block.

The first step is to calculate the sum $S_{T1}$, or $S_{T2}$, of available template samples of the current or reference block, respectively, and the number of available template samples $C_T$ on the left and/or top sides of the current or reference block depending on availability of the template samples. E.g. template samples on the left may not be available if the current or reference block is the first block in a CTU row. Availability of a template sample is determined for templates of the current or reference block by checking at least the following: if a template reference sample of the current block belongs to a restricted neighboring block, this template reference sample is not available (see FIG. 23).

Figure 23:
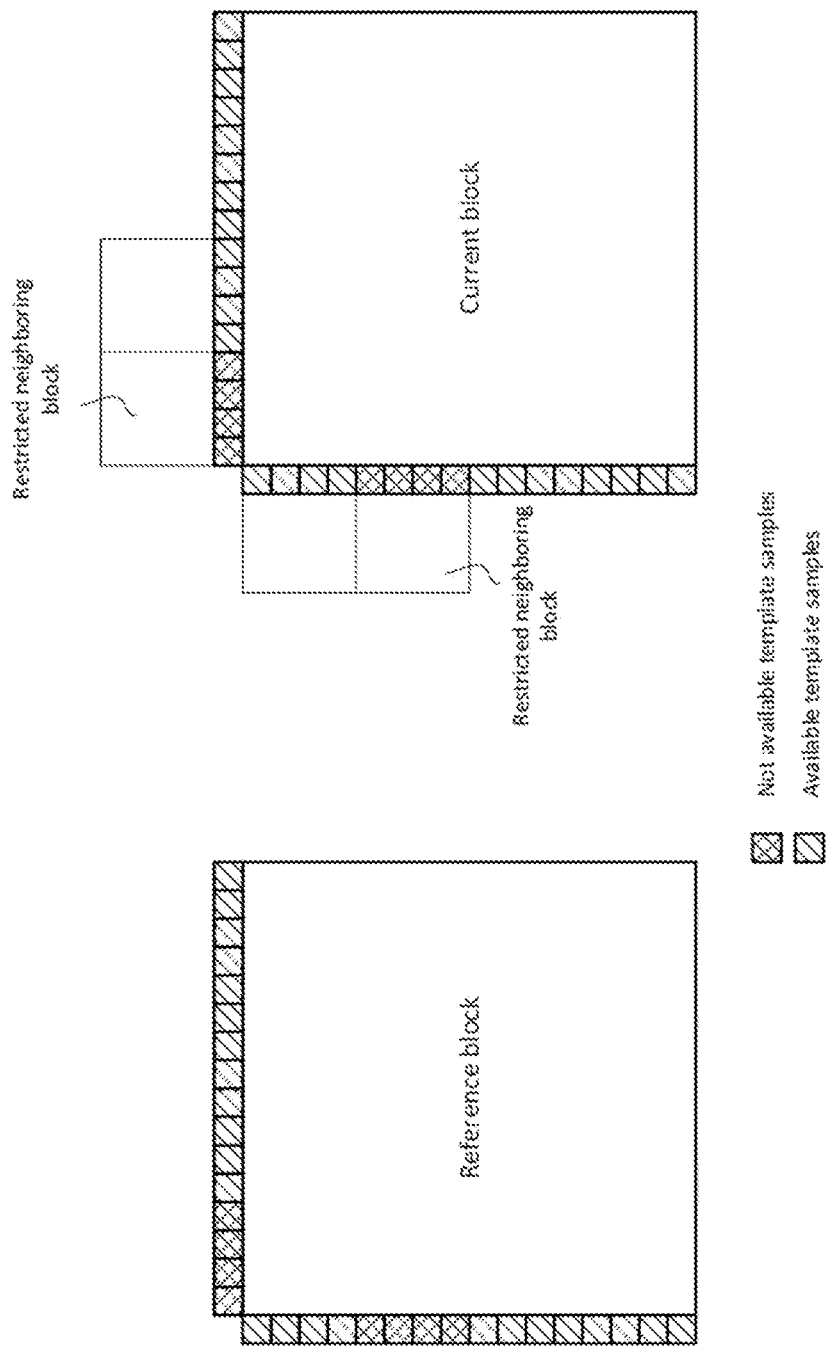
FIG. 23 is an illustration of a scenario in which if a template reference sample of the current block belongs to a restricted neighboring block, this template reference sample is not available.

As shown in FIG. 23, template samples of a reference block having positions corresponding to unavailable template samples of the current block are also not available. A restricted neighboring block is a block that was obtained using intra-prediction or intra block copy (IBC). Intra block copy operation is a prediction mode that predicts a block by using motion compensation over an area of the reconstructed samples of the current picture.

This restriction on the prediction type of a neighboring reconstructed block may also imply any other modes that uses intra prediction. For example, this restriction may also apply to the neighboring blocks that are predicted using combined intra-inter prediction (CIIP) prediction mode.

Figure 22:
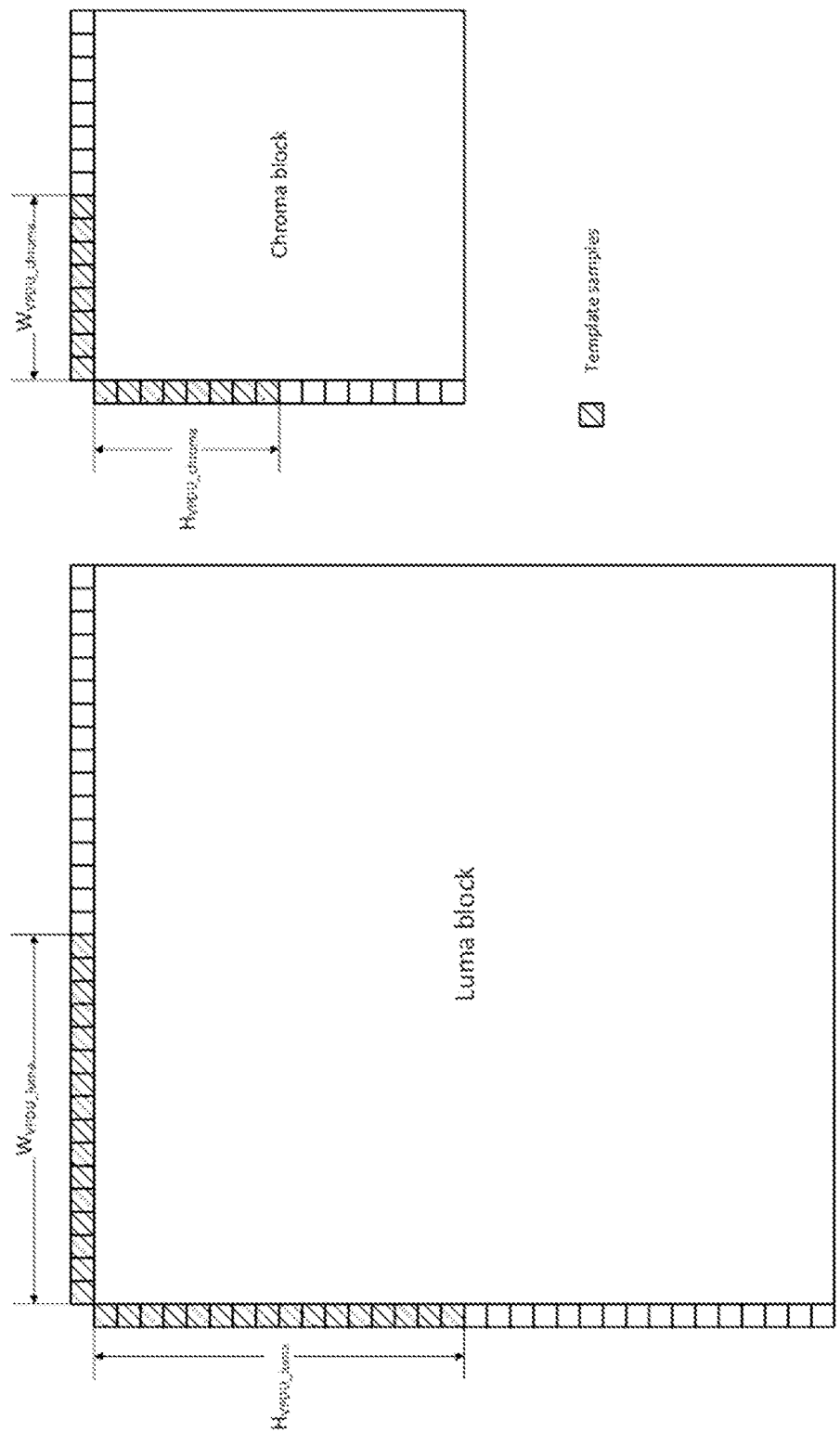
FIG. 22 is an illustration of templates of the left and above sides of a luma block and a chroma block.

Additionally, templates of the left and above sides of the block (such as the current block or the reference block) may be limited to some number of samples that are aligned with the top-left corner of the block (see FIG. 22). In FIG. 22, $W_{VPDU\_luma}$ and $H_{VPDU\_luma}$ denote a number of template samples above and the left of the current luma block, respectively. For a chroma block, $W_{VPDU\_chroma}$ and $H_{VPDU\_chroma}$ denote a number of template samples above and left of the current chroma block, respectively. It is understood that for the current block, there are a luma block and a chroma block, and for the reference block, there are also a luma block and a chroma block. For a dual-tree case, where a chroma block may correspond to multiple luma blocks, the above described LIC methods may be applied to a prediction unit (PU) or separately to each prediction bock (PB), i.e. treating luma and chroma LIC separately.

Since the respective side length or size of the reconstructed block (e.g. the reconstructed neighboring block of the block) may be restricted to some pre-defined or fixed value $nTbS_{min}$, where $nTbS_{min}$ represent the minimum size or side length of the reconstructed block, the number of available template samples of the block (such as a current block or a reference block) are a multiple of this value $nTbS_{min}$. Particularly, when the minimum side length (e.g. minimum width or minimum height) of a luma block is set equal to 4, and $W_{VPDU\_luma}$ is equal to $H_{VPDU\_luma}$ and is equal to 16, the number of available reference samples is an integer value within a range [1 ... 8] multiplied by 4. For a chroma block, when the minimum side length (e.g. minimum width or minimum height) of the chroma block is set equal to 2, and $W_{VPDU\_luma}$ is equal to $H_{VPDU\_luma}$ and is equal to 8, the number of available template samples is an integer value within a range [1 ... 8] multiplied by 2.

The value of the index in the multipliers LUT may be obtained as follows:

$idx_{mult}=(C_T>>\log 2(nTbS_{min}))-1$.

An exemplary LUT may be defined as specified in Table 4.

TABLE 4

Exemplary LUT of multipliers for division

| $idx_{mult}$ | | | | | | | |
|---|---|---|---|---|---|---|---|
| 0 | 1 | 2 | 3 | 4 | 5 | 6 | 7 |
| mult | | | | | | | |
| 16384 | 8192 | 5461 | 4096 | 3277 | 2731 | 2341 | 2048 |

The next step is to obtain a mean value of the reconstructed neighboring samples of the current block (namely, the mean value of available template samples of the current block) and a mean value of the reconstructed neighboring samples of the reference block (namely, the mean value of available template samples of the reference block). If multipliers are defined in Table 4, the mean value of the reconstructed neighboring samples of the current block may be calculated as follows:

Mean=$((S_{T1}+\text{shiftOffset})\cdot\text{mult})>>\text{shift}$, shiftOffset=$C_T>>1$, and shift=$14+\log_2(nTbS_{min})$ In the equation above, $S_{T1}$ is the sum of available template samples of the current block, i.e. on the left and/or top of the current block, depending on availability. When the mean value is calculated for the current block, the sum of available template samples for the current block is obtained. If a sample is not available in the template (left template or above template) of the current block, the template sample of the reference block with the same position relative the block is not included in calculation of $S_{T2}$ for the reference block. In an embodiment of the present disclosure, LUT multiplication and shift may be used for obtaining the mean value of the reconstructed neighboring samples of the current block.

The number of available template samples $C_T$ is the same when calculating the mean value of available template samples of the current block and the mean value of available template samples of the reference block, because it depends only on the neighboring blocks of the current block.

The mean value of available template samples of the reference block may be calculated as follows:

Mean=$((S_T2+\text{shiftOffset})\cdot\text{mult})>>\text{shift}$, shiftOffset=$C_T>>1$, and shift=$14+\log_2(nTbS_{min})$.

In the equation above, $S_{T2}$ is the sum of available template samples of the reference block. When the mean value is calculated for the reference block, the sum of available template samples for the reference block is obtained. If a sample is not available in the template of the current block, the template sample of the reference block with the same position relative the block is not included in calculation of $S_{T2}$ for the reference block.

In an embodiment of the present disclosure, LUT multiplication and shift may be used for obtaining the mean value of the reconstructed neighboring samples of the reference block.

The number of available template samples $C_T$ is the same when calculating the mean value of available template samples of the current block and the mean value of available template samples of the reference block, because it depends only on the neighboring blocks of the current block.

Figure 24:
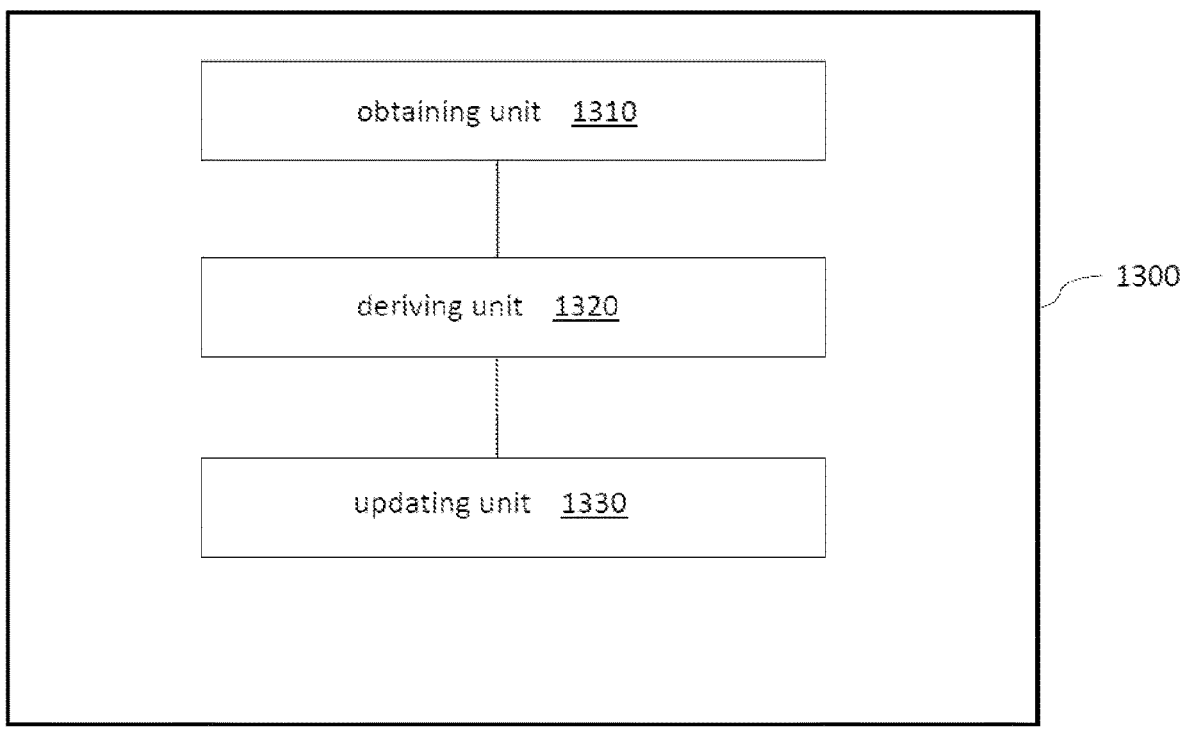
FIG. 24 shows a block diagram illustrating an example of an apparatus for LIC for inter-prediction coding according to an embodiment of the disclosure.

FIG. 24 shows a block diagram illustrating an example of an apparatus 1300 for local illumination compensation (LIC) for inter-prediction coding according to an embodiment of the disclosure. In an example, the apparatus 1300 may be corresponding to the inter prediction unit 244 in FIG. 2. In another example, the apparatus 1300 may be corresponding to the inter prediction unit 344 in FIG. 3. The apparatus 1300 comprises an obtaining unit 1310 configured to obtain inter-predicted sample values for a current block using motion compensation, a deriving unit 1320 configured to derive values of parameters α and β for a linear model of the LIC, based on at least one of reconstructed neighboring samples above the current block and reconstructed neighboring samples left of the current block and based on at least one of reconstructed neighboring samples above at least one reference block and reconstructed neighboring samples left of the at least one reference block, wherein the at least one reference block corresponds to the current block, and an updating unit 1330 configured to update the inter-predicted sample values for the current block using the linear model based on the parameters α and β, wherein the deriving unit 1320 is further configured to clip the value of α based on the value of β and update the value of β based on the clipped value of α when a condition for the value of β is met.

The obtaining unit 1310, the deriving unit 1320, and the updating unit 1330 may be implemented in hardware, software, firmware, or any combination thereof. If implemented in software, the functions may be stored on a computer-readable medium or transmitted over communication media as one or more instructions or code and executed by a hardware-based processing unit. Instructions may be executed by one or more processors, such as one or more DSPs, general purpose microprocessors, ASICs, FPGAs, or other equivalent integrated or discrete logic circuitry.

Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

Figure 25:
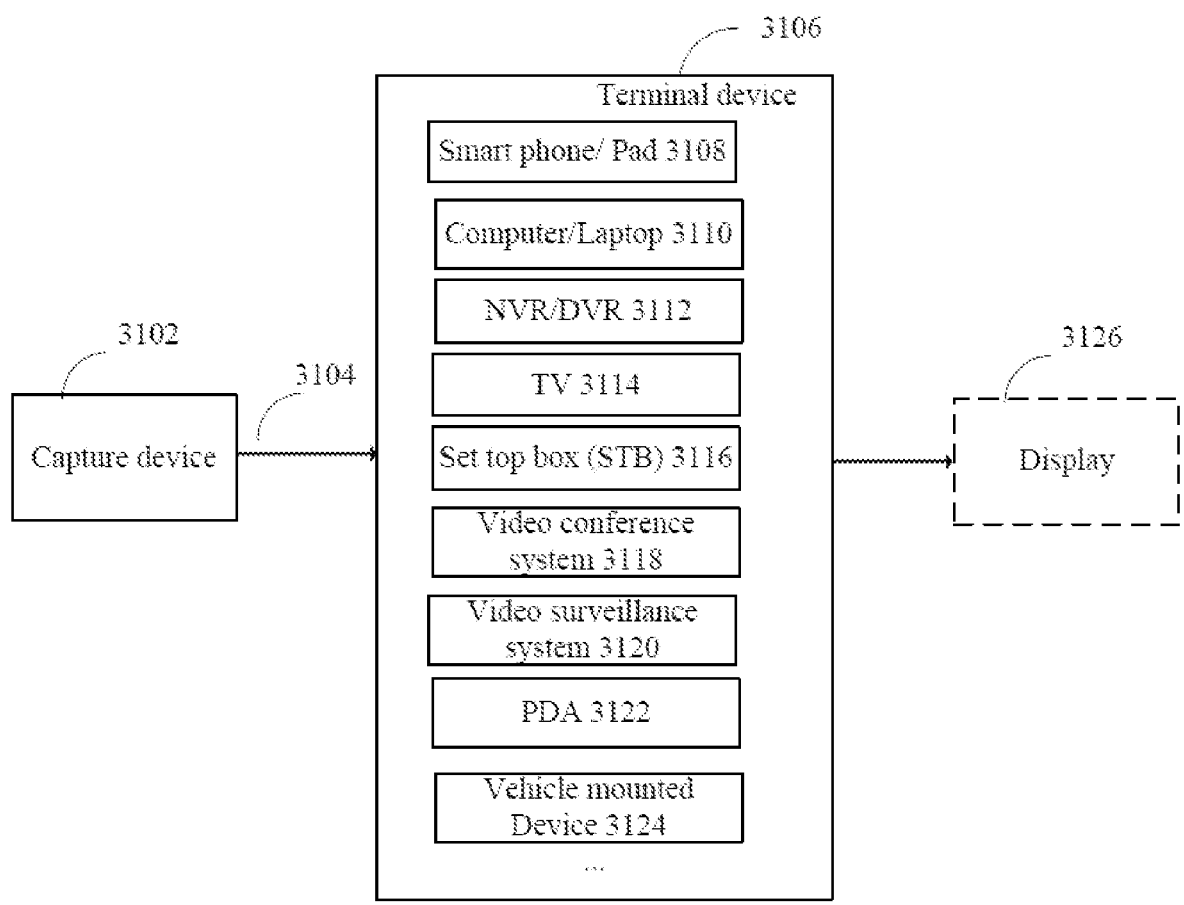
FIG. 25 is a block diagram showing an example structure of a content supply system which realizes a content delivery service.

Following is an explanation of the applications of the encoding method as well as the decoding method as shown in the above-mentioned embodiments, and a system using them FIG. 25 is a block diagram showing a content supply system 3100 for realizing a content distribution service. This content supply system 3100 includes a capture device 3102, a terminal device 3106, and optionally includes a display 3126. The capture device 3102 communicates with the terminal device 3106 over communication link 3104. The communication link may include the communication channel 13 described above. The communication link 3104 includes but is not limited to WI-FI, Ethernet, Cable, wireless (third generation (3G)/fourth generation (4G)/fifth generation (5G)), Universal Serial Bus (USB), or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but is not limited to camera, smart phone or Pad, computer or laptop, video conference system, personal digital assistant (PDA), vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 may distribute the encoded audio data and the encoded video data to the terminal device 3106 separately.

In the content supply system 3100, the terminal device 3106 receives and reproduces the encoded data. The terminal device 3106 may be a device with data receiving and recovering capability, such as a smart phone or Pad 3108, a computer or laptop 3110, a network video recorder (NVR)/digital video recorder (DVR) 3112, a TV 3114, a set top box (STB) 3116, a video conference system 3118, a video surveillance system 3120, a PDA 3122, a vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, a smart phone or IPAD 3108, a computer or laptop 3110, an NVR/DVR 3112, a TV 3114, a PDA 3122, or a vehicle mounted device 3124, the terminal device can feed the decoded data to its display. For a terminal device equipped with no display, for example, an STB 3116, a video conference system 3118, or a video surveillance system 3120, an external display 3126 may be contacted therein to receive and show the decoded data.

When each device in this system performs encoding or decoding, the picture encoding device or the picture decoding device, as shown in the above-mentioned embodiments, can be used.

Figure 26:
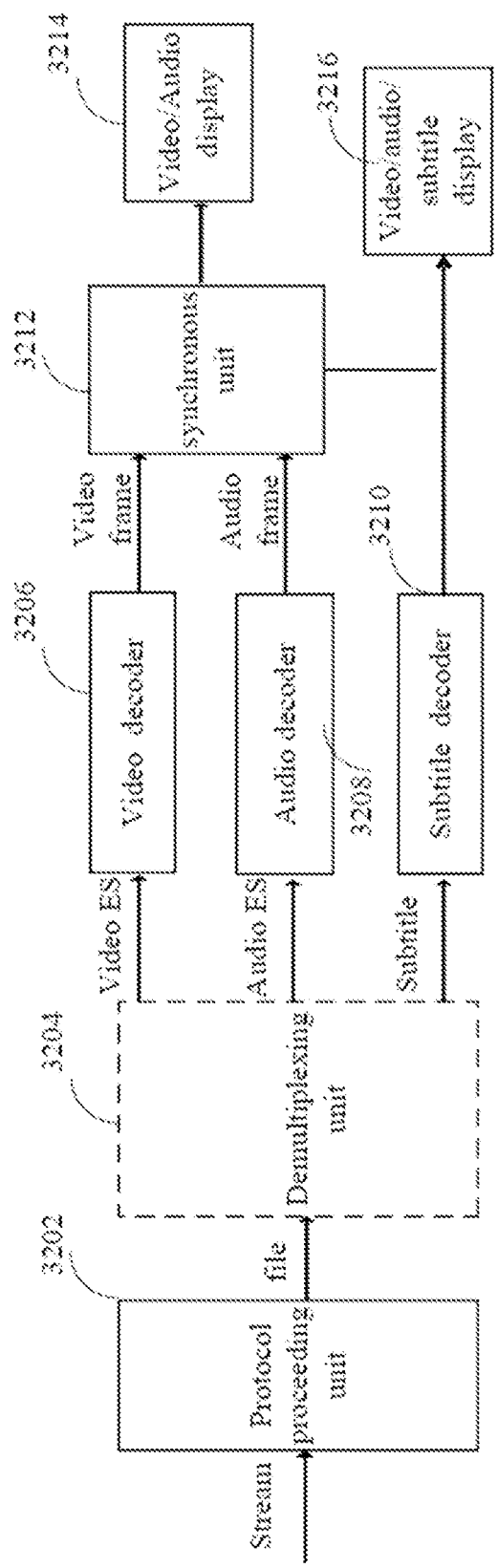
FIG. 26 is a block diagram showing a structure of an example of a terminal device.

FIG. 26 is a diagram showing a structure of an example of the terminal device 3106. After the terminal device 3106 receives a stream from the capture device 3102, the protocol proceeding unit 3202 analyzes the transmission protocol of the stream. The protocol includes but is not limited to Real Time Streaming Protocol (RTSP), Hypertext Transfer Protocol (HTTP), HTTP Live Streaming protocol (HLS), MPEG-Dynamic Adaptive Streaming over HTTP (DASH), Real-time Transport protocol (RTP), Real Time Messaging Protocol (RTMP), or any kind of combination thereof, or the like.

After the protocol proceeding unit 3202 processes the stream, a stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without passing through the demultiplexing unit 3204.

Via the demultiplexing processing, a video elementary stream (ES), an audio ES, and optionally a subtitle are generated. The video decoder 3206, which includes the video decoder 30 as explained in the above mentioned embodiments, decodes the video ES by the decoding method as shown in the above-mentioned embodiments to generate a video frame, and feeds this data to the synchronous unit 3212. The audio decoder 3208, decodes the audio ES to generate an audio frame, and feeds this data to the synchronous unit 3212. Alternatively, the video frame may be stored in a buffer (not shown in FIG. 26) before feeding it to the synchronous unit 3212. Similarly, the audio frame may be stored in a buffer (not shown in FIG. 26) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present disclosure is not limited to the above-mentioned system, and either the picture encoding device or the picture decoding device in the above-mentioned embodiments can be incorporated into other system, for example, a car system.

Mathematical Operators:

The mathematical operators used in this disclosure are similar to those used in the C programming language. However, the results of integer division and arithmetic shift operations are defined more precisely, and additional operations are defined, such as exponentiation and real-valued division. Numbering and counting conventions generally begin from 0, i.e. "the first" is equivalent to the 0-th, "the second" is equivalent to the 1 st, etc.

Arithmetic Operators:

The following arithmetic operators are defined as follows:

| | |
|---|---|
| + | Addition |
| − | Subtraction (as a two-argument operator) or negation (as a unary prefix operator) |
| * | Multiplication, including matrix multiplication |
| $x^y$ | Exponentiation. Specifies x to the power of y. In other contexts, such notation is used for superscripting not intended for interpretation as exponentiation. |
| / | Integer division with truncation of the result toward zero. For example, 7 / 4 and −7 / −4 are truncated to 1 and −7 / 4 and 7 / −4 are truncated to −1. |
| ÷ | Used to denote division in mathematical equations where no truncation or rounding is intended. |
| $\frac{x}{y}$ | Used to denote division in mathematical equations where no truncation or rounding is intended. |
| $\sum_{i=x}^{y} f(i)$ | The summation of f(i) with i taking all integer values from x up to and including y. |
| x % y | Modulus. Remainder of x divided by y, defined only for integers x and y with x >= 0 and y > 0. |

Logical Operators:

The following logical operators are defined as follows:

x && y Boolean logical "and" of x and y x||y Boolean logical "or" of x and y

! Boolean logical "not"

x ? y:z If x is TRUE or not equal to 0, evaluates to the value of y; otherwise, evaluates to the value of z.

Relational Operators:

The following relational operators are defined as follows:

> Greater than

>= Greater than or equal to

< Less than

<= Less than or equal to

== Equal to

!= Not equal to

When a relational operator is applied to a syntax element or variable that has been assigned the value "na" (not applicable), the value "na" is treated as a distinct value for the syntax element or variable. The value "na" is considered not to be equal to any other value.

Bit-Wise Operators:

The following bit-wise operators are defined as follows:

& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^ Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators:

The following arithmetic operators are defined as follows:

= Assignment operator

++ Increment, i.e., x++ is equivalent to x=x+1, when used in an array index, evaluates to the value of the variable prior to the increment operation.

−− Decrement, i.e., x−− is equivalent to x=x−1, when used in an array index, evaluates to the value of the variable prior to the decrement operation.

+= Increment by amount specified, i.e., x+=3 is equivalent to x=x+3, and x+=(−3) is equivalent to x=x+(−3).

−= Decrement by amount specified, i.e., x−=3 is equivalent to x=x−3, and x−=(−3) is equivalent to x=x−(−3).

Range Notation:

The following notation is used to specify a range of values:

x=y . . . z, where x takes on integer values starting from y to z, inclusive, with x, y, and z being integer numbers and z being greater than y.

Mathematical Functions:

The following mathematical functions are defined:

$$Abs(x) = \begin{cases} x; & x >= 0 \\ -x; & x < 0 \end{cases}$$

A sin(x) the trigonometric inverse sine function, operating on an argument x that is in the range of −1.0 to 1.0, inclusive, with an output value in the range of −π÷2 to π÷2, inclusive, in units of radians.

A tan(x) the trigonometric inverse tangent function, operating on an argument x, with an output value in the range of −π÷2 to π÷2, inclusive, in units of radians.

$$Atan2(y, x) = \begin{cases} Atan\left(\frac{y}{x}\right); & x > 0 \\ Atan\left(\frac{y}{x}\right) + \pi; & x < 0 \&\& y >= 0 \\ Atan\left(\frac{y}{x}\right) - \pi; & x < 0 \&\& y < 0 \\ +\frac{\pi}{2}; & x == 0 \&\& y >= 0 \\ -\frac{\pi}{2}; & \text{otherwise} \end{cases}$$

Ceil(x) the smallest integer greater than or equal to x.

$$Clip1_Y(x) = Clip3(0, (1 << BitDepth_Y) - 1, x)$$

$$Clip1_C(x) = Clip3(0, (1 << BitDepth_C) - 1, x)$$

$$\text{Clip3}(x, y, z) = \begin{cases} x; & z < x \\ y; & z > y \\ z; & \text{otherwise} \end{cases}$$

Cos(x) the trigonometric cosine function operating on an argument x in units of radians.

Floor(x) the largest integer less than or equal to x.

$$\text{GetCurrMsb}(a, b, c, d) = \begin{cases} c+d; & b-a >= d/2 \\ c-d; & a-b > d/2 \\ c; & \text{otherwise} \end{cases}$$

Ln(x) the natural logarithm of x (the base-e logarithm, where e is the natural logarithm base constant 2.718 281 828 . . . ).

Log 2(x) the base-2 logarithm of x.

Log 10(x) the base-10 logarithm of x.

$$\text{Min}(x, y) = \begin{cases} x; & x <= y \\ y; & x > y \end{cases}$$

$$\text{Max}(x, y) = \begin{cases} x; & x >= y \\ y; & x < y \end{cases}$$

Round(x) = Sign(x) * Floor(Abs(x) + 0.5)

$$\text{Sign}(x) = \begin{cases} 1; & x > 0 \\ 0; & x == 0 \\ -1; & x < 0 \end{cases}$$

Sin(x) the trigonometric sine function operating on an argument x in units of radians Sqrt(x)=$\sqrt{x}$ Swap(x, y)=(y, x)

Tan(x) the trigonometric tangent function operating on an argument x in units of radians Order of Operation Precedence:

When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest, a higher position in the table indicates a higher precedence.

For those operators that are also used in the C programming language, the order of precedence used in this Specification is the same as used in the C programming language.

TABLE 5

Operation precedence from highest (at top of table) to lowest (at bottom of table)

operations (with operands x, y, and z)

"x++", "x− −"

"!x", "−x" (as a unary prefix operator)

$x^y$

"x * y", "x / y", "x ÷ y", "x/y", "x % y"

"x + y", "x − y" (as a two-argument operator), $"\sum_{i=x}^{y} f(i)"$

TABLE 5-continued

Operation precedence from highest (at top of table) to lowest (at bottom of table)

operations (with operands x, y, and z)

"x << y", "x >> y"

"x < y", "x <= y", "x > y", "x >= y"

"x = = y", "x != y"

"x & y"

"x | y"

"x && y"

"x | | y"

"x ? y : z"

"x..y"

"x = y", "x += y", "x −= y"

Text Description of Logical Operations

In the text, a statement of logical operations as would be described mathematically in the following form:

```
if( condition 0 )
    statement 0
else if( condition 1 )
    statement 1
...
else /* informative remark on remaining condition */
    statement n
``` may be described in the following manner:

... as follows / ... the following applies:

If condition 0, statement 0

Otherwise, if condition 1, statement 1

...

Otherwise (informative remark on remaining condition), statement n

Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " may always be an "Otherwise, . . . ". Interleaved "If . . . Otherwise, if . . . Otherwise, . . . "statements can be identified by matching" . . . as follows" or " . . . the following applies" with the ending "Otherwise, . . . ".

In the text, a statement of logical operations as would be described mathematically in the following form:

```
if( condition 0a && condition 0b )
    statement 0
else if( condition 1a || condition 1b )
    statement 1
...
else
    statement n
``` may be described in the following manner:

... as follows / ... the following applies:

If all of the following conditions are true, statement 0:

condition 0a condition 0b

-continued

```
Otherwise, if one or more of the following conditions are true, statement 1:
    condition 1a
    condition 1b
...
```

Otherwise, statement n

In the text, a statement of logical operations as would be described mathematically in the following form:

```
if( condition 0 )
    statement 0
if( condition 1 )
    statement 1
may be described in the following manner:
When condition 0, statement 0
When condition 1, statement 1
```

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and the video decoder 30 may equally be used for still picture processing, e.g. residual calculation 204/304, transform 206, quantization 208, inverse quantization 210/310, (inverse) transform 212/312, partitioning 262, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which correspond to tangible media such as data storage media, or communication media including any medium that facilitates transfer of a computer program from one place to another, e.g., according to a communication protocol. In this manner, computer-readable media generally may correspond to (1) tangible computer-readable storage media which are non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, electrically erasable programmable ROM (EEPROM), compact-disc (CD) ROM (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, include compact disc (CD), laser disc, optical disc, DVD, floppy disk and BLU-RAY disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The invention claimed is:

1. An apparatus for a local illumination compensation (LIC) for inter-prediction coding, wherein the apparatus comprises:
   a memory configured to store instructions; and
   one or more processors coupled to the memory, wherein the instructions cause the one or more processors to be configured to:
      obtain inter-predicted sample values for a current block using motion compensation;
      derive values of $\alpha$ and $\beta$ for a linear model of the LIC based on at least one reconstructed neighboring sample above the current block or reconstructed neighboring samples left of the current block, and at least one reconstructed neighboring sample above at least one reference block or reconstructed neighboring samples left of the at least one reference block,
   wherein the at least one reference block corresponds to the current block,
   wherein the value of $\beta$ is based on a first mean value of a first set of reconstructed neighboring samples of the current block and a second mean value of a second set of reconstructed neighboring samples of the at least one reference block, wherein the first mean value is derived using a weighted sum of a third mean value of a set of reconstructed neighboring samples above the current block and a fourth mean value of a set of reconstructed neighboring samples left of the current block, wherein a weighting coefficient is applied either to the third mean value or the fourth mean value depending on whether a width of the current block is greater than a height of the current block, wherein the second mean value is derived using a weighted sum of a fifth mean value of a set of reconstructed neighboring samples above the at least one reference block and a sixth mean value of a set of reconstructed neighboring samples left of the at least one reference block, and wherein the weighting coefficient is applied either to the fifth mean value or the sixth mean value depending on whether a width of the at least one reference block is greater than a height of the at least one reference block;

update the inter-predicted sample values using the linear model and based on α and β, wherein, when a condition for a value of β is met, a value of α is clipped based on the value of β to obtain a clipped value of α and the value of β is updated based on the clipped value of α before updating the inter-predicted sample values; and set the value of α to be equal to min(α, $α_{max}$) when β<0, wherein $α_{max}$ represents a maximum value of a clipping range of the value of α.

2. The apparatus of claim 1, wherein the condition for the value of β is met, and wherein before updating the inter-predicted sample values, the instructions further cause the one or more processors to be configured to:

clip the value of α based on the value of β to obtain the clipped value of α; and update the value of β based on the clipped value of α.

3. The apparatus of claim 1, wherein an absolute value of β is larger than a threshold $T_β$, and wherein the value of α is clipped.

4. The apparatus of claim 1, wherein the instructions further cause the one or more processors to be configured to set the value of α to be equal to max(α, $α_{min}$) when β>0, and wherein $α_{min}$ represents a minimum value of the clipping range of the value of α.

5. The apparatus of claim 1, wherein the instructions further cause the one or more processors to be configured to clip the value of β before updating the inter-predicted sample values.

6. The apparatus of claim 5, wherein after updating the value of β based on the clipped value of α, the instructions further cause the one or more processors to be configured to clip the value of β.

7. The apparatus of claim 5, wherein the instructions further cause the one or more processors to be configured to clip the value of β after clipping the value of α.

8. The apparatus of claim 1, wherein the instructions further cause the one or more processors to be configured to:

process at least one of the reconstructed neighboring samples above the current block or the reconstructed neighboring samples left of the current block by applying a first finite impulse response (FIR) filter; or process at least one of the reconstructed neighboring samples above the at least one reference block or the reconstructed neighboring samples left of the at least one reference block by applying a second FIR filter.

9. The apparatus of claim 8, wherein the instructions further cause the one or more processors to be configured to apply each of the first FIR filter and the second FIR filter when the current block is predicted using a non-affine motion compensation model.

10. The apparatus of claim 1, wherein the instructions further cause the one or more processors to be configured to calculate the first mean value based on a sum of available reconstructed neighboring samples of the current block using a shift operation and a multiplication, and wherein the shift operation depends on a number of available reconstructed neighboring samples of the current block.

11. The apparatus of claim 10, wherein the instructions further cause the one or more processors to be configured to further calculate the first mean value as follows:

Mean=(($S_{T1}$+shiftOffset)·mult)»shift; and shiftOffset=$C_T$»1, wherein $S_{T1}$ represents the sum of the available reconstructed neighboring samples of the current block, wherein $C_T$ represents the number of available reconstructed neighboring samples of the current block, and wherein mult represents a multiplier fetched from a lookup table.

12. The apparatus of claim 1, wherein the instructions further cause the one or more processors to be configured to calculate the second mean value based on a sum of available reconstructed neighboring samples of the at least one reference block using a shift operation and a multiplication, and wherein the shift operation depends on a number of available reconstructed neighboring samples of the at least one reference block.

13. The apparatus of claim 12, wherein the instructions further cause the one or more processors to be configured to further calculate the second mean as follows:

Mean=(($S_{T2}$+shiftOffset)·mult)»shift;

shiftOffset=$C_T$»1, wherein $S_{T2}$ represents the sum of the available reconstructed neighboring samples of the at least one reference block, wherein $C_T$ represents the number of available reconstructed neighboring samples of the at least one reference block, and wherein mult represents a multiplier fetched from a lookup table.

14. The apparatus of claim 10, wherein the available reconstructed neighboring samples of the current block comprise at least one of available reconstructed neighboring samples above the current block or available reconstructed neighboring samples left of the current block, or wherein the available reconstructed neighboring samples of the at least one reference block comprise at least one of available reconstructed neighboring samples above the at least one reference block or available reconstructed neighboring samples left of the at least one reference block.

15. The apparatus of claim 1, wherein the reconstructed neighboring samples above the current block comprise a single row of reconstructed samples adjacent to the current block, or wherein the reconstructed neighboring samples left of the current block comprise a single column of reconstructed samples left of the current block.

16. The apparatus of claim 1, wherein the reconstructed neighboring samples above the at least one reference block comprise a single row of reconstructed samples adjacent to the at least one reference block, or wherein the reconstructed neighboring samples left of the at least one reference block comprise a single column of reconstructed samples left of the at least one reference block.

17. A method for local illumination compensation (LIC) for inter-prediction coding, wherein the method comprises:
  obtaining inter-predicted sample values for a current block using motion compensation;
  deriving values of α and β for a linear model of the LIC based on at least one reconstructed neighboring sample above the current block or reconstructed neighboring samples left of the current block, and at least one reconstructed neighboring sample above at least one reference block or reconstructed neighboring samples left of the at least one reference block, wherein the at least one reference block corresponds to the current block,
  wherein the value of β is based on a first mean value of a first set of reconstructed neighboring samples of the current block and a second mean value of a second set of reconstructed neighboring samples of the at least one reference block,
  wherein the first mean value is derived using a weighted sum of a third mean value of a set of reconstructed neighboring samples above the current block and a fourth mean value of a set of reconstructed neighboring samples left of the current block,
  wherein a weighting coefficient is applied either to the third mean value or the fourth mean value depending on whether a width of the current block is greater than a height of the current block,
  wherein the second mean value is derived using a weighted sum of a fifth mean value of a set of reconstructed neighboring samples above the at least one reference block and a sixth mean value of a set of reconstructed neighboring samples left of the at least one reference block, and
  wherein the weighting coefficient is applied either to the fifth mean value or the sixth mean value depending on whether a width of the at least one reference block is greater than a height of the at least one reference block;
  updating the inter-predicted sample values for the current block using the linear model based on α and β, wherein, when a condition for a value of β is met, a value of α is clipped based on the value of β to obtain a clipped value of α and the value of β is updated based on the clipped value of α before updating the inter-predicted sample values; and
  setting the value of α to be equal to min(α, $α_{max}$) when β<0, wherein $α_{max}$ represents a maximum value of a clipping range of the value of α.

18. A computer program product comprising computer-executable instructions that are stored on a non-transitory computer-readable medium and that, when executed by one or more processors, cause an apparatus to:
  obtain inter-predicted sample values for a current block using motion compensation;
  derive values of α and β for a linear model of local illumination compensation (LIC) based on at least one reconstructed neighboring sample above the current block or reconstructed neighboring samples left of the current block, and at least one reconstructed neighboring sample above at least one reference block or reconstructed neighboring samples left of the at least one reference block, wherein the at least one reference block corresponds to the current block,
  wherein the value of β is based on a first mean value of a first set of reconstructed neighboring samples of the current block and a second mean value of a second set of reconstructed neighboring samples of the at least one reference block,
  wherein the first mean value is derived using a weighted sum of a third mean value of a set of reconstructed neighboring samples above the current block and a fourth mean value of a set of reconstructed neighboring samples left of the current block,
  wherein a weighting coefficient is applied either to the third mean value or the fourth mean value depending on whether a width of the current block is greater than a height of the current block,
  wherein the second mean value is derived using a weighted sum of a fifth mean value of α set of reconstructed neighboring samples above the at least one reference block and a sixth mean value of a set of reconstructed neighboring samples left of the at least one reference block, and
  wherein the weighting coefficient is applied either to the fifth mean value or the sixth mean value depending on whether a width of the at least one reference block is greater than a height of the at least one reference block;
  update the inter-predicted sample values using the linear model based on α and β, wherein, when a condition for a value of β is met, a value of α is clipped based on the value of β to obtain a clipped value of α and the value of β is updated based on the clipped value of α before updating the inter-predicted sample values for the current block; and
  set the value of α to be equal to min(α, $α_{max}$) when β<0, wherein $α_{max}$ represents a maximum value of a clipping range of the value of α.

19. The method of claim 17, further comprising:
  clipping the value of α based on the value of β to obtain the clipped value of α; and
  updating the value of β based on the clipped value of α.

20. The computer program product of claim 18, wherein the computer-executable instructions, when executed by the one or more processors, further cause the apparatus to:
  clip the value of α based on the value of β to obtain the clipped value of α; and
  update the value of β based on the clipped value of α.

* * * * *

UNITED STATES PATENT AND TRADEMARK OFFICE
CERTIFICATE OF CORRECTION

PATENT NO. : 12,058,338 B2
APPLICATION NO. : 17/531144
DATED : August 6, 2024
INVENTOR(S) : Alexey Konstantinovich Filippov and Vasily Alexeevich Rufitskiy It is certified that error appears in the above-identified patent and that said Letters Patent is hereby corrected as shown below:

Page 1 of 1

In the Claims

Claim 1, Column 61, Line 24:
"linear model and based on a and β, wherein, when a"
Should read:
"linear model and based on α and β, wherein, when a"

Claim 11, Column 62, Line 19:
"Mean=(($ST1$+shiftOffset)·mult)»shift; and"
Should read:
"$Mean = ((S_{T1} + \text{shiftOffset}) \cdot \text{mult}) \gg \text{shift}$; and"

Claim 18, Column 64, Line 26:
"weighted sum of α fifth mean value"
Should read:
"weighted sum of a fifth mean value"

Signed and Sealed this
First Day of October, 2024

Katherine Kelly Vidal
*Director of the United States Patent and Trademark Office*